(12) United States Patent
Sannala

(10) Patent No.: US 9,396,633 B1
(45) Date of Patent: Jul. 19, 2016

(54) SYSTEMS, METHODS, AND DEVICES FOR MANAGING COEXISTENCE OF MULTIPLE TRANSCEIVER DEVICES BY OPTIMIZING COMPONENT LAYOUT

(71) Applicant: Google Inc., Mountain View, CA (US)

(72) Inventor: Mikko Pekka Sannala, Los Gatos, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/819,373

(22) Filed: Aug. 5, 2015

Related U.S. Application Data

(60) Provisional application No. 62/175,393, filed on Jun. 14, 2015.

(51) Int. Cl.
| | |
|---|---|
| *H04N 7/18* | (2006.01) |
| *G08B 13/196* | (2006.01) |
| *H01Q 1/24* | (2006.01) |

(Continued)

(52) U.S. Cl.
CPC ........ *G08B 13/19619* (2013.01); *H01Q 1/2291* (2013.01); *H01Q 1/24* (2013.01); *H04N 5/2254* (2013.01)

(58) Field of Classification Search
CPC ....... H04N 7/18; G06K 9/00771; G06K 9/00; G08B 13/196
USPC ......................................................... 348/143
See application file for complete search history.

(56) References Cited

U.S. PATENT DOCUMENTS

| 2,101,637 A | 12/1937 | Davis |
| 3,681,603 A | 8/1972 | Scheidweiler et al. |
| 3,948,441 A | 4/1976 | Perkins et al. |

(Continued)

FOREIGN PATENT DOCUMENTS

| CN | 101305248 | 11/2008 |
| CN | 101522447 | 9/2009 |

(Continued)

OTHER PUBLICATIONS

Detroitborg, Nest Learning Thermostat: Unboxing and Review, (online), retrieved from the Internet: URL: http://www.youtube.com/watch?v=KrgcOL4oLzc, retrieved on Aug. 22, 2013, Feb. 10, 2012, pgs.

(Continued)

*Primary Examiner* — Shan Elahi
(74) *Attorney, Agent, or Firm* — Morgan, Lewis & Bockius LLP

(57) ABSTRACT

A camera assembly includes an enclosed housing having a rear surface, a front surface, and a periphery. The camera assembly also includes a lens module located within the housing and configured to receive light via the front surface, and communication circuitry located within the housing and configured to wireless communicate over a plurality of different communication protocols. The camera assembly further includes a first antenna arranged at a first location on an inner surface of the periphery, the first antenna configured for communication over a first one of the communication protocols, and a second antenna arranged at a second location on the inner surface of the periphery, the second location being different than the first location, the second antenna configured for communication over a second one of the communication protocols.

19 Claims, 50 Drawing Sheets

(51) Int. Cl.
*H01Q 1/22* (2006.01)
*H04N 5/225* (2006.01)

(56) References Cited

U.S. PATENT DOCUMENTS

| | | | |
|---|---|---|---|
| 3,991,357 A | 11/1976 | Kaminski | |
| 4,121,110 A | 10/1978 | Solomon | |
| 4,157,506 A | 6/1979 | Spencer | |
| 4,177,923 A | 12/1979 | Krump | |
| 4,225,860 A | 9/1980 | Conforti | |
| 4,249,696 A | 2/1981 | Donnelly et al. | |
| 4,308,991 A | 1/1982 | Peinetti et al. | |
| 4,319,234 A | 3/1982 | Rice | |
| 4,460,125 A | 7/1984 | Barker et al. | |
| 4,528,459 A | 7/1985 | Wiegel | |
| 4,695,246 A | 9/1987 | Beilfuss et al. | |
| 4,842,510 A | 6/1989 | Grunden | |
| 4,845,474 A | 7/1989 | Moore et al. | |
| 4,872,828 A | 10/1989 | Mierzwinski et al. | |
| 4,898,229 A | 2/1990 | Brown et al. | |
| 4,948,044 A | 8/1990 | Cacciatore | |
| 4,955,805 A | 9/1990 | Ishiguro et al. | |
| 4,955,806 A | 9/1990 | Grunden et al. | |
| 5,107,918 A | 4/1992 | McFarlane et al. | |
| 5,127,464 A | 7/1992 | Butler | |
| 5,158,477 A | 10/1992 | Testa | |
| 5,175,439 A | 12/1992 | Harer et al. | |
| 5,251,813 A | 10/1993 | Kniepkamp | |
| 5,255,179 A | 10/1993 | Zekan et al. | |
| 5,260,669 A | 11/1993 | Higgins et al. | |
| 5,277,363 A | 1/1994 | Hart | |
| 5,347,982 A | 9/1994 | Binzer et al. | |
| 5,352,930 A | 10/1994 | Ratz | |
| 5,381,950 A | 1/1995 | Aldridge | |
| 5,422,808 A | 6/1995 | Catanese, Jr. et al. | |
| 5,452,762 A | 9/1995 | Zillner, Jr. | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,506,569 A | 4/1996 | Rowlette | |
| 5,544,036 A | 8/1996 | Brown, Jr. et al. | |
| 5,570,837 A | 11/1996 | Brown et al. | |
| 5,589,824 A | 12/1996 | Lynch | |
| 5,595,342 A | 1/1997 | McNair et al. | |
| 5,611,484 A | 3/1997 | Uhrich | |
| 5,635,896 A | 6/1997 | Tinsley et al. | |
| 5,646,349 A | 7/1997 | Twigg et al. | |
| 5,655,709 A | 8/1997 | Garnett et al. | |
| 5,697,552 A | 12/1997 | McHugh et al. | |
| 5,719,557 A | 2/1998 | Rattman et al. | |
| 5,736,795 A | 4/1998 | Zuehlke | |
| 5,808,294 A | 9/1998 | Neumann | |
| 5,903,139 A | 5/1999 | Kompelien | |
| 5,918,474 A | 7/1999 | Khanpara et al. | |
| 5,966,077 A | 10/1999 | Wong | |
| 6,060,719 A | 5/2000 | DiTucci et al. | |
| 6,072,784 A | 6/2000 | Agrawal et al. | |
| 6,084,518 A | 7/2000 | Jamieson | |
| 6,084,522 A | 7/2000 | Addy | |
| 6,089,310 A | 7/2000 | Toth et al. | |
| 6,114,967 A | 9/2000 | Yousif | |
| 6,213,404 B1 | 4/2001 | Dushane et al. | |
| 6,218,995 B1 * | 4/2001 | Higgins | G01D 4/002 340/870.02 |
| 6,222,719 B1 | 4/2001 | Kadah | |
| 6,275,160 B1 | 8/2001 | Ha | |
| 6,315,211 B1 | 11/2001 | Sartain et al. | |
| 6,336,593 B1 | 1/2002 | Bhatnagar | |
| 6,356,038 B2 | 3/2002 | Bishel | |
| 6,377,182 B1 | 4/2002 | Devine et al. | |
| 6,509,838 B1 | 1/2003 | Payne et al. | |
| 6,513,723 B2 | 2/2003 | Mueller et al. | |
| 6,566,768 B2 | 5/2003 | Zimmerman et al. | |
| 6,619,055 B1 | 9/2003 | Addy | |
| 6,622,925 B2 | 9/2003 | Carner et al. | |
| 6,657,418 B2 | 12/2003 | Atherton | |
| 6,743,010 B2 | 6/2004 | Bridgeman et al. | |
| 6,778,091 B2 | 8/2004 | Qualey, III et al. | |
| 6,794,771 B2 | 9/2004 | Orloff | |
| 6,798,341 B1 | 9/2004 | Eckel et al. | |
| 6,886,754 B2 | 5/2005 | Smith et al. | |
| 6,956,463 B2 | 10/2005 | Crenella et al. | |
| 7,174,239 B2 | 2/2007 | Butler et al. | |
| 7,200,467 B2 | 4/2007 | Schanin et al. | |
| 7,476,988 B2 | 1/2009 | Mulhouse et al. | |
| 7,510,126 B2 | 3/2009 | Rossi et al. | |
| 7,537,171 B2 | 5/2009 | Mueller et al. | |
| 7,571,865 B2 | 8/2009 | Nicodem et al. | |
| 7,579,945 B1 | 8/2009 | Richter et al. | |
| 7,592,923 B2 | 9/2009 | Lax | |
| 7,648,077 B2 | 1/2010 | Rossi et al. | |
| 7,673,809 B2 | 3/2010 | Juntunen | |
| 7,748,640 B2 | 7/2010 | Roher et al. | |
| 7,755,220 B2 | 7/2010 | Sorg et al. | |
| 7,775,452 B2 | 8/2010 | Shah et al. | |
| 7,841,542 B1 | 11/2010 | Rosen | |
| 7,900,849 B2 | 3/2011 | Barton et al. | |
| 7,982,602 B2 | 7/2011 | Kates | |
| 7,994,928 B2 | 8/2011 | Richmond | |
| 8,016,205 B2 | 9/2011 | Drew | |
| 8,091,375 B2 | 1/2012 | Crawford | |
| 8,098,166 B2 | 1/2012 | Lang | |
| 8,232,884 B2 | 7/2012 | Pattok et al. | |
| 8,255,090 B2 | 8/2012 | Frader-Thompson et al. | |
| 8,265,798 B2 | 9/2012 | Imes | |
| 8,415,829 B2 | 4/2013 | Di Cristofaro | |
| 8,706,270 B2 | 4/2014 | Fadell et al. | |
| 8,752,711 B2 | 6/2014 | Campbell et al. | |
| 2002/0044061 A1 | 4/2002 | Johnson et al. | |
| 2002/0063472 A1 | 5/2002 | Irvin | |
| 2002/0074865 A1 | 6/2002 | Zimmerman et al. | |
| 2003/0037555 A1 | 2/2003 | Street et al. | |
| 2003/0064335 A1 | 4/2003 | Canon | |
| 2003/0090243 A1 | 5/2003 | Atherton | |
| 2003/0231001 A1 | 12/2003 | Bruning | |
| 2004/0120084 A1 | 6/2004 | Readio et al. | |
| 2004/0192219 A1 | 9/2004 | Malone et al. | |
| 2004/0209209 A1 | 10/2004 | Chodacki et al. | |
| 2004/0245349 A1 | 12/2004 | Smith | |
| 2005/0043907 A1 | 2/2005 | Eckel et al. | |
| 2005/0145705 A1 | 7/2005 | Shah et al. | |
| 2005/0195757 A1 | 9/2005 | Kidder et al. | |
| 2005/0215284 A1 | 9/2005 | Su et al. | |
| 2005/0270151 A1 | 12/2005 | Winick | |
| 2006/0035657 A1 | 2/2006 | Lim | |
| 2006/0102731 A1 | 5/2006 | Mueller et al. | |
| 2006/0124529 A1 | 6/2006 | Rossi et al. | |
| 2006/0132301 A1 * | 6/2006 | Stilp | G05B 9/03 340/539.22 |
| 2006/0133334 A1 | 6/2006 | Ross | |
| 2006/0186214 A1 | 8/2006 | Simon et al. | |
| 2007/0045432 A1 | 3/2007 | Juntunen | |
| 2007/0095082 A1 | 5/2007 | Garrett et al. | |
| 2007/0114848 A1 | 5/2007 | Mulhouse et al. | |
| 2007/0115951 A1 | 5/2007 | Karaoguz et al. | |
| 2007/0131787 A1 | 6/2007 | Rossi et al. | |
| 2007/0228183 A1 | 10/2007 | Kennedy et al. | |
| 2007/0241203 A1 | 10/2007 | Wagner et al. | |
| 2007/0296280 A1 | 12/2007 | Sorg | |
| 2008/0001734 A1 * | 1/2008 | Stilp | G05B 9/03 340/539.22 |
| 2008/0015742 A1 | 1/2008 | Kulyk et al. | |
| 2008/0054082 A1 | 3/2008 | Evans et al. | |
| 2008/0054084 A1 | 3/2008 | Olson | |
| 2008/0094010 A1 | 4/2008 | Black | |
| 2008/0133956 A1 | 6/2008 | Fadell | |
| 2008/0147242 A1 | 6/2008 | Roher et al. | |
| 2009/0099697 A1 | 4/2009 | Li et al. | |
| 2009/0140057 A1 | 6/2009 | Leen | |
| 2009/0194601 A1 | 8/2009 | Flohr | |
| 2009/0195349 A1 | 8/2009 | Frader-Thompson et al. | |
| 2009/0236433 A1 | 9/2009 | Mueller et al. | |
| 2009/0241697 A1 | 10/2009 | Kato et al. | |

(56) References Cited

U.S. PATENT DOCUMENTS

| | | |
|---|---|---|
| 2009/0259713 A1 | 10/2009 | Blumrich et al. |
| 2010/0006660 A1 | 1/2010 | Leen et al. |
| 2010/0070099 A1 | 3/2010 | Watson et al. |
| 2010/0084482 A1 | 4/2010 | Kennedy et al. |
| 2010/0084918 A1 | 4/2010 | Fells et al. |
| 2010/0106305 A1 | 4/2010 | Pavlak et al. |
| 2010/0106322 A1 | 4/2010 | Grohman |
| 2010/0127881 A1 | 5/2010 | Schechter et al. |
| 2010/0182743 A1 | 7/2010 | Roher |
| 2010/0193592 A1 | 8/2010 | Simon et al. |
| 2010/0238036 A1 | 9/2010 | Holcombe |
| 2010/0304770 A1 | 12/2010 | Wietfeldt et al. |
| 2011/0025257 A1 | 2/2011 | Weng |
| 2011/0045867 A1 | 2/2011 | Jeung et al. |
| 2011/0152024 A1 | 6/2011 | Kuehl |
| 2011/0241624 A1 | 10/2011 | Park et al. |
| 2011/0253796 A1 | 10/2011 | Posa et al. |
| 2012/0017611 A1 | 1/2012 | Coffel et al. |
| 2012/0126019 A1 | 5/2012 | Warren et al. |
| 2012/0248211 A1 | 10/2012 | Warren et al. |
| 2013/0093594 A1 | 4/2013 | Brigham et al. |
| 2013/0176401 A1* | 7/2013 | Monari ............. H04N 5/2252 348/47 |
| 2014/0013361 A1* | 1/2014 | Monari ............. H04N 5/2252 725/62 |
| 2014/0279122 A1 | 9/2014 | Luna |
| 2014/0324410 A1 | 10/2014 | Mathews et al. |
| 2014/0347478 A1 | 11/2014 | Cho et al. |
| 2015/0096876 A1* | 4/2015 | Mittleman ............. H01H 11/00 200/341 |

FOREIGN PATENT DOCUMENTS

| | | |
|---|---|---|
| CN | 101849311 | 9/2010 |
| EP | 0207295 | 1/1987 |
| EP | 510807 | 3/1992 |
| EP | 660287 | 12/1994 |
| EP | 690363 | 6/1995 |
| EP | 1184804 | 3/2002 |
| EP | 2302326 | 8/2005 |
| EP | 2769275 | 8/2014 |
| GB | 2294828 | 5/1996 |
| JP | 09298780 | 11/1997 |
| TW | 535320 | 6/2003 |
| TW | 200709529 | 3/2007 |
| TW | 201232994 | 8/2012 |
| WO | WO 2008054938 | 5/2008 |
| WO | WO 2011131938 | 10/2011 |
| WO | WO 2012068437 | 5/2012 |
| WO | WO 2013058820 | 4/2013 |

OTHER PUBLICATIONS

First Action Interview Office Action Summary dated on May 29, 2015 for U.S. Appl. No. 14/463,550, filed Aug. 19, 2014, all pages.
International Preliminary Report on Patentability issued Apr. 22, 2014, for International Patent Application No. PCT/US2012/030084 filed Mar. 22, 2012, 5 pgs.
International Preliminary Report on Patentability issued on Feb. 25, 2014 for International Patent Application No. PCT/US2011/061344 filed on Nov. 18, 2011, 7 pgs.
International Search Report and Written Opinion mailed Jul. 6, 2012 for International Patent Application No. PCT/US2012/030084 filed Mar. 22, 2012, 6 pgs.
International Search Report and Written Opinion mailed on Feb. 20, 2014 for International Application No. PCT/US2013/061021, 18 pgs.
International Search Report and Written Opinion mailed on Jul. 14, 2014 for International Patent Application PCT/US14/22834 filed Mar. 10, 2014, all pages.
ISR/WO issued on Jun. 7, 2012 for International Patent Application No. PCT/US2011/061344 filed on Nov. 18, 2011, 9 pages.
Pre-Interview Communication dated on Feb. 27, 2015 for U.S. Appl. No. 14/457,492, filed Aug. 12, 2014, 2 pgs.
Rauchwarnmelder, Design (online), GIRA (retrieved on Mar. 7, 2013). (retrieved from the internet: <URL: http://gira.de/gebaeudetechnik/produkte/sicherheit/rauchwarnmelderdualvds.html?vid=1145>; 2 pgs.
Rauchwarnmelder, Installation and User Manual (online). GIRA (retrieved on Mar. 8, 2013). Retrieved from the internet: <URL: http://download.gira.de/data2/23301210.pdf.
Rauchwarnmelder, Datasheet (online), GIRA (retrieved on Mar. 7, 2013). (retrieved from the internet: <URL: http://gira.de/gebaeudetechnik/produkte/sicherheit/rauchwarnmelderdualvds.html>; 6 pgs.
SA720 Smoke Alarm User Manual, First Alert, Aug. 2007, 6 pgs.
Shadrach, Energy Scavenging for Wireless Sensor Nodes with a Focus on Vibration to Electricity Conversion, Dissertation [online], retrieved from the Internet: <URL: http://users.cecs.anu.edu.au/-Shad.Roundy/paper/ShadThesis.pdf>, Jun. 2003, 297 pages.
Smoke Alarm User Manual, Kidde, i9060, Dec. 1, 2009, 2 pgs.
U.S. Appl. No. 13/034,678, Non-Final Office Action mailed on Aug. 19, 2013, 9 pages.
U.S. Appl. No. 13/034,678, Notice of Allowance mailed on Feb. 4, 2014, 9 pages.

* cited by examiner

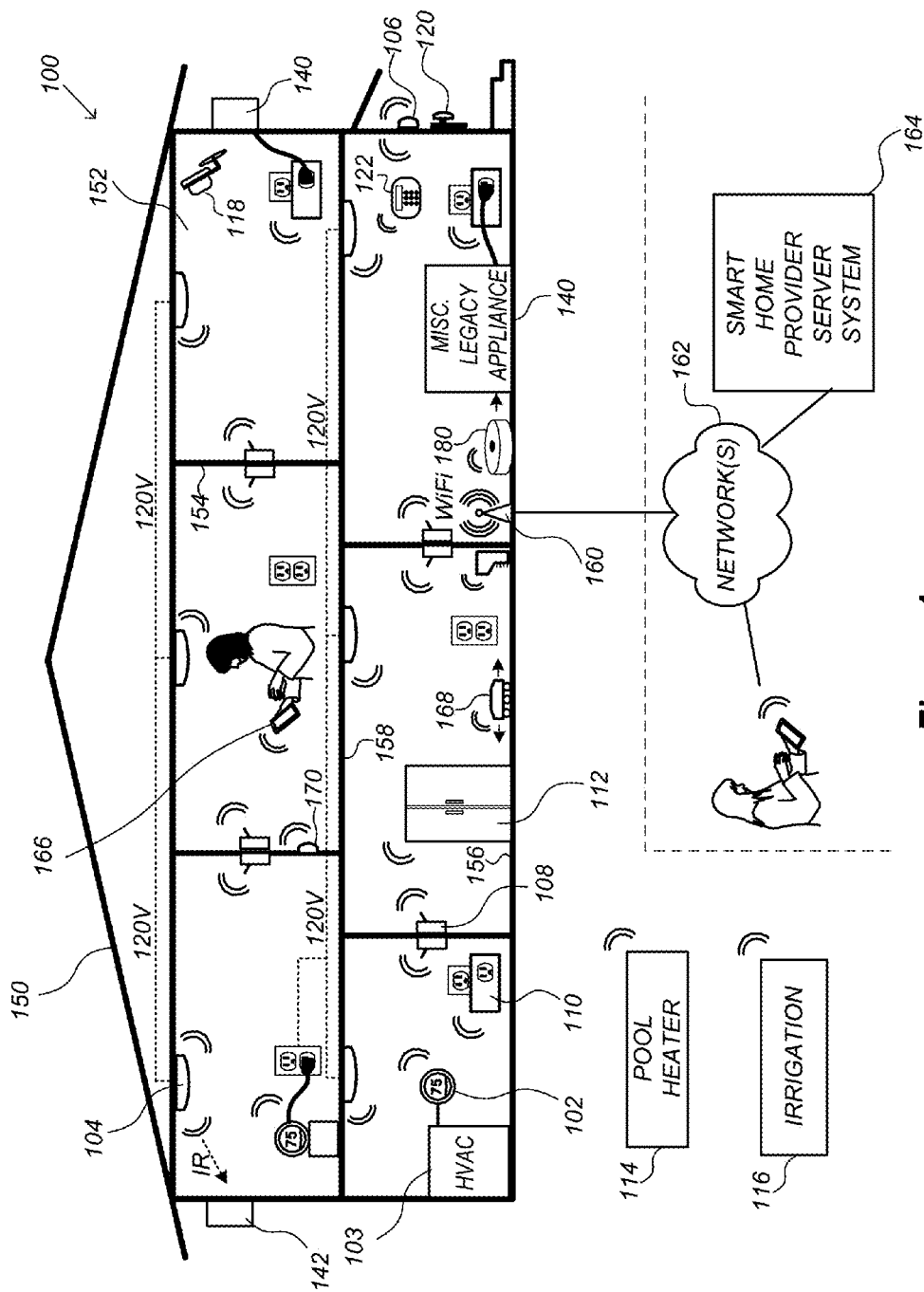

Antenna Placement inside the Camera Module

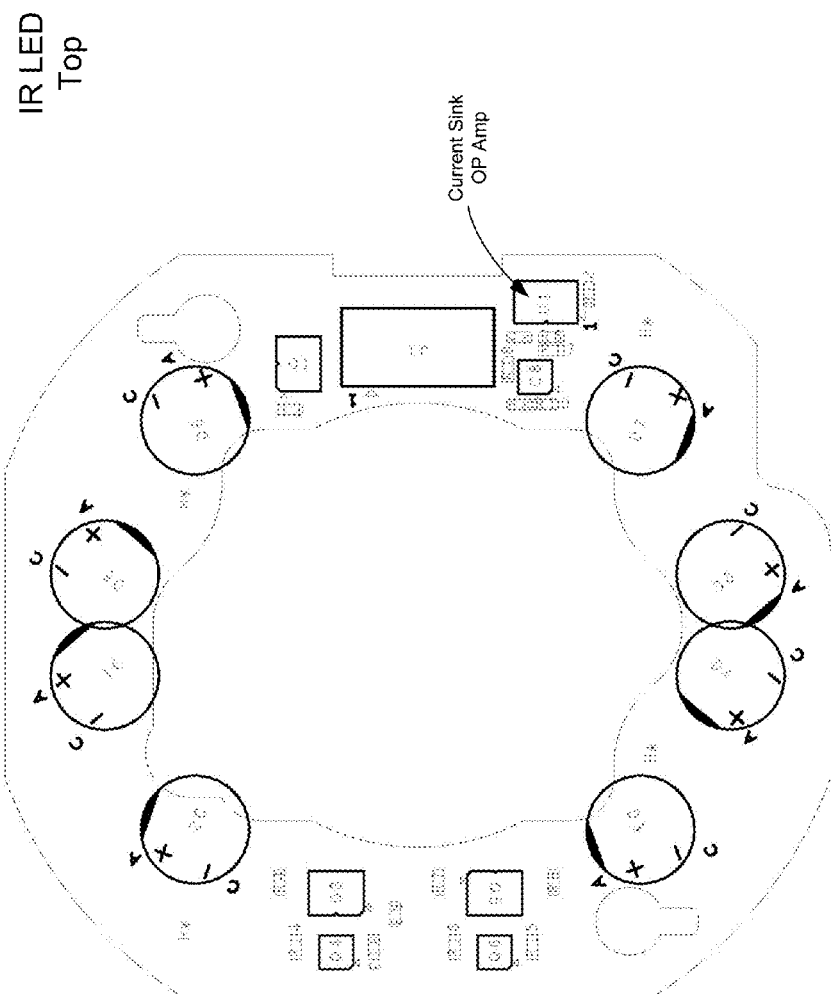

| Signal name | Description | Direction (from WiFi) | Assigned to WiFi pin |
|---|---|---|---|
| RADIO_REQ | 802.15.4 radio is requesting access to the Wireless medium | Input | L6 |
| RADIO_PRI | 802.15.4 request priority. | Input | L7 |
| WIFI_GRANT | WiFi radio is granting 802.15.4 radio access to the wireless medium | Output | L8 |

FIGURE 15C

| Name | Description | min | max |
|---|---|---|---|
| T_REQ_PERIOD | Length of holding RADIO_REQ asserted. | | |
| T_REQ_INTERVAL | Interval between RADIO_REQ | 10ms | N/A |
| T_PRI_SETUP | Setup time to establish RADIO_PRI before asserting RADIO_REQ. | 0 | N/A |
| T_REQ_LATENCY | Latency between RADIO_REQ assert and WIFI_GRANT assert. | 30us | |
| T_REVOKE_LATENCY | Latency between RADIO_REQ de-assert and WIFI_GRANT de-assert. | 30us | 3.5ms |

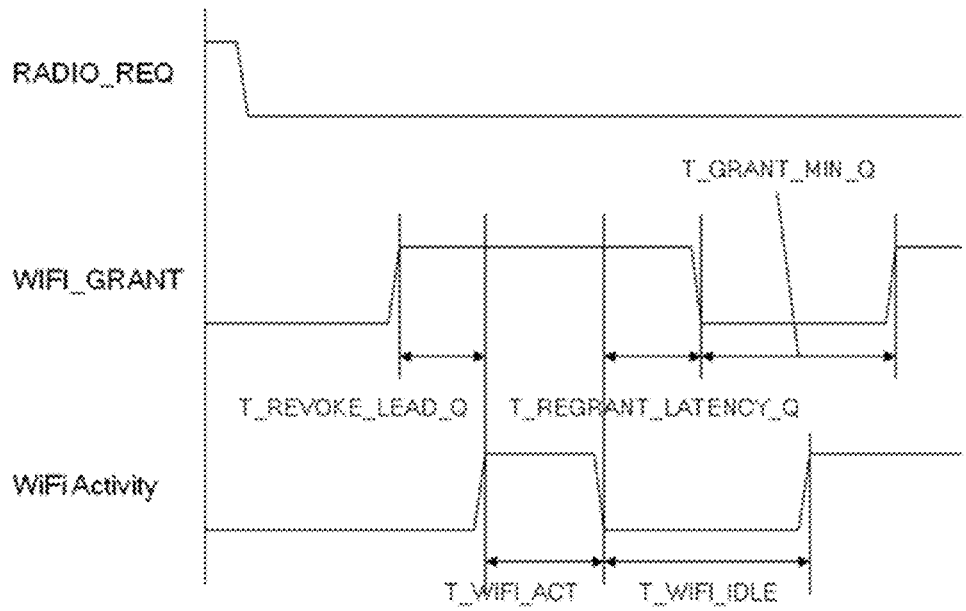

FIGURE 15E-1

| Name | Description | min | max |
|---|---|---|---|
| T_REVOKE_LEAD_Q | Lead period between WIFI_GRANT is de-asserted and WiFi transmission. | 200ns | N/A |
| T_REGRANT_LATENCY_Q | Latency between WiFi transmission is done and WIFI_GRAIT is re-asserted. | 0 | N/A |
| T_GRANT_MIN_Q | Minimum period which WIFI_GRANT can be guaranteed to be asserted. | 0 | N/A |
| T_WIFI_ACT | Period for high-priority WiFi transmission. | 400us | N/A |
| T_WIFI_IDLE | Interval between high-priority WiFi transmission request | 0 | N/A |

FIGURE 15E-2

Beacon Protection

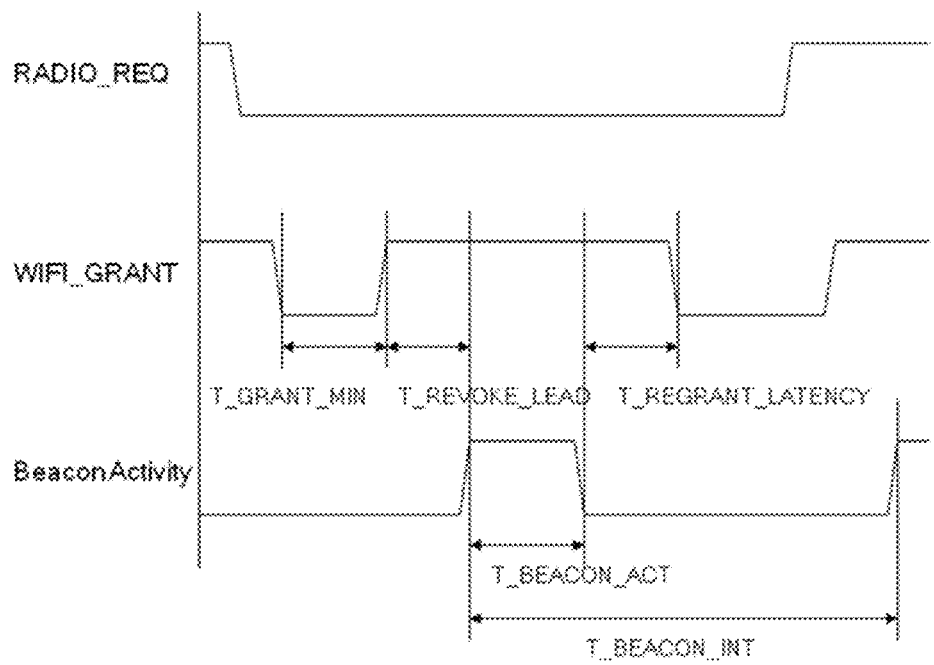

FIGURE 15F-1

| Name | Description | min | max |
|---|---|---|---|
| T_GRANT_MIN | Minimum period which WIFI_GRANT can be guaranteed to be asserted before revoked by beacon. | | N/A |
| T_REVOKE_LEAD | Lead period between WIFI_GRANT is de-asserted and WiFi beacon is scheduled to be received. | | N/A |
| T_REGRANT_LATENCY | Latency between WiFi beacon is received (or missed) and WIFI_GRANT is re-asserted. | 0 | N/A |
| T_BEACON_ACT | Period between WiFi beacon is received or missed. | | N/A |
| T_BEACON_INT | WiFi beacon interval | | N/A |

FIGURE 15F-2

| Name | Description | min | max |
|---|---|---|---|
| T_REQ_PERIOD_A | Duration to hold RADIO_REQ in alert mode. | 900us | N/A |
| T_REQ_INTEVAL_A | Interval between RADIO_REQ in alert mode. | 3100us | N/A |
| T_REQ_LATENCY_A | Latency between RADIO_REQ assert and WIFI_GRANT assert in alert mode. | 30us | 5ms (*2) |
| T_REVOKE_LATENCY_A | Latency between RADIO_REQ de-assert and WIFI_GRANT de-assert in alert mode. | 30us | 5ms (*2) |

SYSTEMS, METHODS, AND DEVICES FOR MANAGING COEXISTENCE OF MULTIPLE TRANSCEIVER DEVICES BY OPTIMIZING COMPONENT LAYOUT

RELATED APPLICATIONS

This application claims priority to U.S. Provisional Application No. 62/175,393, filed Jun. 14, 2015, entitled "Systems, Methods, and Devices for Managing Coexistence of Multiple Transceiver Devices by Optimizing Component Layout," which is hereby incorporated by reference in its entirety.

This application is related to U.S. patent application Ser. No. 14/616,302, filed Feb. 6, 2015, entitled "Systems and Methods for Processing Coexisting Signals for Rapid Response to User Input," U.S. patent application Ser. No. 13/656,189, filed Oct. 19, 2012, entitled "User-friendly, network connected learning thermostat and related systems and methods," and U.S. patent application Ser. No. 13/835,439, filed Mar. 15, 2013, entitled "Detector unit and sensing chamber therefor," which are hereby incorporated by reference in their entirety.

TECHNICAL FIELD

This relates generally to computer technology, including but not limited to methods and systems for managing coexistence of multiple transceiver devices.

BACKGROUND

Devices in a smart home environment include a host of circuit components and interfaces for enabling communications with other systems, devices, and/or servers. For example, some smart devices include multiple radios as components of a single integrated circuit collocated within a compact area for receiving and transmitting signals to other devices and across networks. As a consequence of the close physical spacing of components within smart devices, combined with close proximity to nearby conductive materials and the fact that devices often share the same or close frequency bands in operation, device components typically exhibit poor isolation from transmissions of one another. In addition to poor communications performance, sensitive device components are also at risk of damage when their input power thresholds are exceeded due to poor isolation.

SUMMARY

Accordingly, there is a need for methods, apparatuses, and systems for managing coexistence of multiple transceivers in a device. By utilizing various component layout strategies within a device, using bypass circuitry, and/or using various control signals for prioritizing transmission access, the impact and harmful effects arising from poorly isolated transceivers in a device are reduced.

In accordance with some implementations, a camera assembly includes an enclosed housing having a rear surface, a front surface, and a periphery. Furthermore, the camera assembly includes a lens module located within the housing and configured to receive light via the front surface, and communication circuitry located within the housing and configured to wireless communicate over a plurality of different communication protocols. The camera assembly further includes a first antenna arranged at a first location on an inner surface of the periphery, the first antenna configured for communication over a first one of the communication protocols, and a second antenna arranged at a second location on the inner surface of the periphery, the second location being different than the first location, the second antenna configured for communication over a second one of the communication protocols.

Another aspect includes a communications apparatus including a first and second transceiver, and a first and second antenna. The communications apparatus further includes a front end module (FEM) coupled between the first transceiver and the first antenna, the front end module including an amplifier for amplifying signals received by the first antenna, and a bypass line. The FEM is configured to couple the first antenna to the first transceiver via the bypass line when the second transceiver is active and transmitting signals using the second antenna such that a signal received via the first antenna is not amplified by the amplifier prior to being passed to the first transceiver. Furthermore, the FEM is configured to couple the first antenna to the first transceiver via the amplifier when the second transceiver is not transmitting signals using the second antenna such that a signal received via the first antenna is amplified by the amplifier prior to being passed to the first transceiver.

In accordance with some implementations, a method for communicating via a plurality of transceivers includes coupling a first transceiver of a plurality of transceivers of an electronic device to a first antenna via an amplifier such that a signal received by the first antenna is amplified by the amplifier prior to being passed to the first transceiver, in accordance with detecting that a second transceiver of the plurality of transceivers is not transmitting signals via a second antenna coupled to the second transceiver. The method further includes coupling the first transceiver to the first antenna via a bypass line such that a signal received by the first antenna is not amplified by the amplifier prior to being passed to the first transceiver, in accordance with detecting that the second transceiver is transmitting signals via the second antenna.

In accordance with some implementations, a communications apparatus including a first and second transceiver, and a first and second antenna. The communications apparatus further includes a coupling means. The coupling means is configured to couple the first antenna to the first transceiver via the bypass line when the second transceiver is active and transmitting signals using the second antenna such that a signal received via the first antenna is not amplified by the amplifier prior to being passed to the first transceiver. Furthermore, the coupling means is configured to couple the first antenna to the first transceiver via the amplifier when the second transceiver is not transmitting signals using the second antenna such that a signal received via the first antenna is amplified by the amplifier prior to being passed to the first transceiver Another aspect includes a method for communicating via a plurality of transceivers, the method performed at a camera device comprising a plurality of distinct transceivers configured for communication over respective communication protocols, one or more processors, and memory storing instructions for execution by the one or more processors. The method includes communicating using a first transceiver of the plurality of transceivers, the first transceiver configured to transmit and receive, over a first one of the communication protocols, signals for configuring the camera device. Furthermore, the method includes communicating with one or more smart home devices using a second transceiver of the plurality of transceivers, the second transceiver configured to transmit and receive, over a second one of the communication protocols, signals comprising one or more of alerts, control signals and status information to and from the one or more smart home devices. Furthermore, the method includes communicating using a third transceiver of the plurality of transceivers, the third transceiver configured to transmit and receive, over a third one of the communication protocols, data corresponding to video captured by the camera device.

In accordance with some implementations, a camera device includes a first and second antenna, and a first, second, and third transceiver. The first transceiver is configured to transmit and receive, over a first one of a plurality of distinct communication protocols, signals for configuring the camera device. Furthermore, the second transceiver is configured to transmit and receive, over a second one of the plurality of distinct communication protocols, signals comprising one or more of alerts, control signals and status information to and from the one or more smart home devices. Moreover, the third transceiver is configured to transmit and receive, over a third one of the plurality of distinct communication protocols, data corresponding to video captured by the camera device, wherein the second transceiver is coupled to the first antenna, and the first and third transceivers are coupled to the second antenna.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 1 is an example smart home environment, in accordance with some implementations.

FIGS. 11A-11M illustrate various assembly views of a camera device 118, in accordance with some implementations.

FIGS. 15A-15G illustrate a coexistence scheme for a smart device having multiple radios in smart home environment, in accordance with some implementations.

Like reference numerals refer to corresponding parts throughout the several views of the drawings.

DESCRIPTION OF IMPLEMENTATIONS

Figure 2:
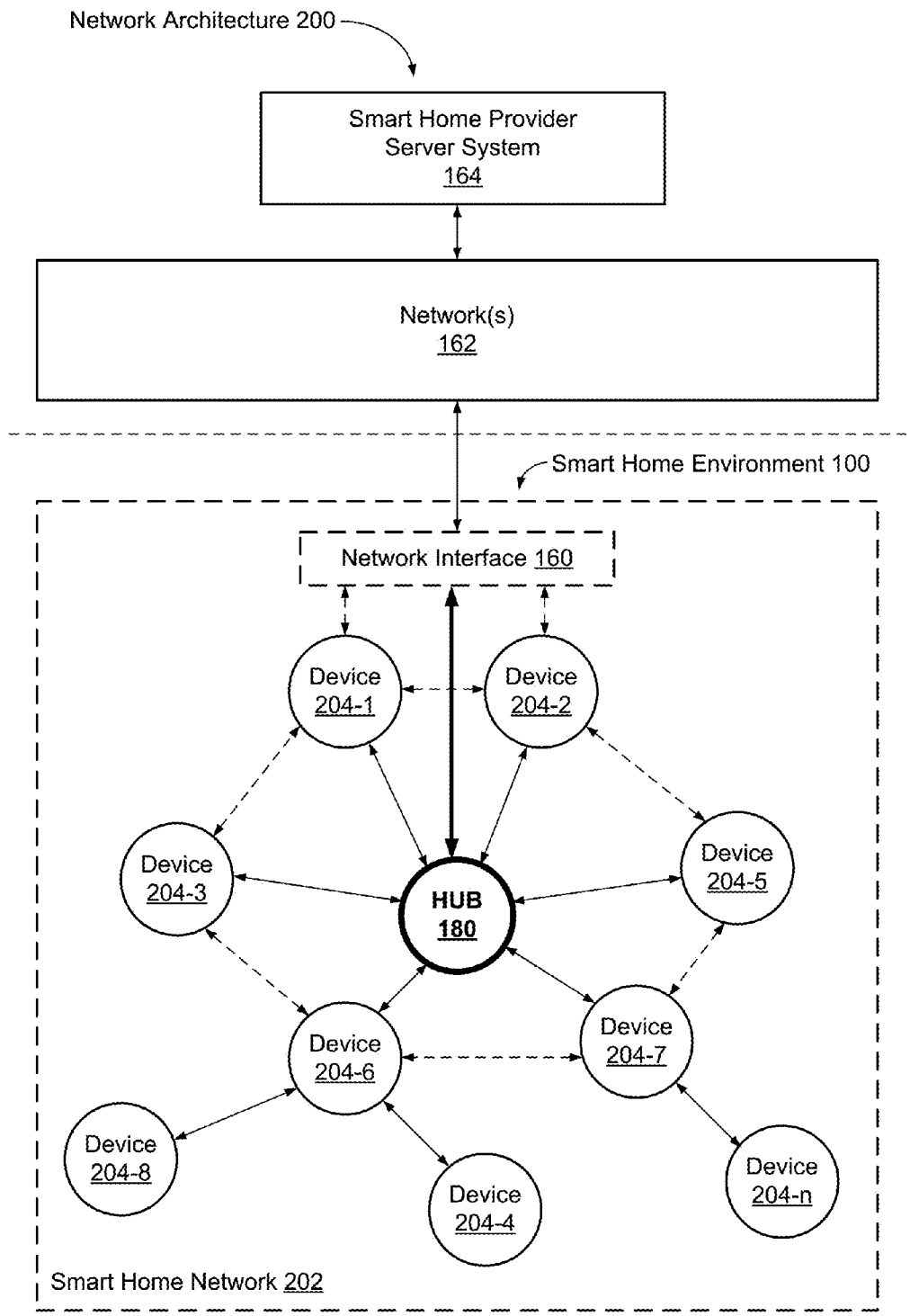
FIG. 2 is a block diagram illustrating an example network architecture that includes a smart home network, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first type of signal could be termed a second type of signal, and, similarly, a second type of signal could be termed a first type of signal, without departing from the scope of the various described implementations. The first type of signal and the second type of signal are both types of signals, but they are not the same type of signal.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Figure 15A:
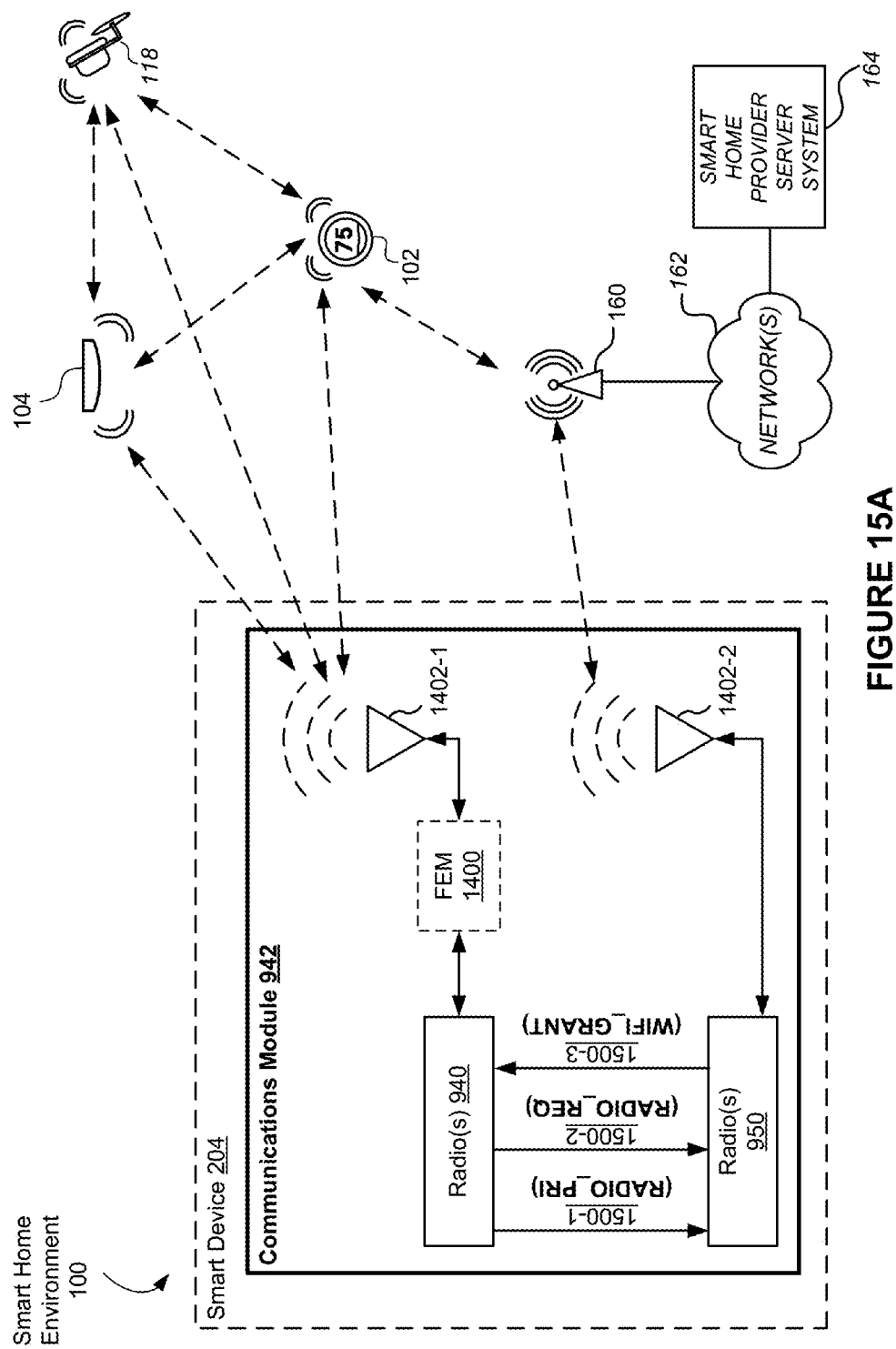
Figure 15B:
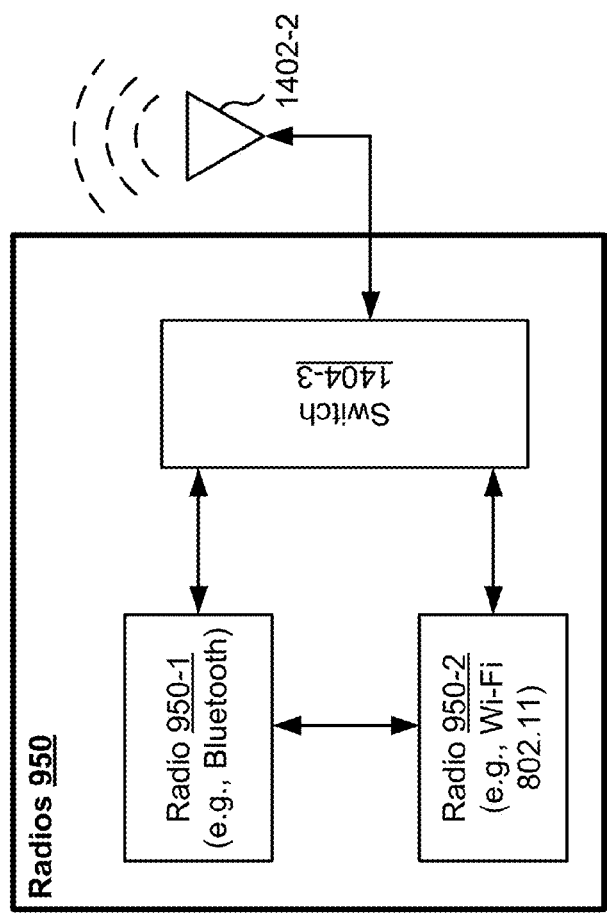
Figures 1, 2, 15D:
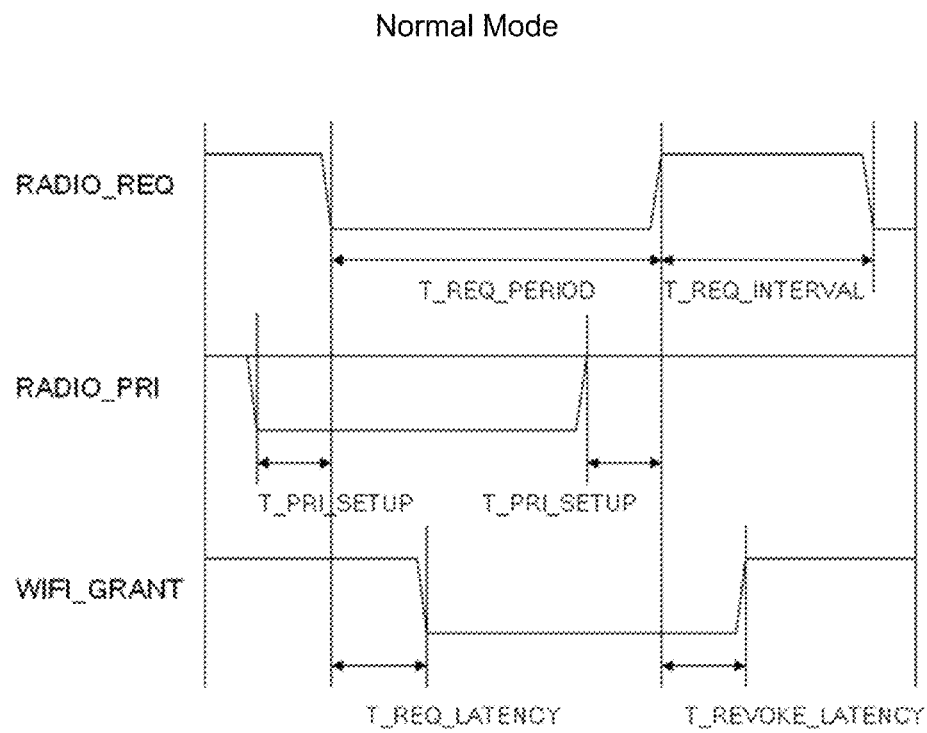

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
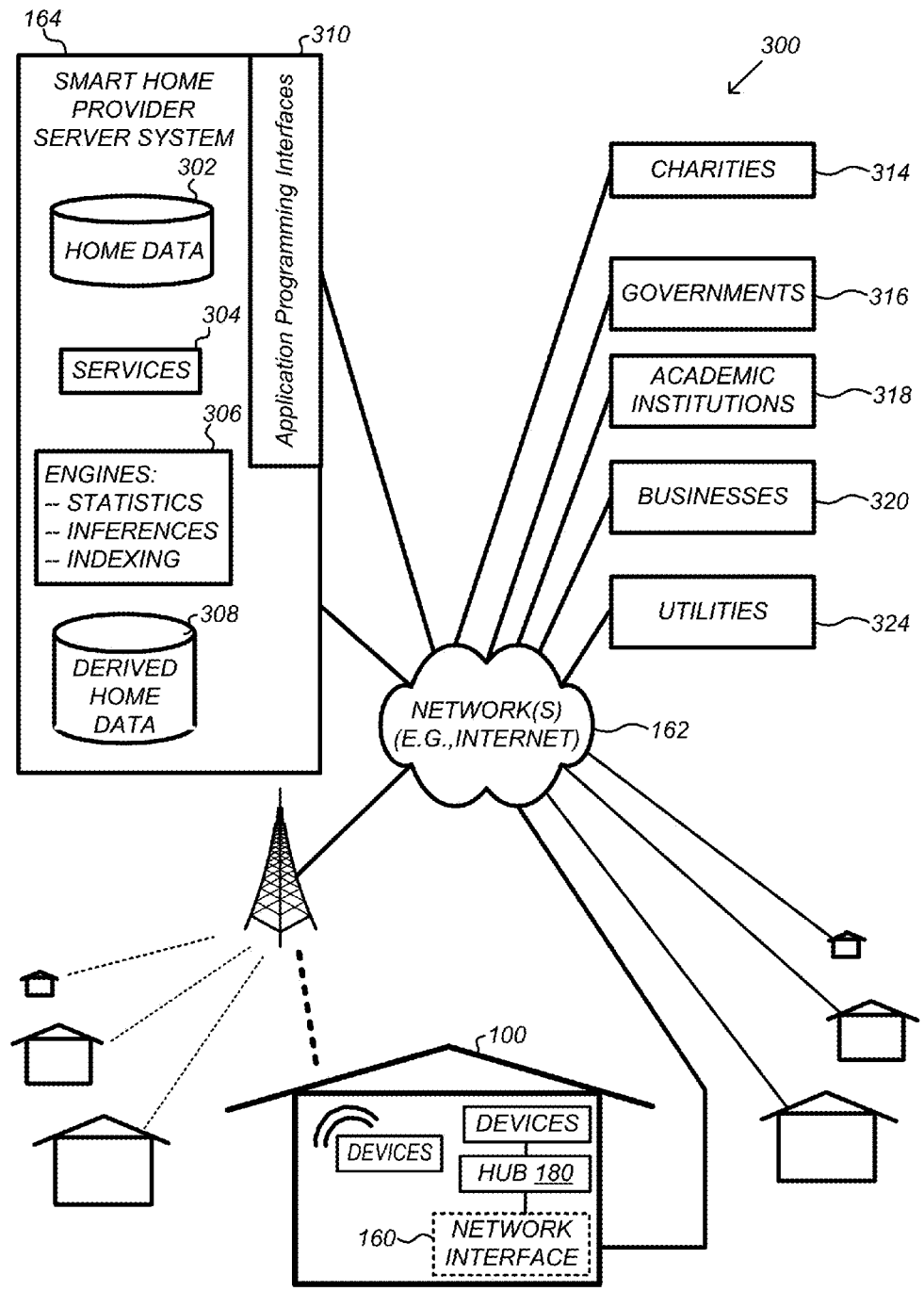
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
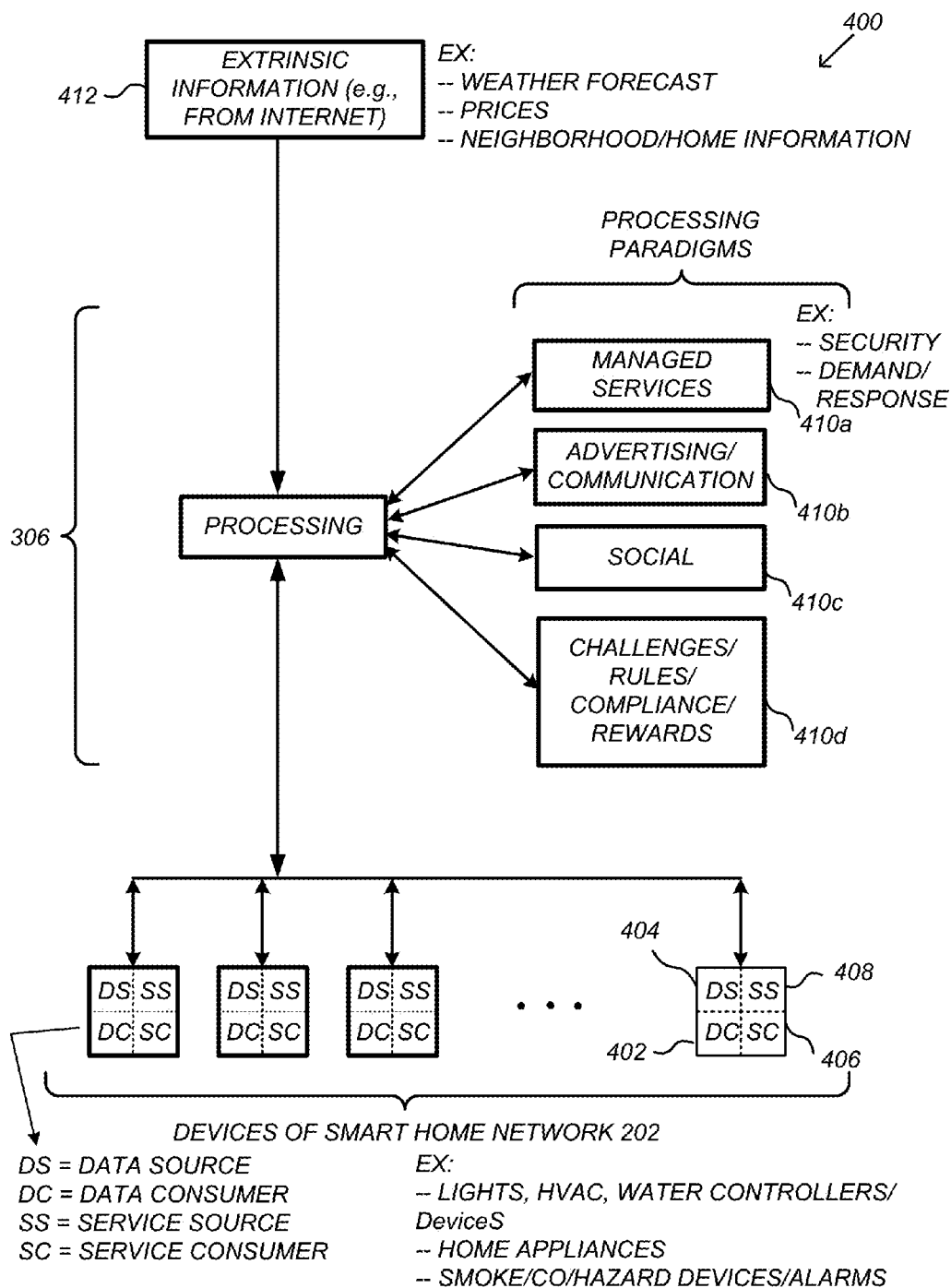
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
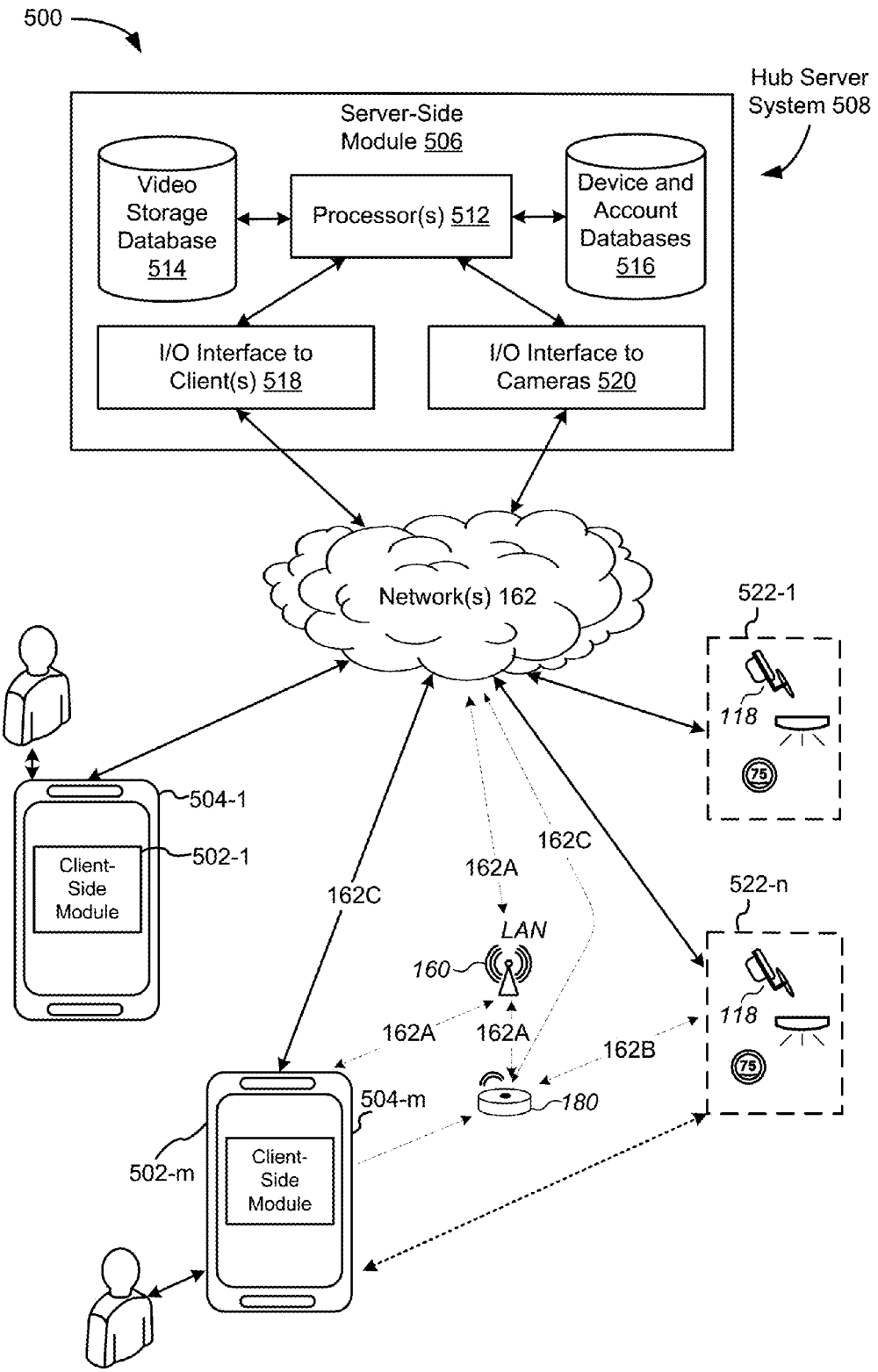
FIG. 5 is a representative operating environment in which a hub device server system interacts with client devices and hub devices communicatively coupled to local smart devices, in accordance with some implementations.

FIG. 5 illustrates a representative operating environment 500 in which a hub device server system 508 provides data processing for monitoring and facilitating review of motion events in video streams captured by video cameras 118. As shown in FIG. 5, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the hub device server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub device server system 508. In some implementations, the hub device server system 508 is a dedicated video processing server that provides video processing services to video sources and client devices 504 independent of other services provided by the hub device server system 508.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally, performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

As shown in FIG. 5, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub device server system 508 is implemented on one or more standalone data processing apparatuses or a distributed network of computers. In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 without no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

Figure 6:
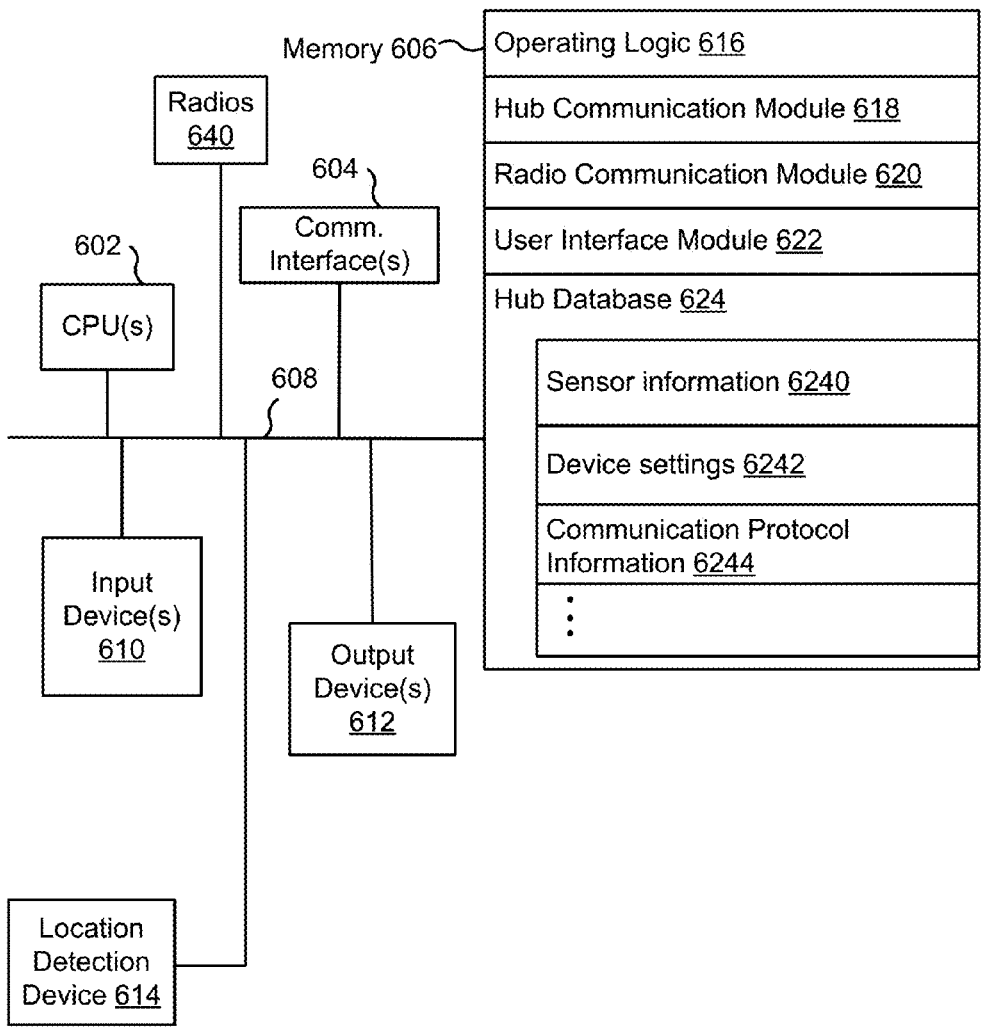
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enable and/or connect to one or more radio communication networks in the smart home environments, and allow a hub device to communicate with smart devices 204. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some implementations, the radios 640 include multiple different physical radios, each of which implements a different communication protocol. For example, in some implementations the radios 640 include a Wi-Fi radio, a Bluetooth radio and an IEEE 802.15.4 radio, all of which operate at 2.4 GHz. In some implementations, some of the radios are combined. For example, in some implementations, a Bluetooth radio and a Wi-Fi radio are incorporated in a single chip coupled to a single antenna. In other implementations, a Bluetooth radio and an IEEE 802.15.4 radio are incorporated in a single chip coupled to a single antenna. Any combination of these radios can be implemented in any of the smart devices employed in a smart home environment.

Communication interfaces 604 include, for example, hardware capable of interfacing the one or more radios 640 with the hub device 180, so as to enable data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

Operating logic 616 including procedures for handling various basic system services and for performing hardware dependent tasks;

Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);

Radio Communication Module 620 for connecting the hub device 180 to other devices (e.g., controller devices, smart devices 204 in smart home environment 100, client devices 504) via one or more radio communication devices (e.g., radios 640);

User interface module 622 for providing and displaying a user interface in which settings, captured data, and/or other data for one or more devices (e.g., smart devices 204 in smart home environment 100) can be configured and/or viewed; and Hub device database 624, including but not limited to:

Sensor information 6240 for storing and managing data received, detected, and/or transmitted by one or more sensors of the hub device 180 and/or one or more other devices (e.g., smart devices 204 in smart home environment 100);

Device settings 6242 for storing operational settings for one or more devices (e.g., coupled smart devices 204 in smart home environment 100); and Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
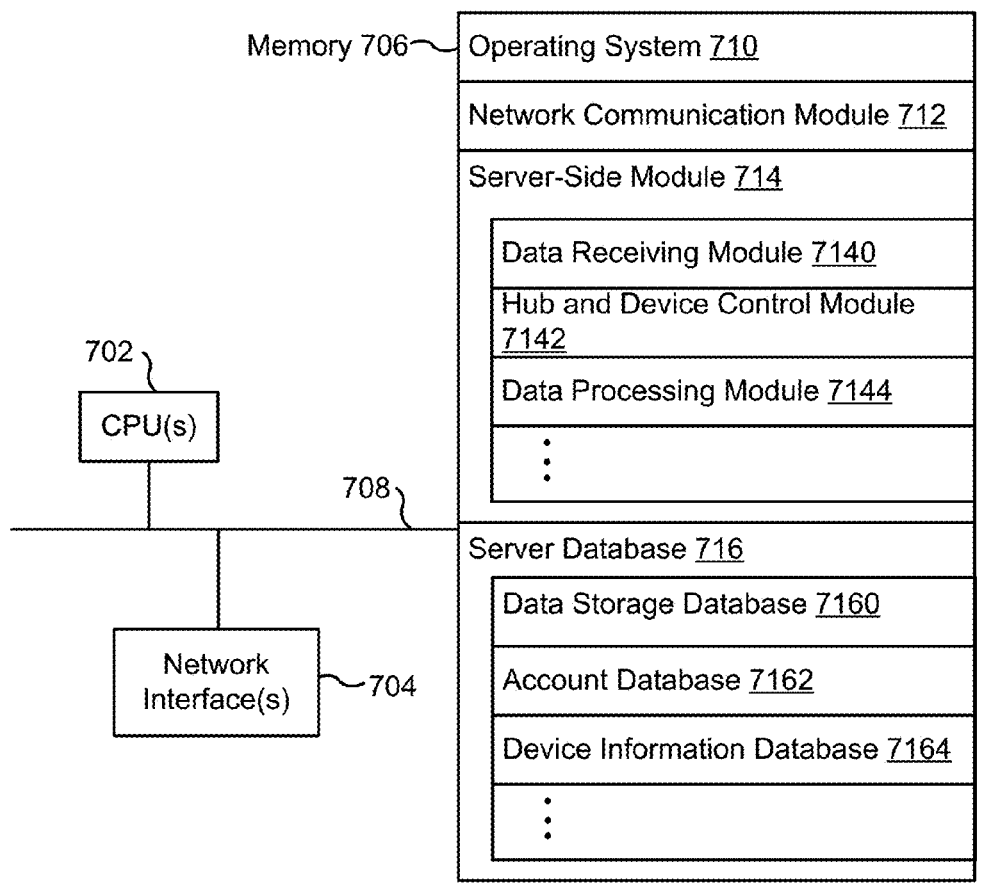
FIG. 7 is a block diagram illustrating a representative hub server system, in accordance with some implementations.

FIG. 7 is a block diagram illustrating the hub server system 508 in accordance with some implementations. The hub server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 710 including procedures for handling various basic system services and for performing hardware dependent tasks;

Network communication module 712 for connecting the hub server system 508 to other systems and devices (e.g., client devices, electronic devices, and systems connected to one or more networks 162, FIGS. 1-5) via one or more network interfaces 704 (wired or wireless);

Server-side module 714, which provides server-side functionalities for device control, data processing and data review, including but not limited to:

Data receiving module 7140 for receiving data from electronic devices (e.g., video data from a camera 118, FIG. 1) via the hub device 180, and preparing the received data for further processing and storage in the data storage database 7160;

Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 7144 for processing the data provided by the electronic devices, and/or preparing and sending processed data to a device for review (e.g., client devices 504 for review by a user); and Server database 716, including but not limited to:

Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;

Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
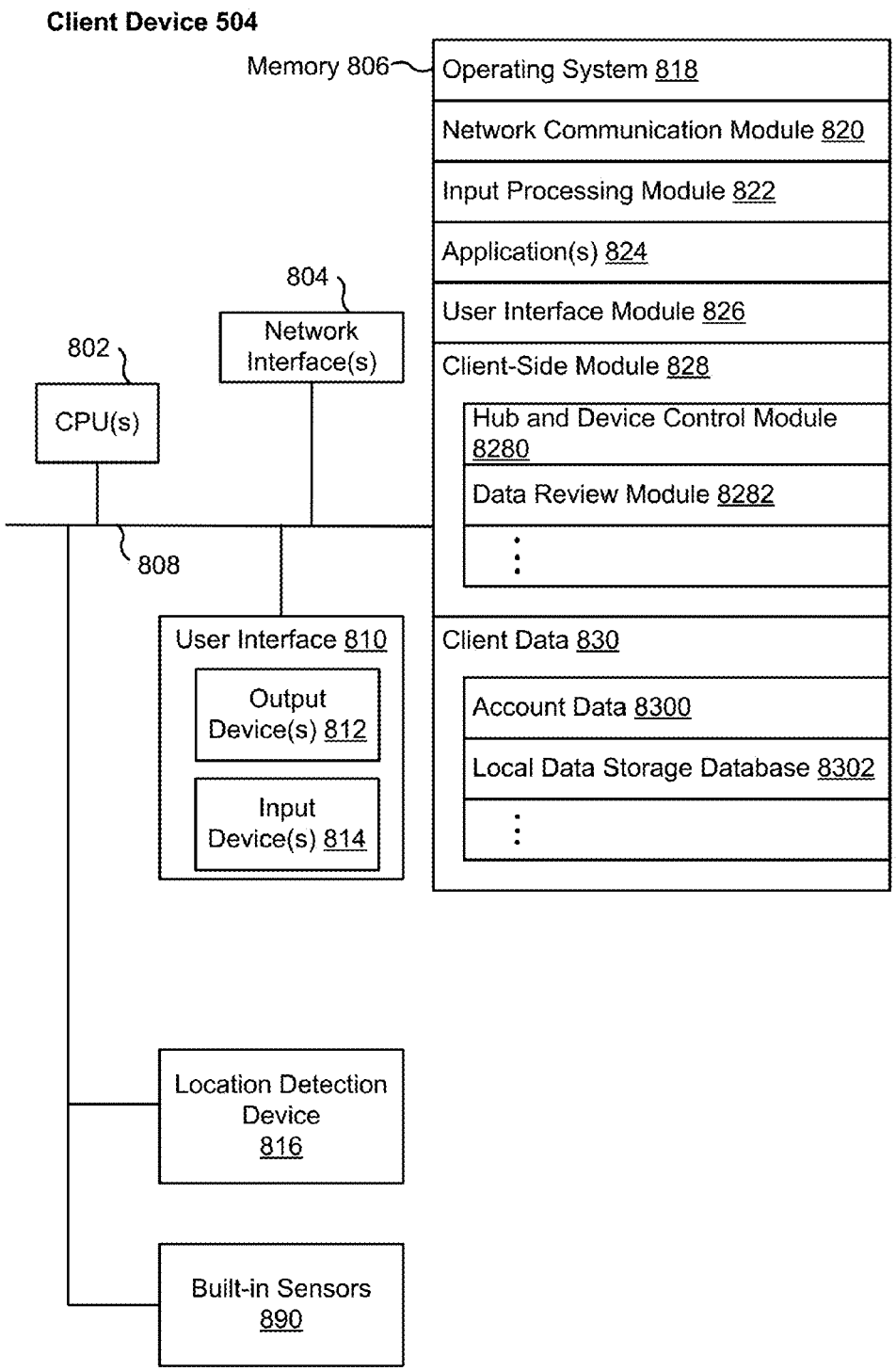
FIG. 8 is a block diagram illustrating a representative client device associated with a user account, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). Optionally, the client device also includes a user interface 810 and one or more built-in sensors 890 (e.g., accelerometer and gyroscope). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 816, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- Operating system 818 including procedures for handling various basic system services and for performing hardware dependent tasks;
- Network communication module 820 for connecting the client device 504 to other systems and devices (e.g., client devices, electronic devices, and systems connected to one or more networks 162, FIGS. 1-5) via one or more network interfaces 804 (wired or wireless);
- Input processing module 822 for detecting one or more user inputs or interactions from one of the one or more input devices 814 and interpreting the detected input or interaction;
- One or more applications 824 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- User interface module 622 for providing and displaying a user interface in which settings, captured data, and/or other data for one or more devices (e.g., smart devices 204 in smart home environment 100) can be configured and/or viewed;
- Client-side module 828, which provides client-side functionalities for device control, data processing and data review, including but not limited to:
  - Hub device and device control module 8280 for generating control commands for modifying an operating mode of the hub device or the electronic devices in accordance with user inputs; and
  - Data review module 8282 for providing user interfaces for reviewing data processed by the hub server system 508; and
- Client data 830 storing data associated with the user account and electronic devices, including, but is not limited to:
  - Account data 8300 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  - Local data storage database 8302 for selectively storing raw or processed data associated with electronic devices (e.g., of the video sources 522, such as a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Figure 9:
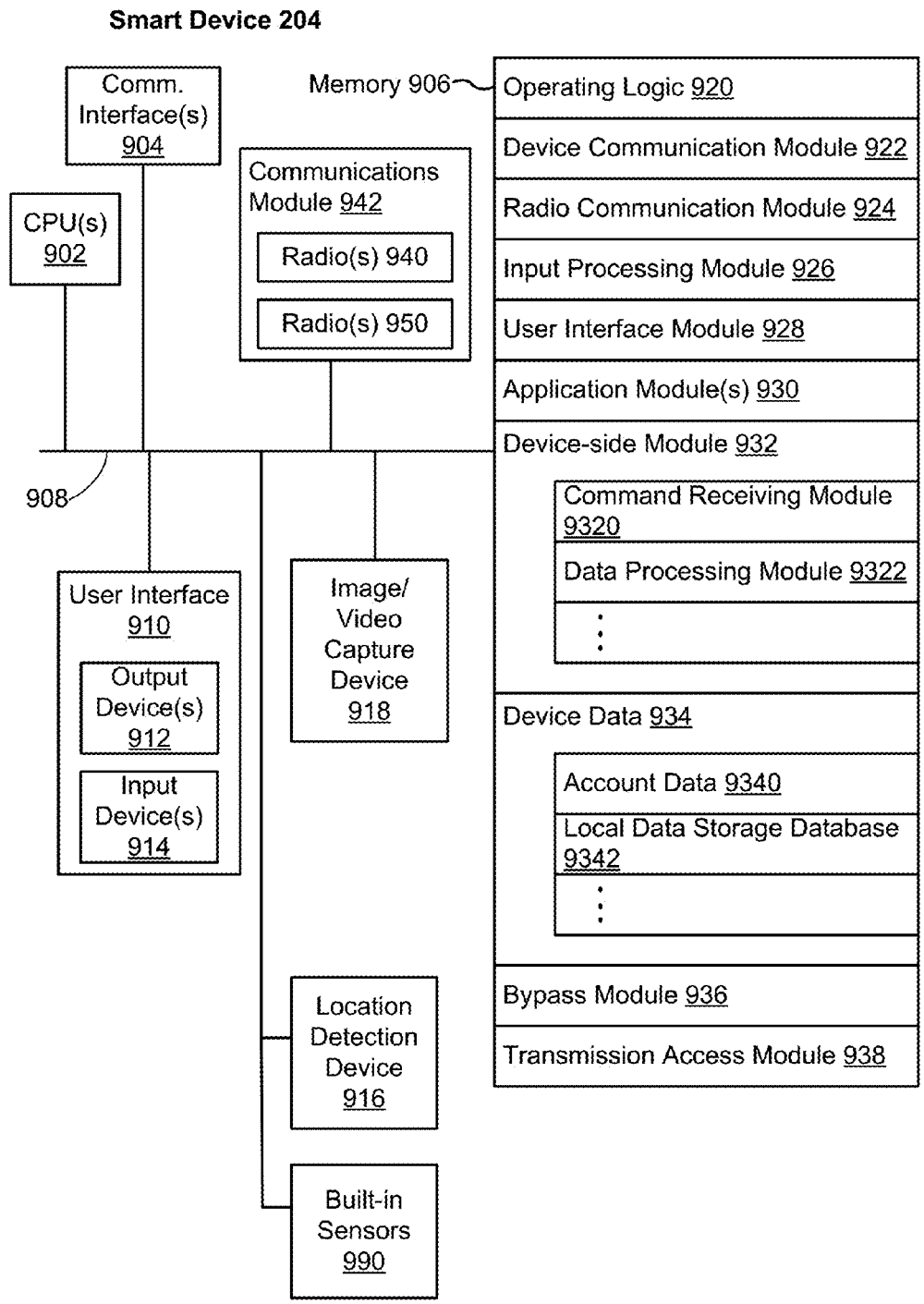
FIG. 9 is a block diagram illustrating a representative smart device, in accordance with some implementations.

FIG. 9 is a block diagram illustrating a representative smart device 204 in accordance with some implementations. In some implementations, the smart device 204 (e.g., any device of a smart home environment 100 (FIGS. 1 and 2), such as a camera 118, a smart hazard detector 104, a smart thermostat 102, hub device 180, etc.) includes one or more processing units (e.g., CPUs, ASICs, FPGAs, microprocessors, and the like) 902, memory 906, a communications module 942 that includes one or more radios 940 and radios 950, communication interfaces 904, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radio(s) 940 and radio(s) 950 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 950 include, for example, hardware capable of interfacing the one or more radios 940 and 950 with the smart device 204, so as to enable data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some implementations, each radio(s) 940 and radio(s) 950 has a respective communication interface 950 for facilitating and managing data communications for the respective radio, while in other implementations, multiple radios 940 and/or 950 are managed by a single respective communication interface 950.

In some implementations, radios 940 and/or radios 950 are configured to transmit and receive the same or distinct types of signals in the smart home environment. For example, radios 940 may include transceivers configured to transmit data between other devices (e.g., smart devices) within the smart home environment (e.g., IEEE 802.15.4 communications protocol for unilaterally/bilaterally transmitting data between and among smart devices). Signals transmitted between devices may include, for example, signals directed to critical hazard information (e.g., pings indicating the detection of smoke) or device status information (e.g., ping indicating low battery). In contrast, in some implementations, the radios 950 may include transceivers configured to transmit high-bandwidth data across data networks (e.g., IEEE 802.11 (Wi-Fi) for uploading a video stream to a smart home provider server system 164). In some implementations, the radios 940 and/or the radios 950 include transceivers configured for close-range communications with devices (e.g., Bluetooth communications protocol for device provisioning). In some implementations, the radios 940 and/or the radios 950 include transceivers configured to transmit low-power signals (e.g., smart hazard detectors 104 not connected to a persistent power source). In some implementations, radios 940 and/or radios 950 are configured to transmit multiple types of signals in the smart home environment (e.g., a Wi-Fi radio 950 uploads video stream data to the smart home provider server system 164, in addition to routing received beacons to other nearby smart devices). In some implementations, the radios 940 and/or the radios 950 of a respective device include transceivers for directly and communicably bridging the respective device to other devices (e.g., pairing devices directly via Bluetooth, rather than communicating via a router by using Wi-Fi). In some implementations, the radios 940 and/or the radios 950 are configured to translate signals received through a first radio 940, and further to re-transmit the translated signals using the first radio 940 and/or a radio 950 (e.g., a proprietary message format is received via Bluetooth and translated, where the translated messages are re-transmitted to other devices using Wi-Fi).

The communications module 942 includes a variety of components for enabling the receiving and transmitting of signals by a respective smart device 204, including one or more amplifiers, oscillators, antennas, filters, switches, memory, firmware, and/or any other support circuits or circuit components. In some implementations, the one or more radios 940 and radios 950 are integrated components of the communications module 942 (e.g., System on a Chip (SOC)). In some implementations, the one or more radios 940 and radios 950 have respective circuit components (e.g., radios 940 having a corresponding antenna 1402-1, radios 950 having a corresponding antenna 1402-2). Alternatively, the one or more radios 940 and radios 950 share one or more circuit components (e.g., radio 950-1 and radio 950-2 sharing an antenna 1402-2, FIG. 15B).

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- Operating logic 920 including procedures for handling various basic system services and for performing hardware dependent tasks;
- Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);
- Radio Communication Module 924 for connecting the smart device 204 to other devices (e.g., controller devices, smart devices 204 in smart home environment 100, client devices 504) via one or more radio communication devices (e.g., radios 940)
- Input processing module 926 for detecting one or more user inputs or interactions from the one or more input devices 914 and interpreting the detected inputs or interactions;
- User interface module 928 for providing and displaying a user interface in which settings, captured data, and/or other data for one or more devices (e.g., the smart device 204, and/or other devices in smart home environment 100) can be configured and/or viewed;
- One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

Device-side module 932, which provides device-side functionalities for device control, data processing and data review, including but not limited to:

Command receiving module 9320 for receiving, forwarding, and/or executing instructions and control commands (e.g., from a client device 504, from a smart home provider server system 164, from user inputs detected on the user interface 910, etc.) for operating the smart device 204; and Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user);

Device data 934 storing data associated with devices (e.g., the smart device 204), including, but is not limited to:

Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and Local data storage database 9342 for selectively storing raw or processed data associated with the smart device 204 (e.g., video surveillance footage captured by a camera 118);

Bypass module 936 for detecting whether radio(s) 940 and/or radio(s) 950 are transmitting signals via respective antennas coupled to the radio(s) 940 and/or radio(s) 950 (e.g., detecting whether radio 950 is transmitting via antenna 1402-2) and to accordingly couple radio(s) 940 and/or radio(s) 950 to their respective antennas either via a bypass line (e.g., bypass line 1408) or an amplifier (e.g., low noise amplifier 1406-2); and Transmission access module 938 for granting or denying transmission access to one or more radio(s) 940 and/or radio(s) 950 (e.g., based on detected control signals and transmission requests).

Each of the above identified elements may be stored in one or more of the previously mentioned memory devices, and corresponds to a set of instructions for performing a function described above. For example, in some implementations, the one or more radios 940 and radios 950 include respective memory and firmware for storing one or more programs/executable modules of the memory 906. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 10:
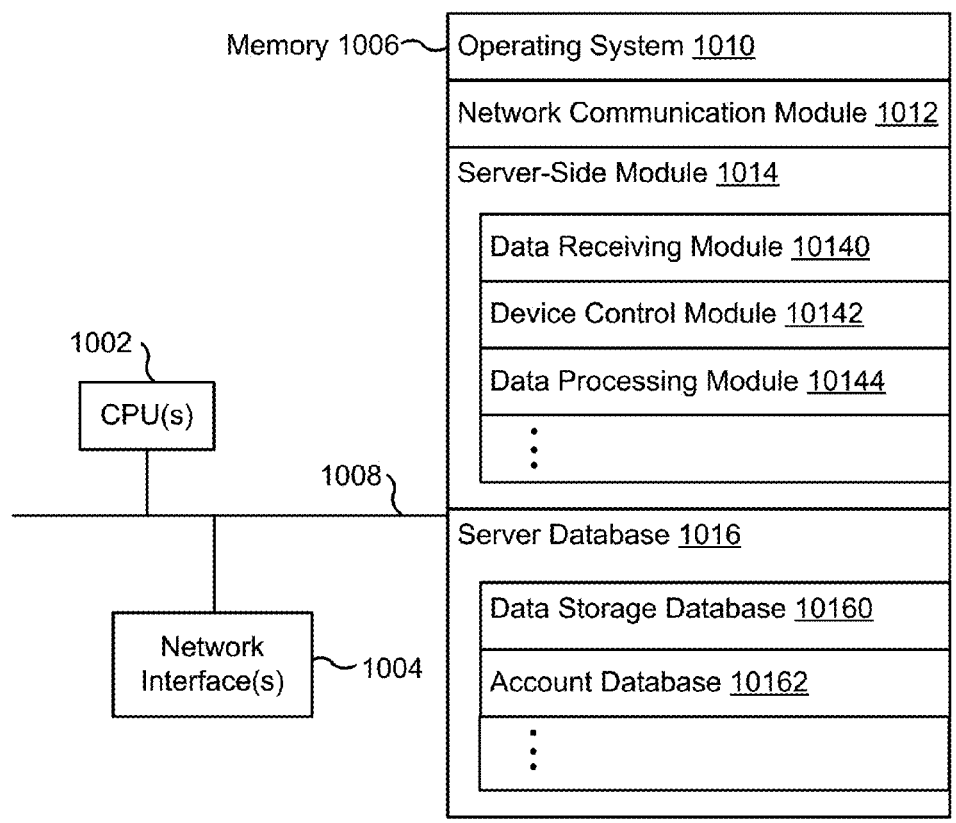
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

Operating system 1010 including procedures for handling various basic system services and for performing hardware dependent tasks;

Network communication module 1012 for connecting the smart home provider server system 164 to other systems and devices (e.g., client devices, electronic devices, and systems connected to one or more networks 162, FIGS. 1-5) via one or more network interfaces 1004 (wired or wireless);

Server-side module 1014, which provides server-side functionalities for device control, data processing and data review, including but not limited to:

Data receiving module 10140 for receiving data from electronic devices (e.g., video data from a camera 118, FIG. 1), and preparing the received data for further processing and storage in the data storage database 10160;

Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 10144 for processing the data provided by the electronic devices, and/or preparing and sending processed data to a device for review (e.g., client devices 504 for review by a user); and Server database 1016, including but not limited to:

Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub server system 508, client device 504, smart device 204, smart home provider server system 164) are interchangeable with one another and may be performed by any other devices or systems, where the corresponding submodules of these functions may additionally and/or alternatively be located within and executed by any of the devices and systems. The devices and systems shown in and described with respect to FIGS. 6-10 are merely illustrative, and different configurations of the modules for implementing the functions described herein are possible in various implementations.

As described with respect to FIGS. 6-10, devices in a smart home environment (e.g., smart devices 204 in FIG. 2, such as cameras 118, smart thermostats 102, smart hazard detectors 104, etc. of a smart home environment 100, FIG. 1) include a host of circuit components and interfaces for enabling communications with other systems, devices, and/or servers. For example, in some implementations, smart devices include a communications module (e.g., communications module 942, FIG. 9) which comprises one or more radios 940 and/or radios 950 for receiving and transmitting signals to other devices and across networks (sometimes referred to generally as "transceivers" or "transceiver devices"). In some implementations, the one or more radios 940 and radios 950 are components of a single integrated circuit (e.g., System on a Chip (SOC)). Given the typical physical compactness of smart devices, components of the communications module 942 and other components of the device are often collocated in close physical proximity with one another. For example, a typical smart device may contain multiple radio antennas, memory devices, sensors, chips, and other electronic components. As a consequence of their close physical spacing within smart devices, however, and in combination with components coming into close contact with conductive materials (e.g., metal casing, camera stand, wires, etc,), device components, such as antennas, are typically poorly isolated from transmissions of one another. Additionally, because these devices sometimes share the same or close frequency bands in operation (e.g., IEEE 802.11 (i.e., Wi-Fi) and 802.15.4 sharing 2.4 GHz frequency band), signals transmitted by one component tend to interfere with signals transmitted and/or received by other components. Ultimately, components of the communications module 942 typically achieve poor signal-to-noise ratio (SNR), distortion, degraded analog signal quality, and increased bit error rate (BER).

Furthermore, the poor isolation of these devices has an additional impact on the maximum input power of device components, since the transmission power of signals transmitting by one transceiver adds unexpectedly to the expected transmission of signals simultaneously received by other nearby transceivers. Sensitive device components are thus often risk of damage when their input power thresholds are exceeded. For example, referring to the front end module 1400 of the smart device 204 in FIG. 14, the low noise amplifier 1406-2 typically offers higher sensitivity to received signals, but consequently has a lower input power threshold than alternative amplifiers. Thus, the transmission power of antenna 1402-2, which adds to the transmission power of any signals received by antenna 1402-1, risks damaging components such as the low noise amplifier 1406-2.

Figure 22:
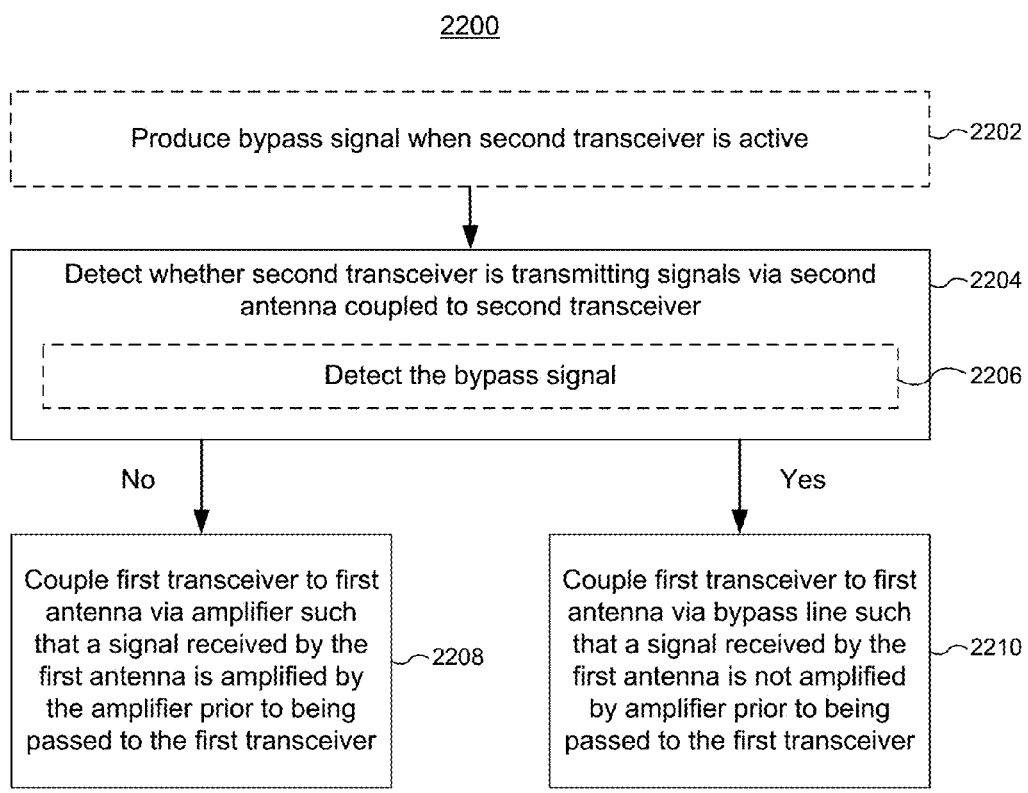
FIG. 22 is a flow diagram illustrating a method of coexistence using bypass circuitry, in accordance with some implementations.

Various schemes and techniques are described for lessening the harmful effects arising from poorly isolated transceivers in smart devices, a strategy generally referred to as coexistence. In particular, FIGS. 11-13 illustrate various component layout strategies for achieving improved coexistence for various devices, in accordance with some implementations. Furthermore, FIG. 14 illustrates a block diagram of a communications module 942 of a smart device utilizing bypass circuitry, and FIG. 22 is a flow diagram illustrating a method of coexistence using bypass circuitry, in accordance with some implementations. Moreover, FIGS. 15A-15G illustrate the use of control signals in a coexistence scheme, and FIGS. 23A-23F are flow diagrams illustrating methods of using control signals in a coexistence scheme, in accordance with some implementations.

Implementations and techniques described with respect to FIGS. 11 through 15 may be combined in whole or in part to achieve improved coexistence. For example, implementations described with respect to FIGS. 15A-15G (and corresponding methods of operation) may serve as an additional or supplementary measures for achieving optimal coexistence and operation of multiple radios in the event that implementations described with respect to FIG. 14 fail or malfunction (e.g., if the communications module 942 fails to engage the bypass line 1408, coexistence can still be achieved through software/firmware-based implementations described in FIGS. 15A-15G).

FIGS. 11A-11M illustrate various assembly views of a camera device 118, in accordance with some implementations. In particular, the embodiments illustrate the placement of the components as part of a component layout strategy for achieving improved coexistence. Components of a camera 118 (e.g., where the camera is a smart device 204, FIG. 9) and various implementations are described in greater detail throughout (e.g., FIGS. 9, 14, and 15).

Figure 11A:
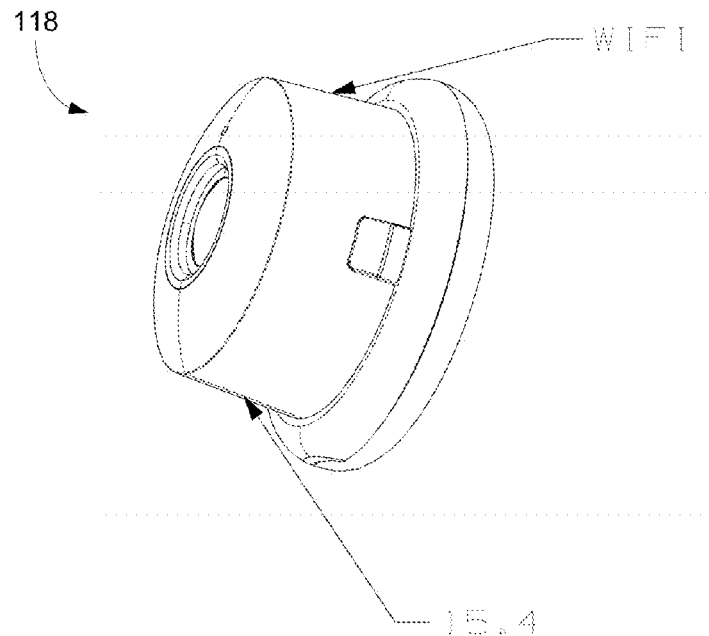
Figure 11B:
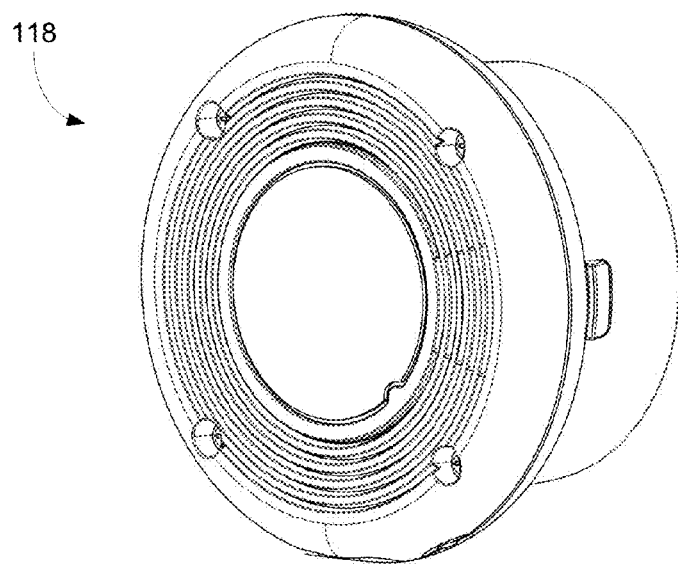

Specifically, FIGS. 11A and 11B illustrate perspective views of an assembled camera device 118. The camera device 118 captures multimedia data (image, video, and audio data) in real-time, and communicates raw or processed multimedia data to its users via a remote surveillance server. The captured raw multimedia data are optionally processed locally in the camera device 118 or remotely within the remote surveillance server.

Figure 11C:
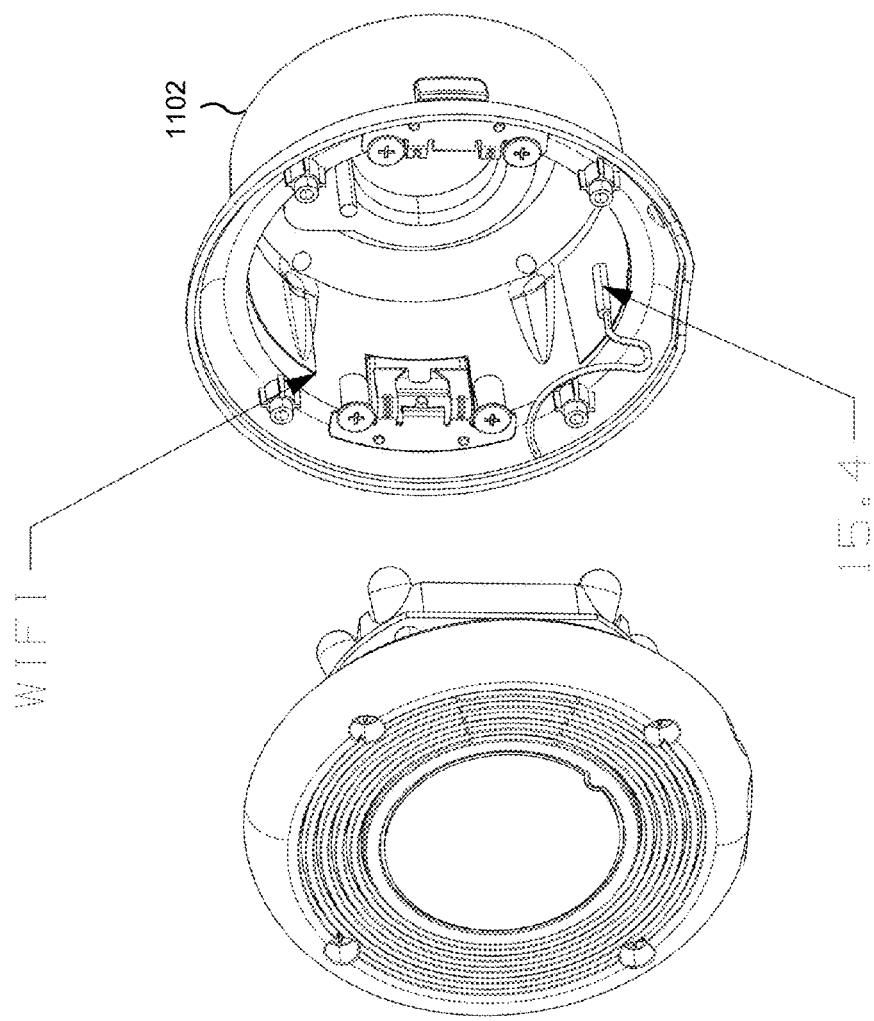
Figure 11D:
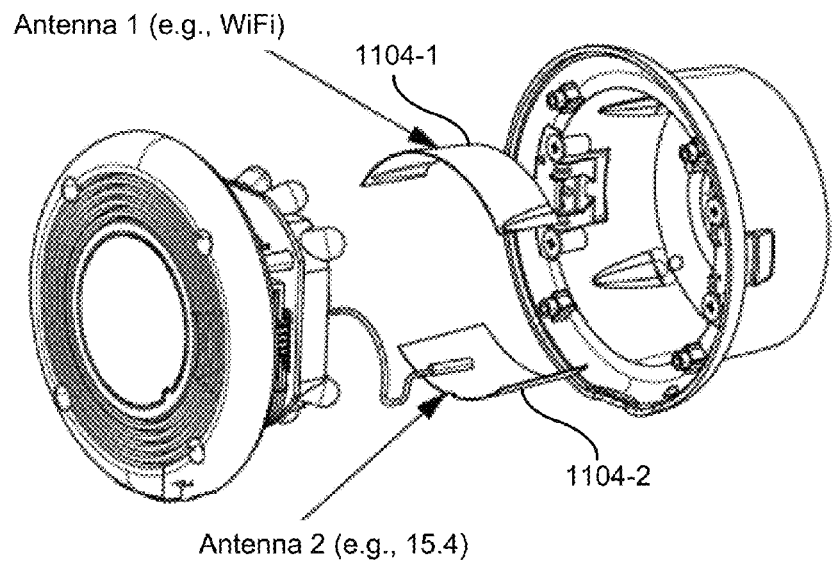
Figure 11E:
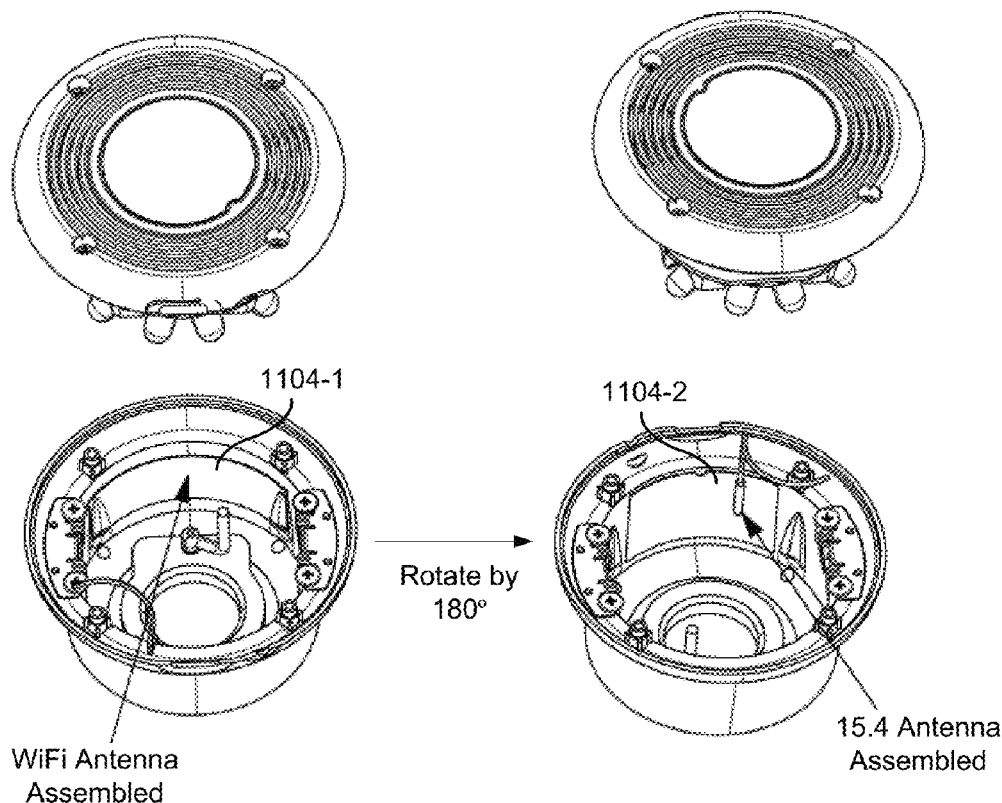

FIG. 11C illustrates a view of the camera device 118 in which the plastic cover 1102 is removed from the camera device 118 assembly. FIGS. 11D and 11E further illustrate views of the camera device 118 and the locations in which one or more antennas (e.g., 1104-1 and 1104-2) are positioned with respect to the plastic cover 1102 of the camera device 118 assembly. As shown in FIG. 11D, a cable (e.g., RF coaxial cable) connects the antenna 1104-2 to the main circuit board of the camera device 118 (which is illustrated with greater detail in FIGS. 11H and 11I. Although not shown, in some implementations, the antenna 1104-1 is also connected to the main circuit board using a similar cable.

The placement of antennas 1104 within the camera device 118 assembly is such that interference from conductive and transmitting components is minimized. Placement of antennas 1104 is based at least in part on the type of antennas used. In some implementations, antennas may be integrated into or secured by stickers or tape (or alternatively fixed using a non-conductive adhesive). By selecting the material of the enclosed housing of the camera assembly to be a less (or non) conductive material, such as plastic (e.g., plastic cover 1102), these antennas may be fixed adhesively along the inside of the enclosing housing, thereby reducing the impact of interference otherwise experienced. Antennas 1104 may also be stamped sheet metal antennas. These antennas may be constructed as three-dimensional sheet metal antennas that are mounted on the circuit board where nearby the location of the corresponding transceiver. An example is a Planar Inverted-F Antenna (PIFA) stamped metal antenna. Alternatively, antennas 1104 may be trace antennas integrated into/onto a printed circuit board (PCB). In some implementations, the trace is laminated on the surface of the PCD. In other cases, the traces may occupy several layers of a multilayer board. Chip antennas may also be used, which are passive surface mounted antenna components often made from ceramic. Optionally, antennas 1104 may be antennas external to the enclosed housing of the camera assembly.

Figure 11F:
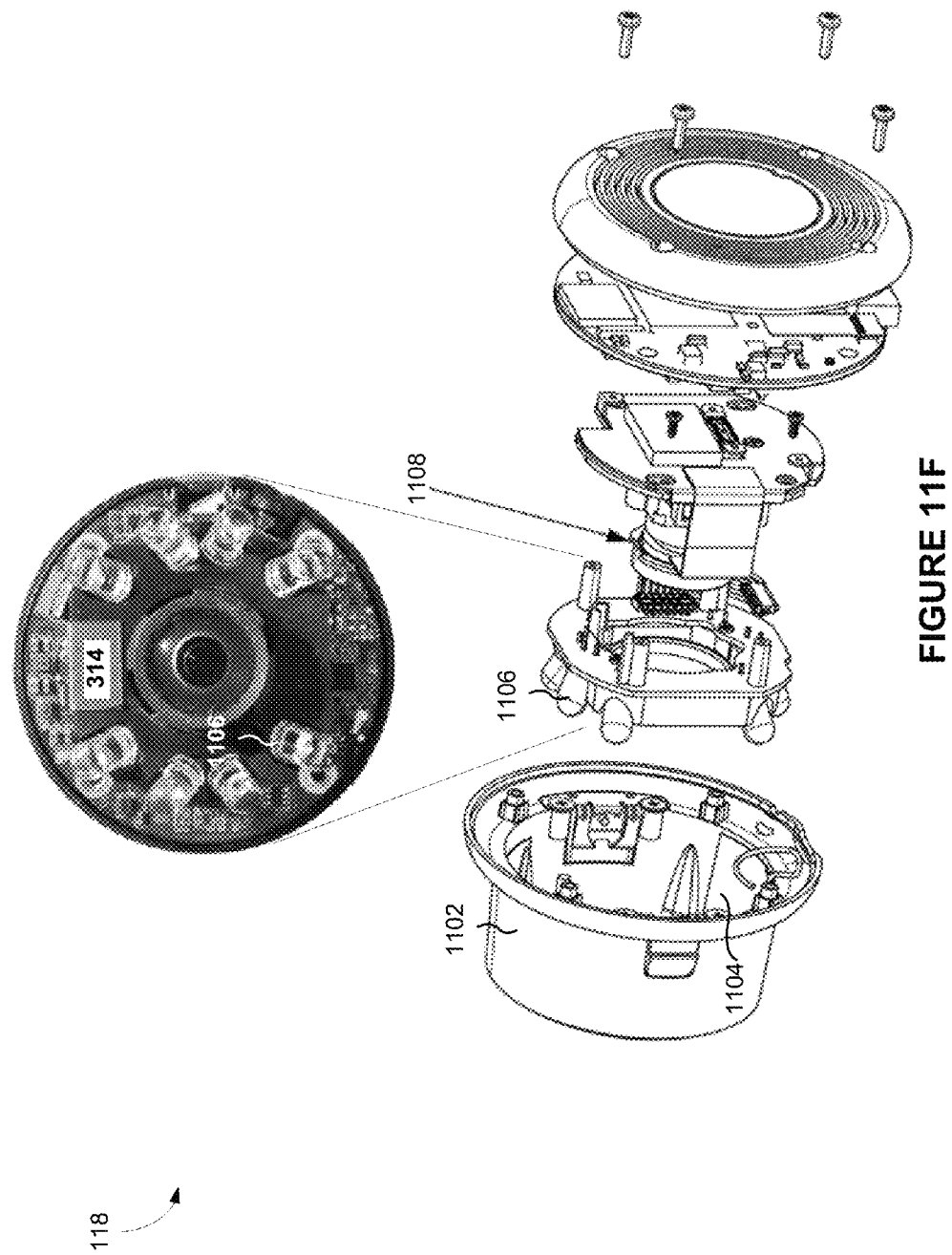

FIG. 11F is an exploded view of a camera device 118 in accordance with some implementations. This view of the camera device 118 illustrates a camera lens 1108, a plurality of LEDs 1106, the one or more antennas 1104.

In accordance with a regular monitor mode, the camera device 118 is configured to provide video monitoring and security in a smart home environment that is illuminated by visible light sources (e.g., the sun or light bulbs). In some implementations, the camera device 118 includes alternative operation modes, such as a night vision mode and a depth imaging mode. Each of the alternative operation modes is associated with a respective illumination condition. For example, in the night vision mode, the camera device 118 is configured to capture activities in the smart home environment at night when no or limited visible light illumination is available. In the depth imaging mode, the camera device 118 is configured to create a depth map or image for the corresponding field of view in the smart home environment. The depth map can be subsequently used in the regular monitor mode for accurate identification of objects in the smart home environment. In some implementations, the depth image is created based on one or more images captured when part of the field of view is selectively illuminated. Therefore, in some implementations, the camera device 118 is configured to include a LED illumination system, and use it as an internal light source to provide illumination in the smart home environment according to the respective illumination condition associated with each alternative operation mode of the camera device 118.

Specifically, in some implementations, the plurality of LEDs 1106 includes infrared LEDs 1106. The infrared LEDs 1106 are enclosed within a dark-colored, infrared-transparent plastic cover 1102 of the camera device 118, and therefore are invisible from the exterior of the camera device 118. Given that the plastic cover 1102 permits infrared light to pass through it, the camera device 118 can rely on the infrared LEDs 1106 to provide illumination at night. In the night vision mode, the plurality of LEDs is powered on to illuminate the field of view with infrared light at night. The camera device 118 includes infrared image sensors that capture infrared images or video clips of the field of view. In the depth imaging mode, the plurality of LEDs 1106 is grouped into a number of LED sets, and each LED set is selectively powered up to illuminate respective part of a field of view associated with a venue where the camera device 118 is located. Images captured in association with these LED sets are combined to generate a depth map of the entire field of view at the venue.

Alternatively, in some implementations, the plurality of LEDs 1106 is a mix of infrared and visible light LEDs, including at least one infrared LED and at least one visible light LED. In the night vision mode, the at least one infrared LED of the plurality of LEDs is powered on to illuminate the field of view with infrared light.

In some implementations, the plurality of LEDs 1106 is disposed on an internal assembly structure of the camera device 118, and configured to surround the camera lens 1108 of the camera device 118. In some implementations, as shown in the inset of FIG. 11F, each LED is optionally tilted with an angle with respect to the optical axis that passes through a center 340 of the camera lens 1108. Here, the optical axis is perpendicular to the lens surface at the center of the camera lens 1108. In some implementations, each LED is tilted away from the optical axis of the camera with the angle in the range of 20-40 degrees. In this example, the plurality of LEDs 1106 includes eight LEDs that are grouped in four pairs of LEDs. The four pairs of LEDs are disposed symmetrically within four quadrants surrounding the camera lens 1108. In some implementations, a mechanical or electrical component 314 is placed between two LED pairs or between two LEDs within a LED pair. It is noted that the camera lens 1108 can be surrounded by a number of LEDs having a different physical arrangement from the above example (e.g., the camera lens 1108 is surround by a hundred LEDs distributed uniformly in three layers surrounding the camera lens 1108).

In some implementations, the one or more antennas 1104 are attached on an interior wall of the camera cover 1102 according to the form factor of the camera device 118. Each of the one or more antennas 1104 is positioned at a respective preferred location with a respective preferred orientation with respect to the other antennas to suppress or reduce the impact from the presence and interference of the other antennas. In some situations, the receiving element 206 and the base assembly 208 are made from metal material, and each of the one or more antennas 1104 is positioned at a respective preferred location with a respective preferred orientation with respect to the receiving element 206 and the base assembly 208 to suppress or reduce the impact from their presence. To render the preferred location and orientation, each of the one or more antennas 1104 is marked with a respective alignment mark that is configured to guide assembly of the respective antenna onto the interior wall of the camera cover 1102.

In some implementations, the one or more antennas include at least a first antenna and a second antenna. The first antenna is configured to wirelessly transfer data captured by the camera device 118 over a wireless local area network (WLAN), and the second antenna is configured to communicate configuration data associated with the WLAN via a first radio network for the purposes of commissioning the camera device 118 into the WLAN. In some implementations, the camera device 118 further includes a third antenna to allow the camera device 118 to communicate with a local hub device (e.g., the hub device 180 shown in FIG. 1) via a second radio network that is distinct from the first radio network. In some implementations, the WLAN and the first and second radio networks are associated with custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.). In a specific example, the first, second and third antennas are configured to transfer their respective data wirelessly according to IEEE 802.11, IEEE 802.15.4 and ZigBee specifications, respectively.

Further, in some implementations, the one or more antennas 1104 are electrically coupled to separate wireless transmitter circuits that operate on distinct frequency bands, and transmit wireless signals at the distinct frequency bands concurrently. In some implementations, the one or more antennas 1104 are electrically coupled to a duplex filter, or a switch that controls their connections to a single wireless receiver circuit.

Figure 11G:
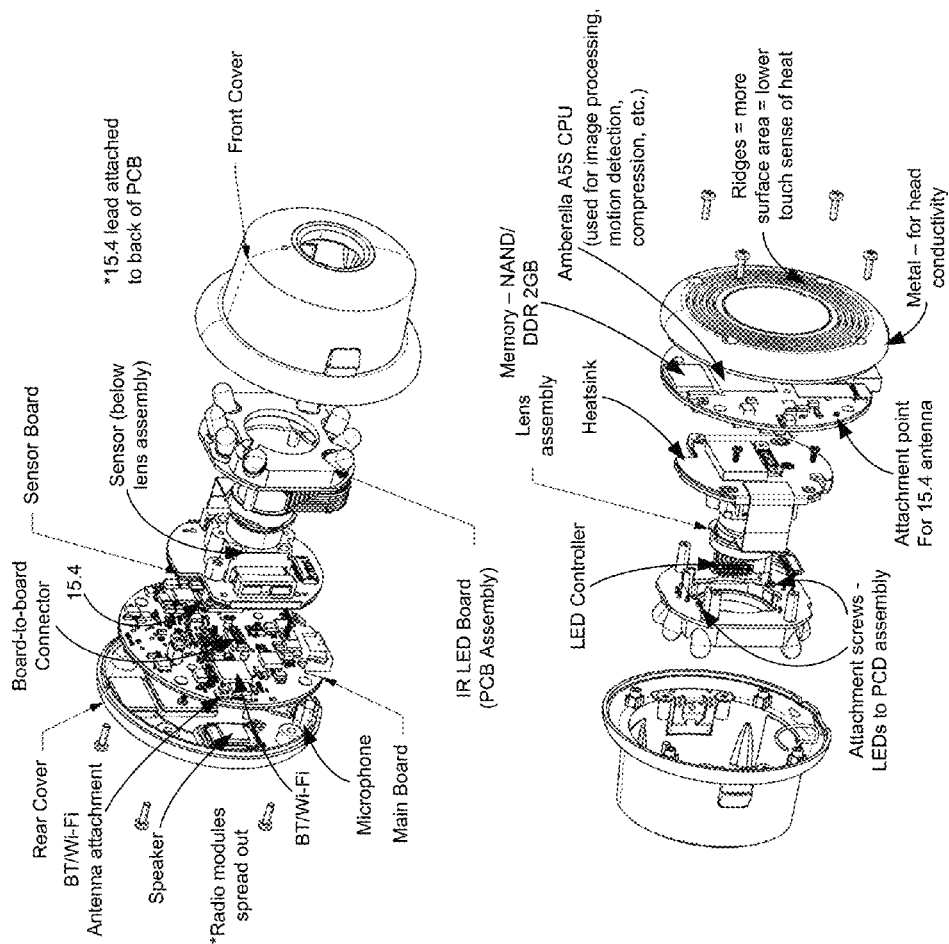
Figure 11H:
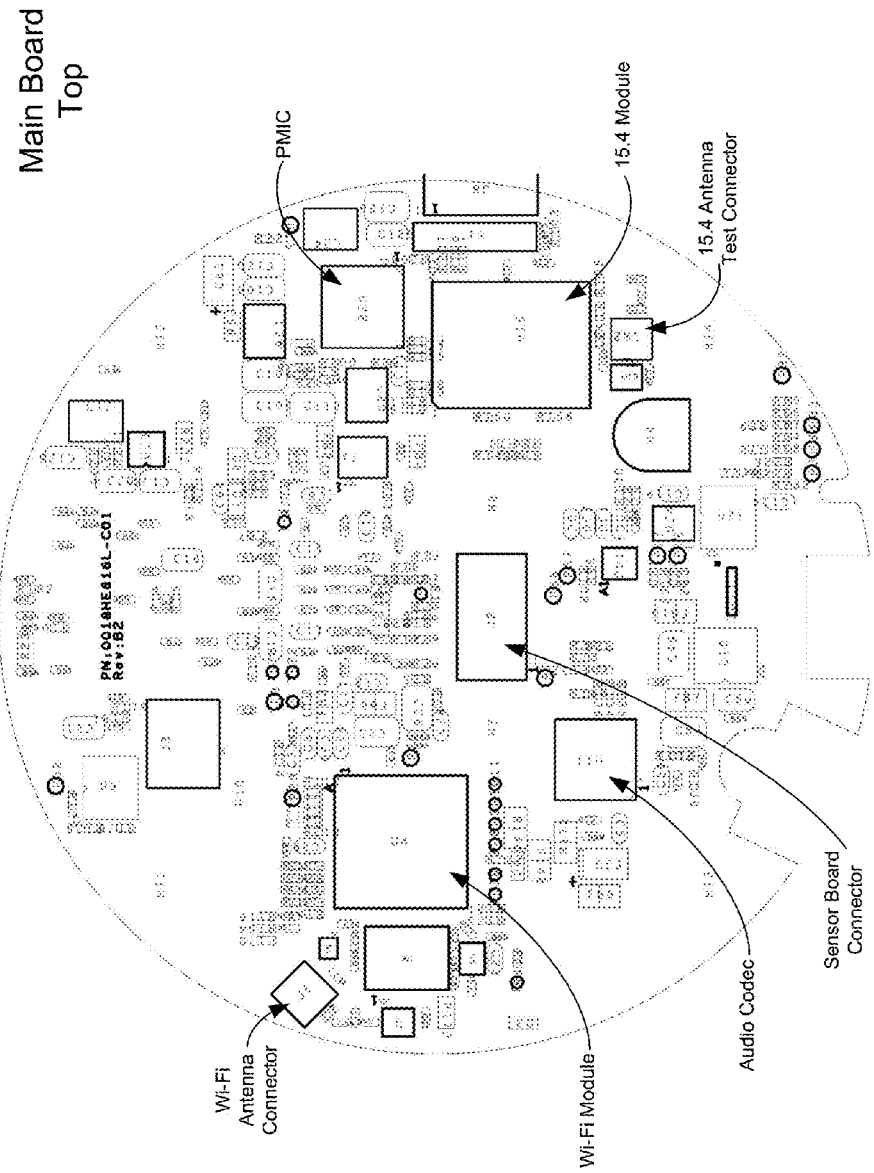
Figure 11I:
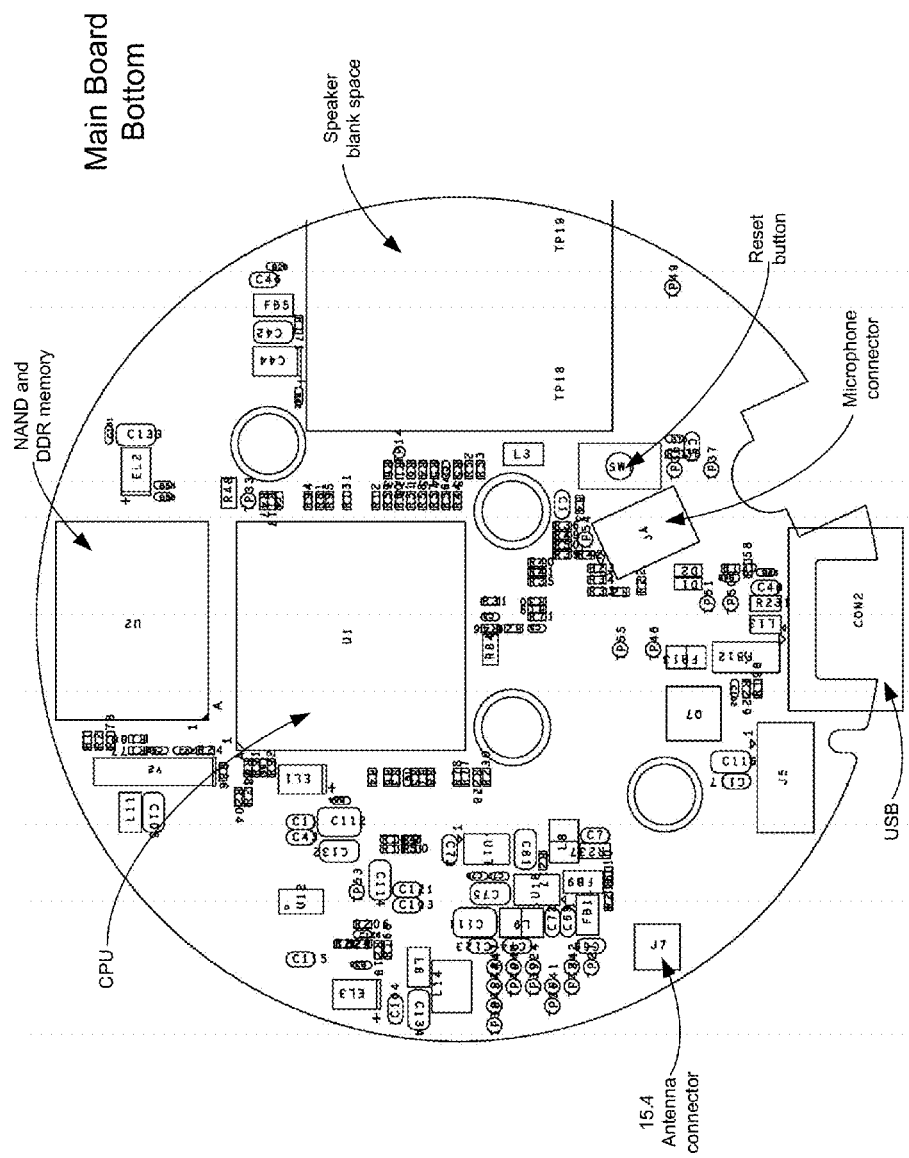
Figure 11J:
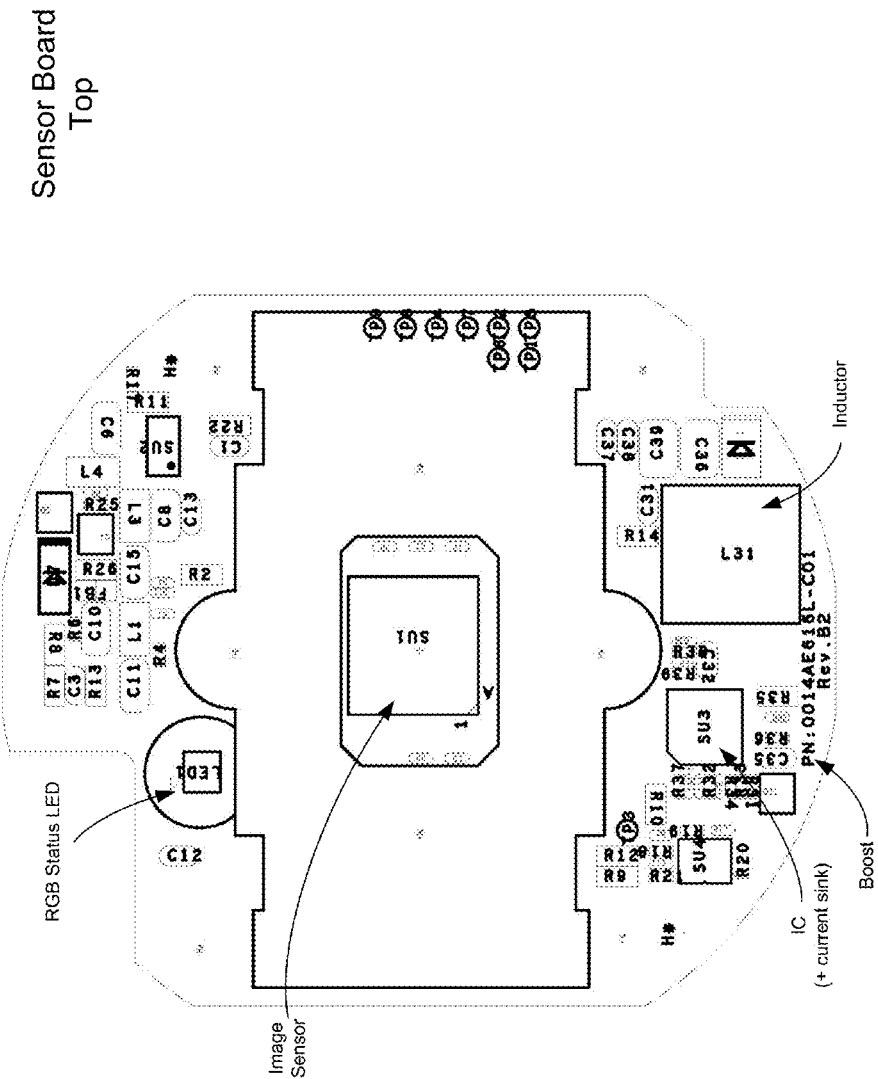
Figure 11K:
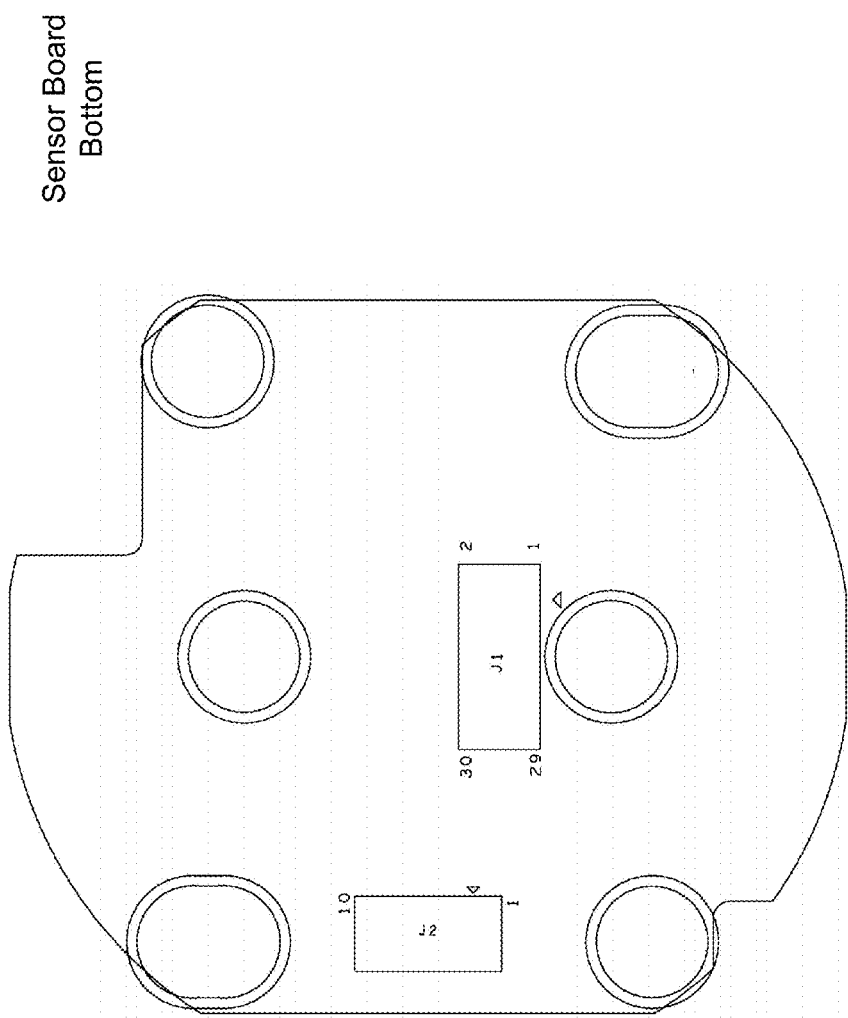
Figure 11M:
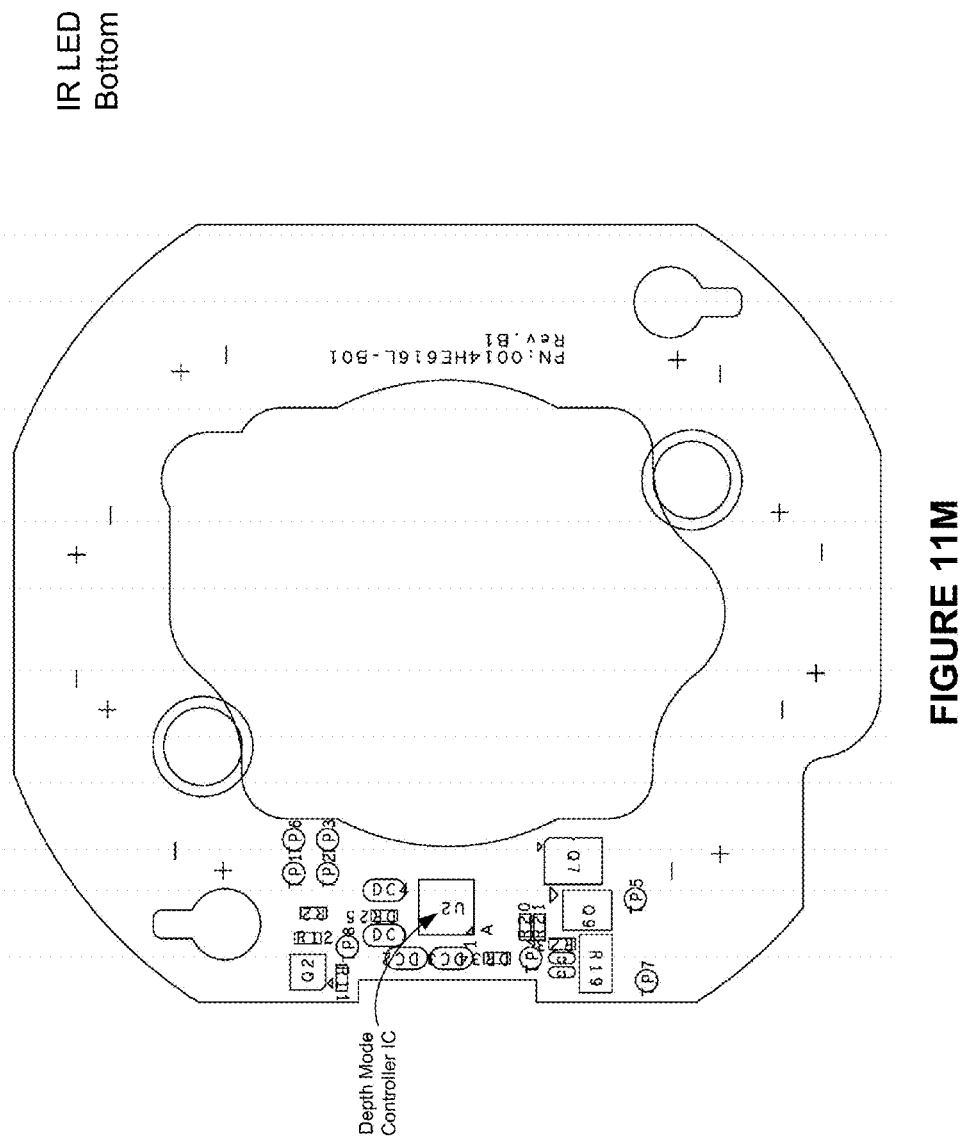

FIGS. 11G-11M illustrate additional views of the camera device 118. Particularly, FIG. 11G illustrates exploded views of the camera device 118. FIGS. 11H and 11I illustrate top and bottom views, respectively, of a main circuit board of the camera device 118. Additionally, FIGS. 11J and 11K illustrate top and bottom views, respectively, of a sensor board of the camera device 118. Moreover, FIGS. 11L and 11M illustrate top and bottom views, respectively, of an IR LED circuit board of the camera device 118.

In some implementations, a camera assembly includes an enclosed housing having a rear surface, a front surface, and a periphery (e.g., camera 118, FIGS. 11A-11M). In some implementations, the camera assembly further includes a lens module located within the housing and configured to receive light via the front surface (e.g., lens 1108, FIG. 11F). In some implementations, video data captured by the lens module is exchanged between the camera assembly and a server using a wireless local area network.

In some implementations, the camera assembly further includes communication circuitry located within the housing and configured to wireless communicate over a plurality of different communication protocols (e.g., main circuit board of the camera device 118 that includes multiple transceivers). In some implementations, the communication circuitry includes a first circuit configured for communication over the first communication protocol (e.g., Wi-Fi transceiver) and a second circuit configured for communication over the second communication protocol (e.g., 802.15.4 transceiver), wherein the first circuit and the second circuit are distinct. In some implementations, the communication circuitry is an integrated circuit configured for communication over both the first and second communication protocols (e.g., radios 950, which includes a radio 950-1 for Bluetooth LE, and a radio 950-2 for Wi-Fi, FIG. 15B). In some implementations, the communication circuitry is configured to wireless communicate over at least three different communication protocols (e.g., Wi-Fi, 802.15.4, and Bluetooth LE). In some implementations, the second antenna is further configured for communication over a third one of the communication protocols. In some implementations, the communication circuitry is further configured to provide transmission access for communicating over the first communication protocol while denying transmission access for communicating over the second communication protocol, while detecting an activated priority control signal (e.g., using control signals as described with respect to FIGS. 15A-15G).

In some implementations, the camera assembly further includes a first antenna arranged at a first location on an inner surface of the periphery (e.g., antenna 1104-1), the first antenna configured for communication over a first one of the communication protocols (e.g., Wi-Fi), and a second antenna (e.g., antenna 1104-2) arranged at a second location on the inner surface of the periphery, the second location being different than the first location, the second antenna configured for communication over a second one of the communication protocols (e.g., 802.15.4). In some implementations, the first antenna is arranged at the first location on the inner surface of the periphery and/or the second antenna is arranged at the second location on the inner surface of the periphery by an adhesive material (e.g., FIG. 11E). In some implementations, the first antenna has a first orientation and the second antenna has a second orientation such that the impact from the presence and interference of each other antenna are suppressed (e.g., orienting antennas 1104-1 and 1104-2 and different angles with respect to each other and other components within the camera assembly). In some implementations, the first antenna and the second antenna are marked with a respective alignment mark that is configured to guide the assembly of the respective antenna onto the interior wall of the camera lid.

In some implementations, the first antenna and the second antenna are configured to operate at the same frequency (e.g., 2.4 GHz). In some implementations, the first antenna and the second antenna are configured to operate at distinct frequencies (e.g., 2.4 GHz and 5 GHz). In some implementations, the first antenna is configured to transmit and receive, over the first communication protocol, signals comprising one or more of alerts, control signals and status information to and from other smart home devices (e.g., emergency alerts from a hazard detector 104 using 802.15.4, or any signals transmitted/received by any of the smart devices 204 described with respect to FIGS. 1-13). Furthermore, the second antenna is configured to transmit and receive, over the second communication protocol signals for configuring the smart home device (e.g., Bluetooth LE for provisioning and setting up the camera 118), and over the third communication protocol data corresponding to video captured by the smart home device (e.g., Wi-Fi for streaming video data).

In some implementations, the first antenna or the second antenna is configured to transmit and receive wireless signals in a wireless local area network according to the IEEE 802.11 specifications. In some implementations, wherein the first antenna or the second antenna is configured to transmit and receive wireless signals in a wireless personal area network according to the IEEE 802.15.4 standard. In some implementations, the first antenna or the second antenna is configured to transmit and receive wireless signals according to the Bluetooth Low Energy standard. In some implementations, the first antenna and the second antenna are electrically coupled to a duplex that controls their connections to a single wireless receiver circuit.

In some implementations, the camera assembly further includes a loop arm that is configured to hold the enclosed housing when the enclosed housing is inserted within a cutout opening in the loop arm. In some implementations, the loop arm is made from metal material, and the first location of the first antenna and the second location of the second antenna are such that the impact from the presence of the metal loop arm is suppressed (e.g., placed in a location that is farthest from the location at which the loop arm and the enclosed housing make contact).

Figure 12A:
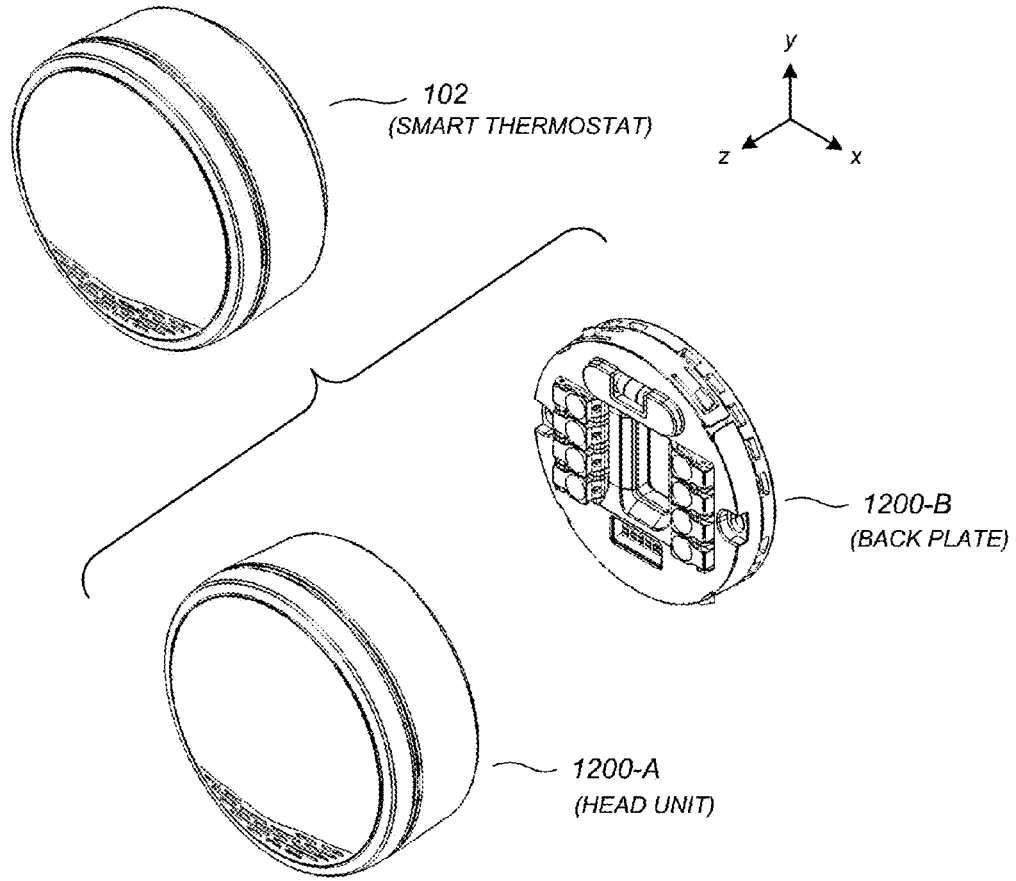
FIGS. 12A-12C illustrate various component views of a thermostat, in accordance with some implementations.
Figure 12B:
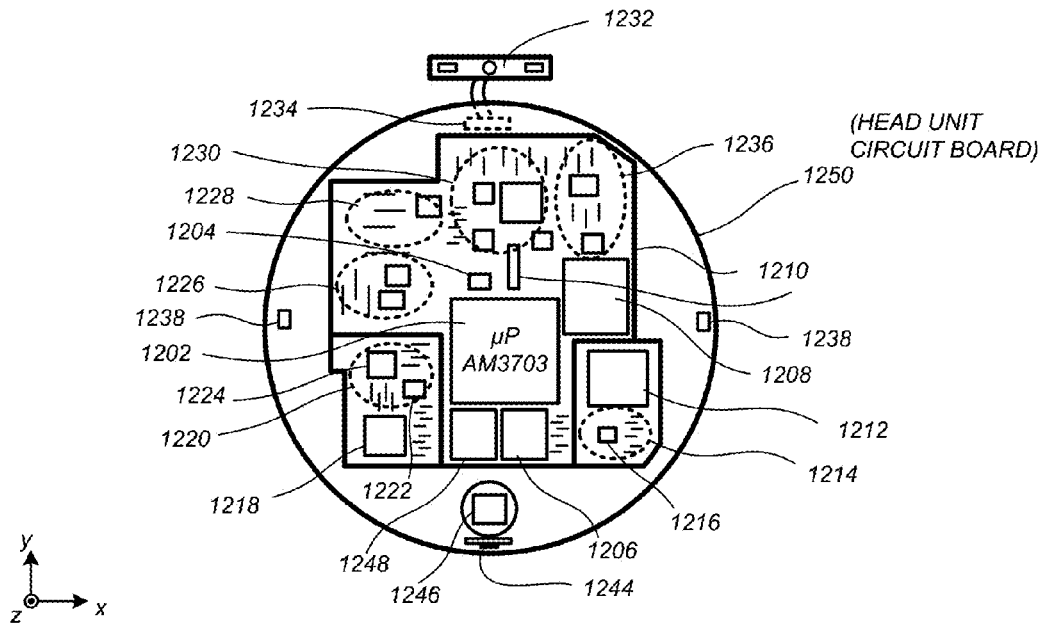
Figure 12C:
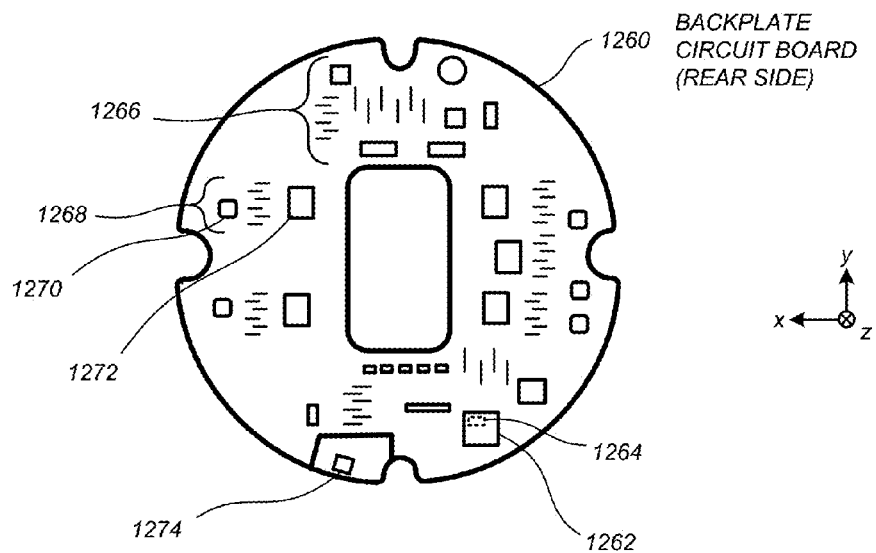

FIGS. 12A-12C illustrate various views of a smart thermostat (e.g., smart thermostat 102, FIG. 1) that may be used as part of a smart home environment 100, as previously described.

Specifically, FIG. 12A illustrates an exploded perspective view of the smart thermostat 102 with respect to its two main components, which are the head unit 1200-A and the back plate 1200-B. The head unit 1200-A includes a head unit circuit board 1250 (described in further detail with respect to FIG. 12B), and the back plate 1200-B includes a backplate circuit board 1260 (described in further detail with respect to FIG. 12C). Further technical and/or functional descriptions of various ones of the electrical and mechanical components illustrated hereinbelow can be found in one or more of the commonly assigned incorporated applications, such as U.S. Ser. No. 13/199,108, supra. In the drawings shown, the "z" direction is outward from the wall, the "y" direction is the head-to-toe direction relative to a walk-up user, and the "x" direction is the user's left-to-right direction.

FIG. 12B illustrates a head-on view of the head unit circuit board 1250 for the smart thermostat, which comprises a head unit microprocessor 1202 (such as a Texas Instruments AM3703 chip) and an associated oscillator 1204, along with DDR SDRAM memory 1206, and mass NAND storage 1208. For Wi-Fi capability, there is provided in a separate compartment of RF shielding 1210 a Wi-Fi module 1212, such as a Murata Wireless Solutions LBWA19XSLZ module, which is based on the Texas Instruments WL1270 chipset supporting the 802.11 b/g/n WLAN standard. For the Wi-Fi module 1212 is supporting circuitry 1214 including an oscillator 1216. For ZigBee capability, there is provided also in a separately shielded RF compartment a ZigBee module 1218, which can be, for example, a C2530F256 module from Texas Instruments. For the ZigBee module 1218 there is provided supporting circuitry 1220 including an oscillator 1222 and a low-noise amplifier 1224. Also provided is display backlight voltage conversion circuitry 1226, piezoelectric driving circuitry 1228, and power management circuitry 1230 (local power rails, etc.). Provided on a flex circuit 1232 that attaches to the back of the head unit circuit board by a flex circuit connector 1234 is a proximity and ambient light sensor (PROX/ALS), more particularly a Silicon Labs SI1142 Proximity/Ambient Light Sensor with an I2C Interface. Also provided is battery charging-supervision-disconnect circuitry 1236, and spring/RF antennas 1238. Also provided is a temperature sensor 1344 (rising perpendicular to the circuit board in the +z direction containing two separate temperature sensing elements at different distances from the circuit board), and a PIR motion sensor 1242. Notably, even though the PROX/ALS and temperature sensors 1244 and PIR motion sensor 1246 are physically located on the head unit circuit board 1940, all these sensors are polled and controlled by the low-power backplate microcontroller on the backplate circuit board, to which they are electrically connected. Optionally, in some implementations, the head unit circuit board includes a Bluetooth module 1248, and additional circuitry (not shown) which includes one or more oscillators, amplifiers, and/or any other support circuitry. In some implementations, the head unit circuit board includes one or more integrated circuits which include a combination of radios and transceivers. For example, in some implementations, the Wi-Fi module 1212 and the Bluetooth module 1248 comprise a single chip, wherein the Wi-Fi module 1212 and the Bluetooth module 1248 transmit and receive signals using a single antenna 1238. Various implementations of transceivers (e.g., radios 940, radios 950) are described in greater detail with respect to FIGS. 9 and 14-15G.

FIG. 12C illustrates a rear view of the backplate circuit board 1260, comprising a backplate processor/microcontroller 1262, such as a Texas Instruments MSP430F System-on-Chip Microcontroller that includes an on-board memory 1264. The backplate circuit board 1260 further comprises power supply circuitry 1266, which includes power-stealing circuitry, and switch circuitry 1268 for each HVAC respective HVAC function. For each such function the switch circuitry 1268 includes an isolation transformer 1270 and a back-to-back NFET package 1272. The use of FETs in the switching circuitry allows for "active power stealing", i.e., taking power during the HVAC "ON" cycle, by briefly diverting power from the HVAC relay circuit to the reservoir capacitors for a very small interval, such as 100 micro-seconds. This time is small enough not to trip the HVAC relay into the "off" state but is sufficient to charge up the reservoir capacitors. The use of FETs allows for this fast switching time (100 micro-seconds), which would be difficult to achieve using relays (which stay on for tens of milliseconds). Also, such relays would readily degrade doing this kind of fast switching, and they would also make audible noise too. In contrast, the FETS operate with essentially no audible noise. Also provided is a combined temperature/humidity sensor module 1274, such as a Sensirion SHT21 module. The backplate microcontroller 1262 performs polling of the various sensors, sensing for mechanical wire insertion at installation, alerting the head unit regarding current vs. setpoint temperature conditions and actuating the switches accordingly, and other functions such as looking for appropriate signal on the inserted wire at installation.

In accordance with the teachings of the commonly assigned U.S. Ser. No. 13/269,501, supra, the commonly assigned U.S. Ser. No. 13/275,307, supra, and others of the commonly assigned incorporated applications, the smart thermostat 102 (FIG. 1) represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described auto-away/auto-arrival algorithms) while at the same time not requiring a so-called "C-wire" from the HVAC system or line power from a household wall plug, even though such advanced functionalities can require a greater instantaneous power draw than a "power-stealing" option (i.e., extracting smaller amounts of electrical power from one or more HVAC call relays) can safely provide. By way of example, the head unit microprocessor 1202 can draw on the order of 250 mW when awake and processing, and an LCD module (not shown) can draw on the order of 250 mW when active. Moreover, the Wi-Fi module 1212 can draw 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

The smart thermostat 102 resolves such issues at least by virtue of the use of a rechargeable battery (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat 1800 is provided with both (i) a relatively powerful and relatively power-intensive first processor (such as a Texas Instruments AM3703 microprocessor) that is capable of quickly performing more complex functions such as driving a visually pleasing user interface display and performing various mathematical learning computations, and (ii) a relatively less powerful and less power-intensive second processor (such as a Texas Instruments MSP430 microcontroller) for performing less intensive tasks, including driving and controlling the occupancy sensors. To conserve valuable power, the first processor is maintained in a "sleep" state for extended periods of time and is "woken up" only for occasions in which its capabilities are needed, whereas the second processor is kept on more or less continuously (although preferably slowing down or disabling certain internal clocks for brief periodic intervals to conserve power) to perform its relatively low-power tasks. The first and second processors are mutually configured such that the second processor can "wake" the first processor on the occurrence of certain events, which can be termed "wake-on" facilities. These wake-on facilities can be turned on and turned off as part of different functional and/or power-saving goals to be achieved. For example, a "wake-on-PROX" facility can be provided by which the second processor, when detecting a user's hand approaching the thermostat dial by virtue of an active proximity sensor (PROX, such as provided by a Silicon Labs SI1142 Proximity/Ambient Light Sensor with I2C Interface), will "wake up" the first processor so that it can provide a visual display to the approaching user and be ready to respond more rapidly when their hand touches the dial. As another example, a "wake-on-PIR" facility can be provided by which the second processor will wake up the first processor when detecting motion somewhere in the general vicinity of the thermostat by virtue of a passive infrared motion sensor (PIR, such as provided by a PerkinElmer DigiPyro PYD 1998 dual element pyrodetector). Notably, wake-on-PIR is not synonymous with auto-arrival, as there would need to be N consecutive buckets of sensed PIR activity to invoke auto-arrival, whereas only a single sufficient motion event can trigger a wake-on-PIR wake-up.

FIGS. 13A-13D illustrate various views of a smart hazard detector (e.g., smart hazard detector 104, FIG. 1) that may be used as part of a smart home environment 100, as previously described.

Figure 13A:
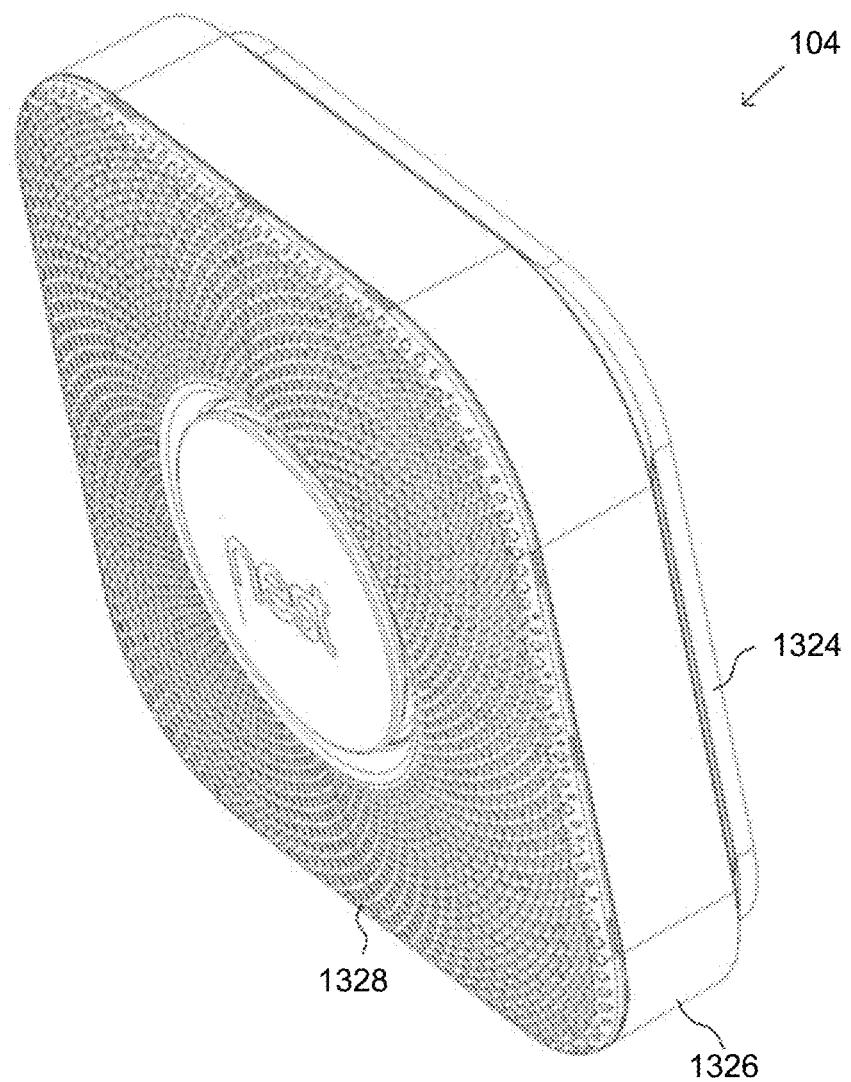
FIGS. 13A-13D illustrate various component views of a hazard detector, in accordance with some implementations.
Figure 14:
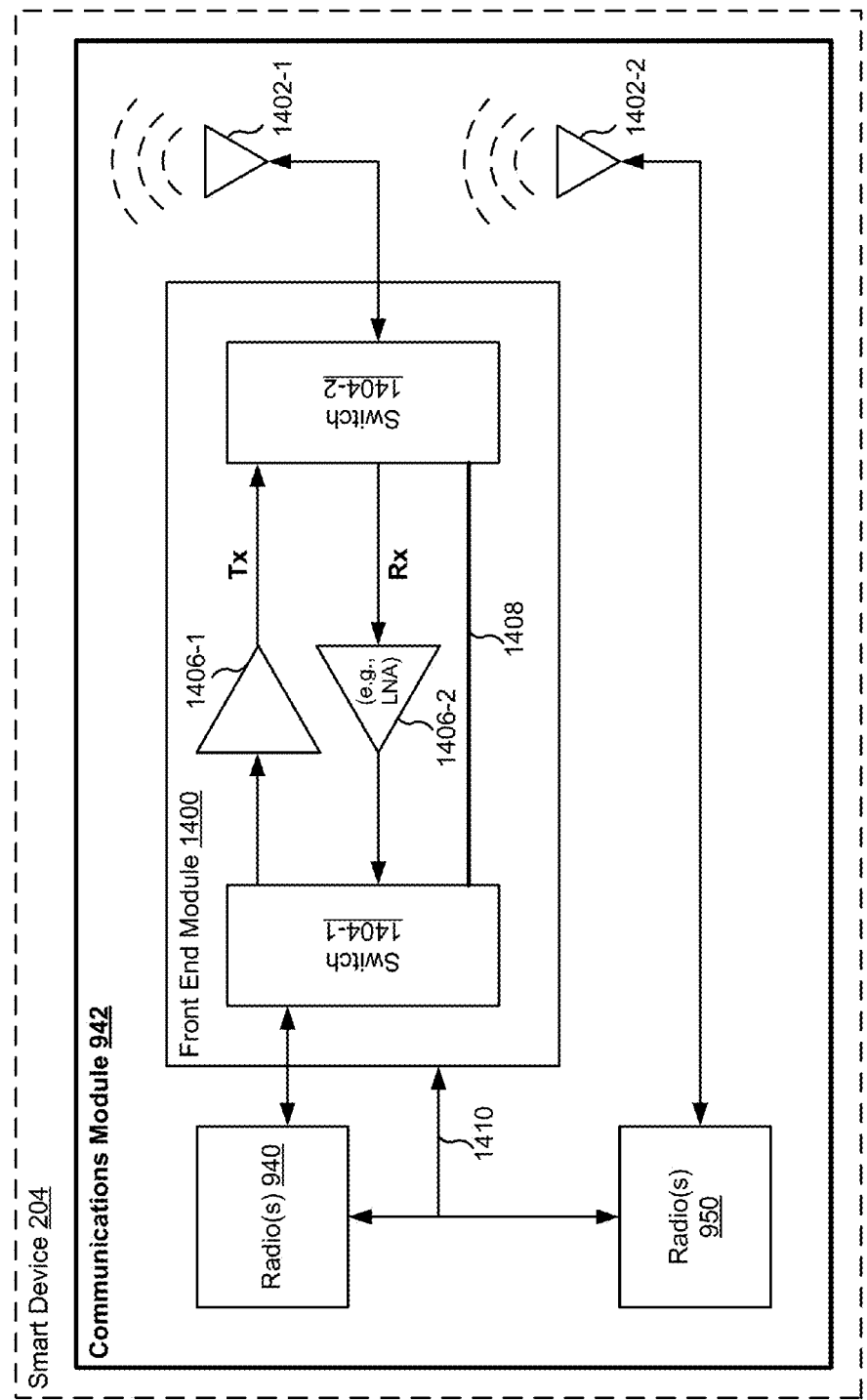
FIG. 14 illustrates a block diagram of a communications module of a smart device utilizing a bypass coexistence technique, in accordance with some implementations.

Specifically, FIG. 13A illustrates an assembled view of the smart hazard detector 104. FIG. 13A shows the mounting plate 1324, front casing 1326, and cover plate 1328 in an assembled configuration with the various other components contained within an interior space of smart hazard detector 104. These figures also show the plurality of holes or openings of cover plate 1328 forming a visually pleasing design that is viewable by occupant of a room within which the smart hazard detector 104 is mounted. The lens button 1332 is shown attached to the smart hazard detector 104 so as to be centrally positioned with respect to cover plate 1328. As briefly described, light ring 1342 may be used to provide a halo appearance of light around and behind lens button 1332. The assembled smart hazard detector 104 provides a compact yet multifunctional device.

Figure 13B:
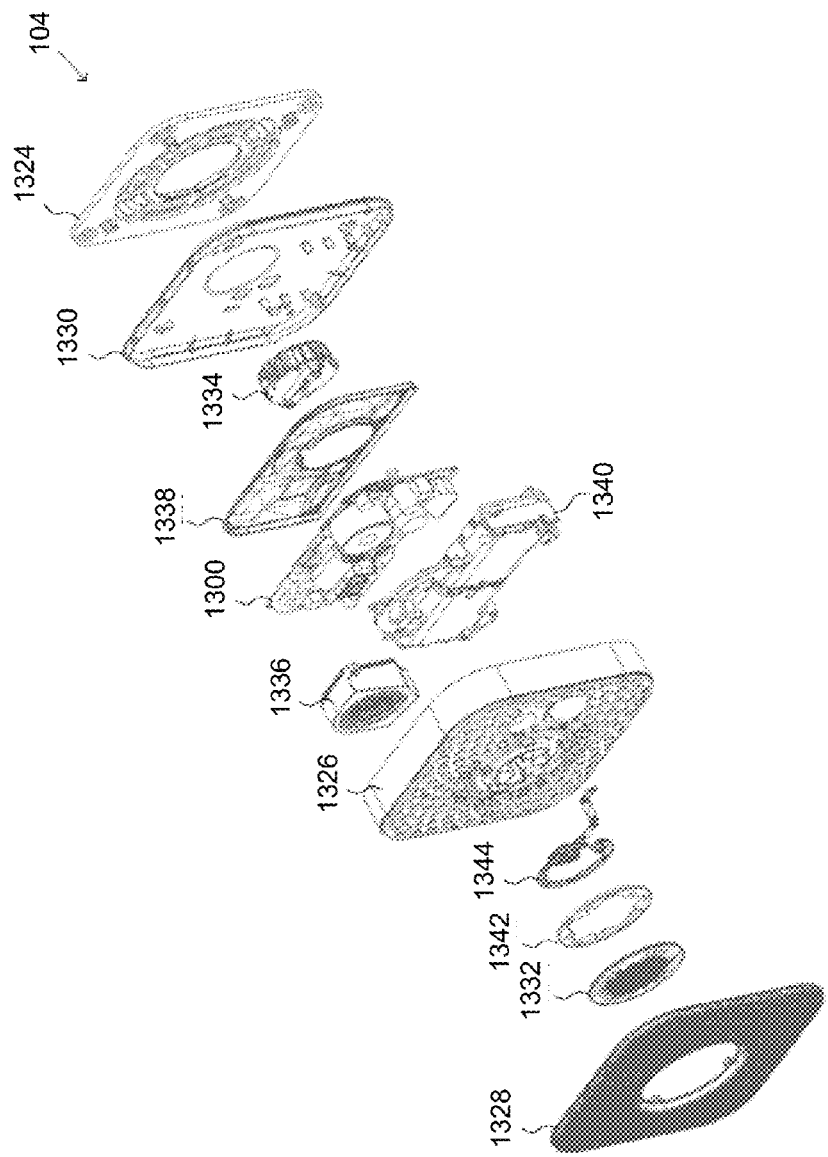

FIG. 13B illustrates an exploded perspective views of the smart hazard detector 104. As shown in FIG. 13B, the smart hazard detector 104 includes a mounting plate 1324 that may be attached to a wall of the building or structure to secure the smart hazard detector 104 thereto. Smart hazard detector 104 also includes a back plate 1330 that may be mounted to the mounting plate 1324 and a front casing 1326 that may be coupled with or otherwise secured to back plate 1330 to define a housing having an interior region within which components of the smart hazard detector 104 are contained. A circuit board 1300 may be coupled with or attached to back plate 1330. Various components may be mounted on circuit board 1300. For example, a smoke chamber 1334 may be coupled with or mounted on circuit board 1300 and configured to detect the presence of smoke. In one embodiment, smoke chamber 1334 may be mid-mounted relative to circuit board 1300 so that air may flow into smoke chamber 1334 from a position above circuit board 1300 and below circuit board 1300. A speaker 1336 and alarm device (not number) may also be mounted on circuit board 1300 to audibly warn an occupant of a potential fire danger when the presence of smoke is detected via smoke chamber 1334. Other components, such as a motion sensor, carbon monoxide sensor, microprocessor, and the like may likewise be mounted on circuit board 1300 as described herein.

In one embodiment, a protective plate 1338 may be attached to or otherwise coupled with circuit board 1300 to provide a visually pleasing appearance to the inner components of smart hazard detector 104 and/or to funnel or direct airflow to smoke chamber 1334. For example, when a user views the internal components of smart hazard detector 104, such as through vents in back plate 1330, protective plate 1338 may provide the appearance of a relatively smooth surface and otherwise hide the components or circuitry of circuit board 1300. Protective plate 1338 may likewise function to direct a flow of air from the vents of back plate 1330 toward smoke chamber 1334 so as to facilitate air flow into and out of smoke chamber 1334.

Smart hazard detector 104 may also include a battery pack 1340 that is configured to provide power to the various components of smart hazard detector 104 when smart hazard detector 104 is not coupled with an external power source, such as a 120 V power source of the home or structure. In some embodiments, a cover plate 1328 may be coupled with the front casing 1326 to provide a visually pleasing appearance to smart hazard detector 104 and/or for other functional purposes. In a specific embodiment, cover plate 1328 may include a plurality of holes or openings that allow one or more sensors coupled with circuit board 1300 to view or see through a surface of cover plate 1328 so as to sense objects external to smart hazard detector 104. The plurality of openings of cover plate 1328 may be arranged to provide a visually pleasing appearance when viewed by occupants of the home or structure. In one embodiment, the plurality of openings of cover plate 1328 may be arranged according to a repeating pattern, such as a Fibonacci or other sequence.

A lens button 1332 may be coupled with or otherwise mounted to cover plate 1328. Lens button 1332 may allow one or more sensors to view through the lens button 1332 for various purposes. For example, in one embodiment a passive IR sensor (not shown) may be positioned behind the lens button 1332 and configured to view through the lens button 1332 to detect the presence of an occupant or occupants within the home or structure. In some embodiments, lens button 1332 may also function as a button that is pressable by a user to input various commands to smart hazard detector 104, such as to shut off an alarm that is triggered in response to a false or otherwise harmless condition. Positioned distally behind lens button 1332 may be a light ring 1342 that is configured to receive light, such as from an LED, and disperse the light within ring 1342 to provide a desired visual appearance, such as a halo behind lens button 1332. Positioned distally behind light ring 1342 may be a flexible circuit board 1344 that includes one or more electrical components, such as a passive IR sensor (hereinafter PIR sensor), LEDs, and the like. Flexible circuit board 1344 (hereinafter flex ring 1344) may be electrically coupled with circuit board 1300 to communicate and/or receive instructions from one or more microprocessors mounted on circuit board (not shown) during operation of smart hazard detector 104.

Figure 13C:
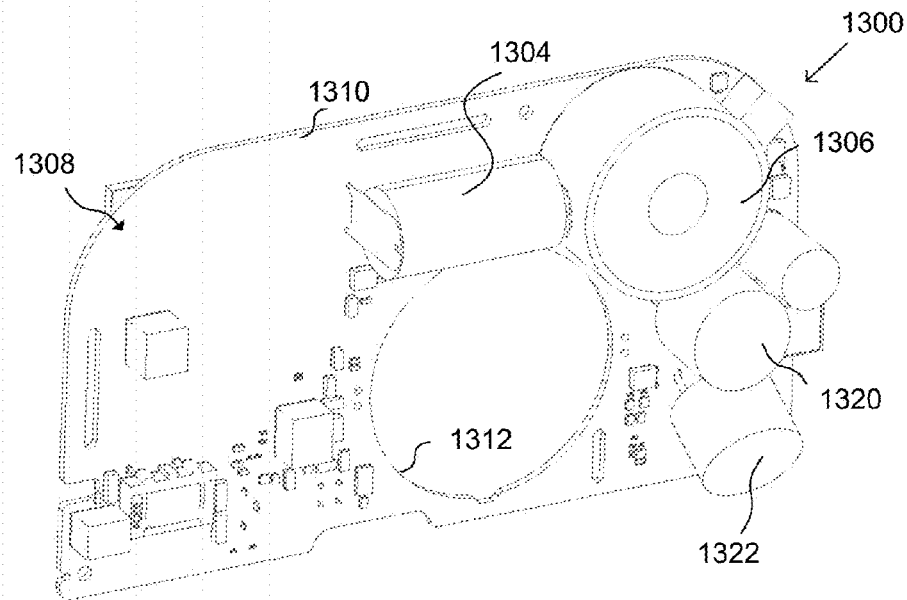
Figure 13D:
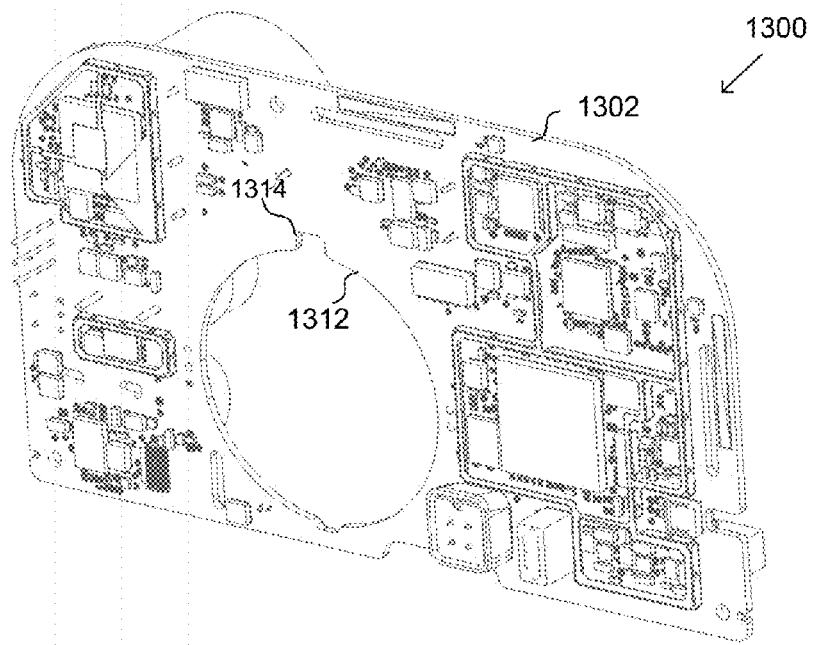

Referring now to FIGS. 13C and 13D, illustrated are front and rear perspective views of a circuit board of a smart hazard detector (e.g., smart hazard detector 104, FIG. 1). Circuit board 1300 includes a main body 1302 having a front side or surface and a rear side or surface. As described herein, various electrical components are mounted on circuit board 1300. In some embodiments, these components may be mounted on the front surface of circuit board 1300, on the rear surface of circuit board 1300 opposite the front surface, or on both surfaces of the circuit board 1300. For example, in a specific embodiment one or more microprocessors and/or other processor related components may be mounted on the rear surface of circuit board 1300 facing a protective plate while one or more functional components (e.g. an alarm device, CO detector, speaker, motion sensors, Wi-Fi device, Zigbee device, Bluetooth device, and the like) are mounted on a front surface of circuit board 1300 facing a room of the home or structure in which the smart hazard detector 104 is positioned. Other components may be mid-mounted relative to circuit board 1300 so that opposing surfaces are positioned on opposing sides of the circuit board 1300 as described herein. In some implementations, the circuit board 1300 includes one or more integrated circuits which include a combination of radios and transceivers. For example, in some implementations, a Wi-Fi device and a Bluetooth device of the smart hazard detector 104 comprise a single chip, wherein the Wi-Fi device and the Bluetooth device transmit and receive signals using a single antenna. Various implementations of transceivers (e.g., radios 940, radios 950) are described in greater detail with respect to FIGS. 9 and 14-15G.

As shown in FIG. 13C, in a specific embodiment the front surface of circuit board 1300 may include a CO detector 1304 that is configured to detect presence of carbon monoxide gas and trigger an alarm device 1306 if the carbon monoxide gas levels are determined to be too high. The alarm device 1306 (which can be a piezoelectric buzzer having an intentionally shrill or jarring sound) may likewise be mounted on the front surface of circuit board 1300 so as to face an occupant of the room in which the smart hazard detector 104 is positioned to alarm the occupant of a potential danger. Alarm device 1306 may be configured to produce one or more sounds or signals to alert the occupant of the potential danger. The front surface may further include an area 1308 in which a speaker (not shown) is positioned. The Speaker may be configured to provide audible warnings or messages to the occupant of the room. For example, the speaker may alert the occupant of a potential danger and instruct the occupant to exit the room. In some embodiments, the speaker may provide specific instructions to the occupant, such as an exit route to use when exiting the room and/or home or structure. Other messages may likewise be communicated to the occupant, such as to alert the occupant that the batteries are low, that CO levels are relatively high in the room, that the smart hazard detector 104 needs periodic cleaning, or alert the occupant of any other abnormalities or issues related to hazard detector 104 or components thereof.

Circuit board 1300 may also include one or more motion sensors mounted on the front surface thereof. The motion sensors may be used to determine the presence of an individual within a room or surrounding area of the smart hazard detector 104. This information may be used to change the functionality of the smart hazard detector 104 and/or one or more other devices connected in a common network as described previously. For example, this information may be relayed to a smart thermostat to inform the thermostat that occupants of the home or structure are present so that the smart thermostat may condition the home or structure according to one or more learned or programmed settings. The smart hazard detector 104 may likewise use this information for one or more purposes, such as to quiet the alarm device (e.g. gesture hush) as described herein or for various other reasons.

In one embodiment, a first ultrasonic sensor 1320 and a second ultrasonic sensor 1322 may be mounted on the front surface of circuit board 1300. The two ultrasonic sensors, 1320 and 1322, may be offset axially so as to point in slightly different directions. In this orientation, each ultrasonic sensor may be used to detect motion of an individual based on an orientation of the smart hazard detector 104 relative to the room and/or occupant. Detecting the motion of the individual may be used to quiet the alarm device as described herein (i.e., gesture hush) or for any other reason. In one embodiment, an axis of the first ultrasonic sensor 1320 may be oriented substantially outward relative to the smart hazard detector 104 while an axis of the second ultrasonic sensor 1322 is oriented an angle relative to the axis of the first ultrasonic sensor 1320. The first ultrasonic sensor 1320 may sense motion of an individual when the smart hazard detector 104 is mounted on a ceiling of the home or structure. Because the first ultrasonic sensor 1320 is oriented substantially outward relative to the smart hazard detector 104, the first ultrasonic sensor 1320 essentially looks straight down on individuals beneath the smart hazard detector 104. The second ultrasonic sensor 1322 may similarly sense motion of the individual when the smart hazard detector 104 is mounted on a wall of the home or structure. Because the second ultrasonic sensor 1322 is oriented at an angle relative to the first ultrasonic sensor 1320 and the smart hazard detector 104, the second ultrasonic sensor essentially looks downward toward the floor when the smart hazard detector 104 is mounted on a wall of the home or structure, rather than looking directly outward as the first ultrasonic sensor 1320. In one embodiment, the angular offset of the two ultrasonic sensors may be approximately 30° or any other desired value.

In another embodiment, the two ultrasonic sensors, 1320 and 1322, may be replaced by a single ultrasonic sensor that is configured to rotate within the smart hazard detector 104 so that the single ultrasonic sensor is capable of looking straight outward similar to the first ultrasonic sensor 1320 or capable of looking downward similar to the second ultrasonic sensor 1322. The single ultrasonic sensor may be coupled to circuit board 1300 via a hinge that allows the ultrasonic sensor to rotate based on the orientation of the smart hazard detector 104. For example, when the smart hazard detector 104 is mounted to a ceiling of the home or structure, gravity may orient the ultrasonic sensor so as to look straight downward; whereas when the smart hazard detector 104 is coupled to a wall of the home or structure, gravity may cause the ultrasonic sensor to rotate via the hinge and look downward toward a floor and relative to the smart hazard detector 104. In another embodiment, a motor may be coupled with the single ultrasonic sensor so as to rotate the ultrasonic sensor based on the orientation of the smart hazard detector 104. In this manner, the ultrasonic sensor may always point in a direction that is likely to detect motion of an individual within the room or space surrounding the smart hazard detector 104. In yet another embodiment, the single ultrasonic sensor may have a wide field of view that is able to substantially accommodate both mounting positions of the two ultrasonic sensors, 1320 and 1322.

As shown in FIGS. 13C and 13D, body 1310 of circuit board 1300 also includes a substantially centrally located aperture 1312 through which a smoke chamber is inserted so as to mid-mount the smoke chamber relative to the circuit board 1300. Aperture 1312 may also include a pair of notches 1314 through which wires are inserted to electrically couple the smoke chamber with circuit board 1300. As previously described, mid-mounting of the smoke chamber through an aperture 1312 allows smoke and air to enter the smoke chamber from both the front surface or side of circuit board 1300 and the rear surface or side of circuit board 1300. Various aspects of the electrical components on the circuit board 1300 are now described, the positions thereof of many of which will be apparent to the skilled reader in view of the descriptions herein and FIGS. 13C and 13D. Included on the circuit board 1300 can be several components, including a system processor, relatively high-power wireless communications circuitry and antenna, relatively low-power wireless communications circuitry and antenna, non-volatile memory, audio speaker, one or more interface sensors, a safety processor, safety sensors, alarm device 1306, a power source, and powering circuitry. The components are operative to provide fail-safe safety detection features and user interface features using circuit topology and power budgeting methods that minimize power consumption. According to one preferred embodiment, a bifurcated or hybrid processor circuit topology is used for handling the various features of the smart hazard detector 104, wherein the safety processor is a relatively small, relatively lean processor that is dedicated to core safety sensor governance and core alarming functionality as would be provided on a conventional smoke/CO alarm, and wherein the system processor is a relatively larger, relatively higher-powered processor that is dedicated to more advanced features such as cloud communications, user interface features, occupancy and other advanced environmental tracking features, and more generally any other task that would not be considered a "core" or "conventional" safety sensing and alarming task.

By way of example and not by way of limitation, the safety processor may be a Freescale KL15 microcontroller, while the system processor may be a Freescale K60 microcontroller. Preferably, the safety processor is programmed and configured such that it is capable of operating and performing its core safety-related duties regardless of the status or state of the system processor. Thus, for example, even if the system processor is not available or is otherwise incapable of performing any functions, the safety processor will continue to perform its core safety-related tasks such that the smart hazard detector 104 still meets all industry and/or government safety standards that are required for the smoke, CO, and/or other safety-related monitoring for which the smart hazard detector 104 is offered (provided, of course, that there is sufficient electrical power available for the safety processor to operate). The system processor, on the other hand, performs what might be called "optional" or "advanced" functions that are overlaid onto the functionality of the safety processor, where "optional" or "advanced" refers to tasks that are not specifically required for compliance with industry and/or governmental safety standards. Thus, although the system processor is designed to interoperate with the safety processor in a manner that can improve the overall performance, feature set, and/or functionality of the smart hazard detector 104, its operation is not required in order for the smart hazard detector 104 to meet core safety-related industry and/or government safety standards. Being generally a larger and more capable processor than the safety processor, the system processor will generally consumes more power than the safety processor when both are active.

Similarly, when both processors are inactive, the system processor will still consume more power than the safety processor. The system processor can be operative to process user interface features and monitor interface sensors (such as occupancy sensors, audio sensors, cameras, etc., which are not directly related to core safety sensing). For example, the system processor can direct wireless data traffic on both high and low power wireless communications circuitry, access non-volatile memory, communicate with the safety processor, and cause audio to be emitted from the speaker. As another example, the system processor can monitor interface sensors to determine whether any actions need to be taken (e.g., shut off a blaring alarm in response to a user detected action to hush the alarm). The safety processor can be operative to handle core safety related tasks of the smart hazard detector 104. The safety processor can poll safety sensors (e.g., smoke, CO) and activate alarm device 1306 when one or more of safety sensors indicate a hazard event is detected. The safety processor can operate independently of the system processor and can activate the alarm device 1306 regardless of what state the system processor is in. For example, if the system processor is performing an active function (e.g., performing a Wi-Fi update) or is shut down due to power constraints, the safety processor can still activate the alarm device 1306 when a hazard event is detected.

In some embodiments, the software running on the safety processor may be permanently fixed and may never be updated via a software or firmware update after the smart hazard detector 104 leaves the factory. Compared to the system processor, the safety processor is a less power consuming processor. Using the safety processor to monitor the safety sensors, as opposed to using the system processor to do this, can yield power savings because safety processor may be constantly monitoring the safety sensors. If the system processor were to constantly monitor the safety sensors, power savings may not be realized. In addition to the power savings realized by using safety processor for monitoring the safety sensors, bifurcating the processors can also ensure that the safety features of the smart hazard detector 104 always work, regardless of whether the higher level user interface works. The relatively high power wireless communications circuitry can be, for example, a Wi-Fi module capable of communicating according to any of the 802.11 protocols.

By way of example, the relatively high power wireless communications circuitry may be implemented using a Broadcom BCM43362 Wi-Fi module. The relatively low power wireless communications circuitry can be a low power Wireless Personal Area Network (6LoWPAN) module or a ZigBee module capable of communicating according to an IEEE 802.15.4 protocol. For example, in one embodiment, the relatively low power wireless communications circuitry may be implemented using an Ember EM357 6LoWPAN module. The non-volatile memory can be any suitable permanent memory storage such as, for example, NAND Flash, a hard disk drive, NOR, ROM, or phase change memory. In one embodiment, the non-volatile memory can store audio clips that can be played back using the speaker 1336. The audio clips can include installation instructions or warning in one or more languages. The interface sensors can includes sensors that are monitored by system processor, while the safety sensors can include sensors that are monitored by the safety processor. Sensors can be mounted to a printed circuit board, a flexible printed circuit board, a housing of a system, or a combination thereof.

The interface sensors can include, for example, an ambient light sensor (ALS) (such as can be implemented using a discrete photodiode), a passive infrared (PIR) motion sensor (such as can be implemented using an Excelitas PYQ1348 module), and one or more ultrasonic sensors (such as can be implemented using one or more Manorshi MSP1640H12TR modules). The safety sensors can include, for example, the smoke detection chamber 1334 (which can employ, for example, an Excelitas IR module), the CO detection module 1304 (which can employ, for example, a Figaro TGS5342 sensor), and a temperature and humidity sensor (which can employ, for example, a Sensirion SHT20 module). The power source can supply power to enable operation of the smart hazard detector and can include any suitable source of energy. Embodiments discussed herein can include AC line powered, battery powered, a combination of AC line powered with a battery backup, and externally supplied DC power (e.g., USB supplied power). Embodiments that use AC line power, AC line power with battery backup, or externally supplied DC power may be subject to different power conservation constraints than battery only embodiments.

Preferably, battery-only powered embodiments are designed to manage power consumption of its finite energy supply such that smart hazard detector 104 operates for a minimum period of time of at least seven (7), eight (8), nine (9), or ten (10) years. Line powered embodiments are not as constrained. Line powered with battery backup embodiments may employ power conservation methods to prolong the life of the backup battery. In battery-only embodiments, the power source can include one or more batteries. The batteries can be constructed from different compositions (e.g., alkaline or lithium iron disulfide) and different end-user configurations (e.g., permanent, user replaceable, or non-user replaceable) can be used. In one embodiment, six cells of Li—FeS2 can be arranged in two stacks of three. Such an arrangement can yield about 27000 mWh of total available power for the smart hazard detector 104.

FIG. 14 illustrates a block diagram of a communications module 942 of a smart device utilizing bypass circuitry, in accordance with some implementations. FIG. 14 illustrates a communications module 942 of a smart device 204 (e.g., FIG. 9), in accordance with any of the implementations disclosed in FIGS. 1-9 (e.g., devices 102, 104, 106, 108, 110, 112, 114, 116, 118, 120, and/or 122, FIG. 1, such as a camera 118, a smart hazard detector 104, a smart thermostat 102, etc.).

In some implementations, the communications module 942 includes one or more radios 940, radios 950, a front end module 1400, and antennas 1402. In some implementations, the one or more radios 940 and radios 950 are communicably connected, and each have respective antennas 1402 through which respective signals are transmitted and received. As an example, the communications module 942 of a camera 118 includes a first transceiver for transmitting video data (e.g., Wi-Fi, radios 950), and additionally includes a second transceiver for transmitting and receiving packets from other smart devices in a smart home environment (e.g., Zigbee, radios 940). Optionally, a combined transceiver is configured for transmitting and receiving data in accordance with more than one communications protocol (e.g., radio 950 configure for Wi-Fi and Bluetooth LE). Components of the communications module 942 (e.g., radios 940, radios 950) are described in greater detail with regards to FIG. 9.

The front end module 1400 of the communications module 942 includes a variety of circuit elements for manipulating (e.g., amplifying) signals received and transmitted by the radios 940. In particular, the front end module 1400 includes switches 1404 for coupling the radios 940 and the antenna 1402 by selectively using an amplifier (e.g., amplifier 1406-1 and a low noise amplifier 1406-2) or bypass line 1408. Whether the front end module 1400 couples the radios 940 and the antenna 1402 by the low noise amplifier 1406-2 or the bypass line 1408 depends on whether the radio 950 is active and transmitting signals using the second antenna 1402-2. Although not illustrated, other implementations of the front end module 1400 may include additional circuit elements, including one or more additional switches, amplifiers, transistors, and/or any combination of active or passive elements. A combination of circuit elements may be used in the front end module 1400, for example, to modify the sensitivity of the communications module 942 and signals transmitted and/or received through the radios 940.

As described previously, poor signal isolation typically results from the close physical placement of antennas 1402. In particular, device components risk damage in the event that the signal power of transmitting antennas in a transmission chain nearby (e.g., antenna 1402-2 for Wi-Fi transmissions) exceeds the maximum input power of components in the receiving chain (e.g., 802.15.4 receiving chain formed by radio(s) 940 and antenna 1402-1).

One method for enabling and enhancing coexistence of transceiver devices (e.g., radios 940, radios 950) includes the use of a bypass line 1408 in a front end module 1400. In particular, by using the switches 1404 to automatically and selectively enable the bypass line 1408 when the radio 950 (e.g., Wi-Fi) is "on" and transmitting signals through the antenna 1402-2 (e.g., radios 950 signals to the front end module 1400 through connection 1410 that it is "on" and transmitting), transmissions received through the antenna 1402-1 do not pass through the low noise amplifier 1406-2, and instead pass through the bypass line 1408 to the radios 940. Consequently, the effective maximum input power that can be tolerated by the front end module 1400 may be increased (i.e., the front end module 1400 has a larger input power threshold when the bypass line 1408 is used to couple the radio 940 and the antenna 1402-1), as determined by characteristics of the bypass line 1408, rather than the low noise amplifier 1406-2. When the radio 950 is "off," the switches 1404 operate to couple the radios 940 and the antenna 1402-1 with the low noise amplifier 1406-2 in the receiver pathway. Thus, with respect to receiver chain sensitivity, the front end module 1400 has a higher receiver sensitivity when the low noise amplifier 1406-2 is used to couple the radio 940 and the antenna 1402-1. Given the selective operation of the low noise amplifier 1406-2 based on the activity of the radio 950, the risk of damage to the low noise amplifier 1406-2 is avoided, while still achieving improved sensitivity through the use of the low noise amplifier 1406-2. Therefore, the front end module 1400 is configured to couple the antenna 1402-1 to the radio 940 via the bypass line 1408 when the radio(s) 950 is active and transmitting signals using the antenna 1402-2 such that a signal received via the antenna 1402-1 is not amplified by the amplifier 1406-2 prior to being passed to the radio 940. The front end module 1400 is further configured to couple the antenna 1402-1 to the radio 940 via the amplifier 1406-2 when the radio(s) 950 is not transmitting signals using the antenna 1402-2 such that a signal received via the antenna 1402-1 is amplified by the amplifier 1406-2 prior to being passed to the radio 940. Methods of coexistence using the bypass circuitry in FIG. 14 is described in greater detail with respect to FIG. 22.

FIGS. 15A-15G illustrate a coexistence scheme for a smart device having multiple radios in smart home environment 100, in accordance with some implementations.

As illustrated in FIG. 15A, a smart device 204 (e.g., a camera 118) transmits data to and receives data from other devices in proximity (e.g., smart hazard detector 104, camera 118, smart thermostat 102). Simultaneously, data (e.g., live video stream recorded by the camera 118) is transmitted to and from a remote server system over a network (e.g., a smart home provider server system 164, over the network 162 through a network interface 160). In some implementations, the various devices in the smart home environment 100 are also communicably connected and may therefore transmit/receive data from one another. The specific smart devices illustrated and described in FIG. 15A are merely examples, and other implementations include various combinations of smart devices (not illustrated).

In some implementations, a camera 118 (or any smart device 204 that provides high bandwidth output data) needs to transmit one more video streams at different resolutions (e.g., 180p, 780p and 1080p) to the server system 164 for additional processing, storage, and/or sharing with authorized users. In some situations, as when the video stream is a live, high definition (e.g., 780p or 1080p) video stream, this requires the camera 118 to maintain a low latency, high bandwidth connection to the server system 164 through the network interface 160 for a substantial period of time (e.g., from a few minutes to hours). This is accomplished in some implementations by the camera 118 employing a Wi-Fi connection provided by the network 162 to connect to the server system 164 to transmit video streams. At the same time, the camera 118 needs to be responsive to high priority alerts from other smart devices 204 so these alerts can be processed locally (e.g., used to change system state in the camera 118, transmitted to a hub device 180 for integration processing in view of other system alerts and status information, relayed to other smart home devices 204, or transmitted to client devices 504 that are configured to issue alerts directed to authorized users) and/or transmitted to the server system 164. In some implementations, these alerts are issued via Bluetooth or IEEE 802.11.15.4 signals by radios in other smart devices 204 (such as a smart hazard detector 304) and are received by corresponding radios in the camera 118 (or any comparable smart device 204). These alerts are typically of short duration and low bandwidth in contrast to streaming video, which is long duration and high bandwidth. In some implementations, these alerts need to be retransmitted to other smart devices 204 by the corresponding Bluetooth or IEEE 802.11.15.4 radios in the camera 118 (or any comparable smart device 204), which operate at the same frequency as the Wi-Fi radio (e.g., 2.4 GHz). This requires the camera 118 to prioritize use of the radios and antennas such that high priority transmissions received from other smart devices 204 (e.g., smoke or CO alerts) are transmitted with minimal latency, while during normal operation (e.g., when there are no incoming alerts from other smart devices 204), video streaming is enabled with high efficiency through the Wi-Fi radio. Devices with multiple radios (e.g., Wi-Fi, Bluetooth, and 802.11.15.4) may be utilized in a number of additional ways. In some embodiments, for example, one or more radios of a device may be used for secure device provisioning (e.g., via Bluetooth). Additionally, as described above, one or more radios may also be used for low-power communications (e.g., in devices not connected to a persistent power source).

Any of the operations described above in which multiple radios are utilized require a co-existence strategy, described herein, that manages the use by multiple radios (e.g., 2 or more) of one or more antennas with poor isolation from each other to transmit without interference signals at the same frequency or frequencies that would otherwise interfere.

As shown in FIG. 15A, some implementations of a communications module 942 include one or more radios 940, radios 950, antennas 1402, an optional front end module 1400 (as described in FIG. 14), and one or more control lines 1500 which transmit signals between the one or more radios 940 and radios 950 (e.g., RADIO_PRI on control line 1500-1, RADIO_REQ on control line 1500-2, and WIFI_GRANT on control line 1500-3). Various components of the communications module 942 are described in greater detail with respect to FIGS. 9 and 14.

In some implementations, the control lines 1500 are used to transmit control signals between one or more radios 940 and radios 950 to manage the operation of transceiver devices in accordance with a coexistence scheme. In particular, as described in greater detail below, control signals are transmitted as a means for indicating and determining a priority of signals being transmitted by the one or more radios 940 and radios 950. A transceiver determined to have a lower priority yields to a higher priority transceiver by suspending transmissions for a duration of time as the higher priority transceiver completes transmitting/receiving data, thus lessening or altogether avoiding the negative effects of poor isolation resulting from transceiver devices operating simultaneously. As an example, when the RADIO_PRI (i.e., request for transmission priority) and RADIO_REQ (e.g., request for transmission) control lines 1500-1 and 1500-2 are asserted by the radios 940, the radio 950 yield to transmission requests by the radios 940 by suspending its own transmissions while the radios 940 transmit/receive data. Referring to the example in FIG. 15A, when the RADIO_PRI and RADIO_REQ control lines 1500-1 and 1500-2 are asserted, the radio 950 of the smart device 204 (e.g., Wi-Fi transceiver of a camera 118) momentarily suspend uploads of recorded video to the smart home provider server system 164, while permitting the radios 940 (e.g., 802.15.4) to transmit critical packets received from a smart hazard detector 104 to a smart thermostat 102 by activating (or "asserting") the WIFI_GRANT control signal. As a result, interference and transmission collisions are avoided between the transceiver devices, while reducing the risk of damaging hardware components (e.g., by exceeding device input power thresholds) and failing to transmit critical data (e.g., emergency pings from a smart hazard detectors 104).

In some implementations, one of the transceivers serves as a "master" device which receives requests for transmissions and moderates transmissions between itself and requesting transceivers. In the example shown, the radio 950 (e.g., Wi-Fi transceiver) is the master, as indicated by the directions of the control lines 1500 (i.e., with respect to the radio 950, WIFI_GRANT is an output, and RADIO_PRI and RADIO_REQ are inputs).

The radios 940 and/or the radios 950 may operate in station mode (i.e., transceiver acts as a client that connects to an access point, such as a router), Access Point (AP) mode (i.e., transceiver acts as an access point through which other devices can connect and access other connected devices), and/or Ad-Hoc mode (e.g., mode in which network connected devices have equal status and may associate with any other network device in range). Furthermore, radios 940 and/or the radios 950 may operate in a variety of power modes (e.g., full power mode, power save mode). In the example coexistence scheme of FIGS. 15A-15G, the radio 950 (e.g., Wi-Fi) operates in station mode and full power mode. Furthermore, in the given example, the WIFI_GRANT control signal is kept activated when the radio 950 is in power save mode.

Although the example illustrates the use of three control lines, other implementations may include additional control lines and control signals for determining a request priority of a transmitting device. Additional control lines and control signals may, for example, be used in implementations which include two or more radios 940 or radios 950 in a combined device (e.g., a combined Bluetooth and 802.15.4 chip), such that the plurality of transceiver devices can separately arbitrate with the master device.

Alternatively, in some implementations, two or more radios 940 or radios 950 are integrated as a combined device (e.g., a combined Bluetooth and Wi-Fi 802.11 chip), and a separate arbitration scheme may be implemented such that the two radios 940 or radios 950 arbitrate internally before arbitrating with the other transceiver of the communications module 942. FIG. 15B illustrates an example of an internal arbitration scheme between transceivers combined in a single device (e.g., Bluetooth and Wi-Fi transceivers combined in a single device, shown by radios 950-1 and 950-2, respectively). Using a switch 1404-3, for example, radios 950-1 and 950-2 decide between each other (e.g., based on instructions and logic in the firmware of radio 950-1 and/or 950-2) as to which transceiver will have control over the antenna 1402-2. Thus, the example coexistence scheme of FIG. 15A operates independently from, but simultaneously with, any internal coexistence schemes implemented between radios 940 or radios 950 (e.g., coexistence scheme involving 802.15.4 and Wi-Fi is independent from internal coexistence scheme involving Wi-Fi and Bluetooth).

While reference is made with respect to 802.15.4 and Wi-Fi, other implementations may include any combination of other transmission protocols described with respect to FIGS. 9 and 14.

FIG. 15C illustrates a table of example control signal assignments. As described above, the example coexistence scheme of FIGS. 15A-15G uses three signals, RADIO_REQ (input), RADIO_PRI (input) and WIFI_GRANT (output). These control signals may be assigned to various physical pins of the radios 940 and radio 950 (e.g., pins L6, L7, and L8).

Coexistence schemes may be configured and implemented with any signal polarity (High-Active or Low-Active). In the example shown, the signal polarity is assumed to be Low-Active. In some implementations, control signals and control lines 1500 are assigned to physical pins of the transceivers, and are therefore handled by on-chip target firmware. Thus, control signals do not directly control the transceivers (e.g., to stop/resume Wi-Fi transmission), but rather operate through logic implemented by device firmware.

The use of these control signals are configured such that the radio 940 and radio 950 can support two modes of operation: a "normal" and "alarming" mode.

In the "normal" mode, the radio 940 (e.g., 802.15.4) operates asynchronously. That is, the radio 940 can request transmission access at any time. In this mode, the priority pin (e.g., RADIO_PRI) will not be asserted. Furthermore, the radio 950 (e.g., Wi-Fi) is permitted (although not required) to complete existing packet transmissions before granting transmission requests to the radio 940 (i.e., asserting WIFI_GRANT).

In "alarming" mode (or "high priority" mode), the radio 940 (e.g., 802.15.4) requests access in a periodic fashion. As an example, the radio 940 requests for a 900 us transmission period every 4 ms. The priority control signal (e.g., RADIO_PRI) will be asserted during this entire period and can be used by the radio 950 (e.g., Wi-Fi) to infer the mode. In some implementations, in the alarming mode, the radio 940 and the radio 950 operate synchronously. That is, transmissions from the radio 950 (e.g., Wi-Fi) are timed with the falling (or rising) edge of the RADIO_REQ control signal. By synchronously timing the assertion and de-assertion of the RADIO_REQ control signal, minimum timing guarantees can be created with respect to transmission access for the radio 950. This is in contrast to "normal mode," where a looser coupling exists between transmissions between radio(s) 940 and radio(s) 950, where transmission access is granted/denied in an ad hoc fashion.

Implementations of the various controls signals for supporting these modes of operation are described below.

In some implementations, the RADIO_REQ control signal (e.g., control line 1500-2, FIG. 15A) is a transmission request signal from the radios 940 (e.g., 802.15.4 transceiver). When the radio 950 (e.g., Wi-Fi) detects this signal, it attempts to suspend its transmissions and simultaneously activates the WIFI_GRANT control signal (e.g., control line 1500-3, FIG. 15A), indicating that its transmission has stopped and that the radios may begin transmission (e.g., on a shared 2.4 GHz frequency band).

In some implementations, the RADIO_PRI control signal (e.g., control line 1500-1, FIG. 15A) is signal from the radios 940 (e.g., 802.15.4) indicating an importance of the transmission request. Thus, if RADIO_PRI is active when RADIO_REQ is detected, the radio 950 (e.g., Wi-Fi) will treat it as "high priority" request. Consequently, the radio 950 attempts to shut down its transmissions as soon as possible, activates the WIFI_GRANT control signal, and does not revoke the WIFI_GRANT control signal until RADIO_REQ is deactivated.

If RADIO_PRI is inactive when RADIO_REQ is detected, the radio 950 will treat it as "regular priority" request. Thus, if an important operation by the radio 950 is in progress (e.g., scheduled beacon receive), the WIFI_GRANT control signal will not be activated until that operation is completed. Furthermore, if the WIFI_GRANT control signal is already activated when the RADIO_REQ control signal is also activated, WIFI_GRANT will be revoked (deactivated) if and when the radio 950 seeks to access to the radio.

The RADIO_PRI control signal is checked when the radio 950 (e.g., Wi-Fi transceiver) detects a change of the RADIO_REQ control signal (e.g., activation/inactivation). The RADIO_PRI control signal level must be established a time T_PRI_SETUP before changing the RADIO_REQ control signal. When the RADIO_REQ control signal is still activated when the RADIO_PRI control signal is activated, it triggers an "alarming" mode to the radio 950, forcing a "slotted" mode operation. The slotted mode is implemented in order to respond rapidly during a RADIO_REQ interval in high priority mode ("alarming mode," an example of which is described with respect to FIG. 15G). In slotted mode, a TX Request Descriptor is placed in the hardware queue only upon inactivation of the RADIO_REQ control signal. The transmission throughput of the radio 950 (e.g., Wi-Fi) in slotted mode is limited to a single packet in every RADIO_REQ interval. Thus, only a single Wi-Fi packet is sent every time when the RADIO_REQ control signal is inactivated. In some implementations, when switching from alarming mode to normal mode, the RADIO_PRI must be inactivated when RADIO_REQ is inactivated. Assuming 1440 Bytes/packet and a 4 ms RADIO_REQ interval, transmission throughput of the radio 950 under alarming mode is 2.7 Mbit/sec. In addition, Wi-Fi retry limit is set to 3 in slotted mode, where default retry limit is 15.

The WIFI_GRANT control signal is provided by the radio 950 (e.g., Wi-Fi), which, when activated, indicates that the transmission activity of the radio 950 was ceased, and that the radios 940 (e.g., 802.15.4 transceiver) may use the frequency band for transmission (e.g., 2.4 GHz band).

Furthermore, in order to achieve quick pause-resume of transmissions by a Wi-Fi transceiver, in some implementations 802.11n sub-frame aggregation is disabled. Furthermore, in some implementations, the number of TX Request Descriptors placed in the hardware transmission queue is limited to 1. As a result, the transmission throughput of the Wi-Fi transceiver, for example, is reduced about 10 Mbps even when connected to an 802.11n access point.

In some implementations, a camera device (e.g., smart device 204 in FIG. 15A, which is a camera) includes a first and second antenna (e.g., antennas 1402-1 and 1402-2, respectively), and a first (e.g., radio 950-1, FIG. 15B), second (e.g., radio 940, FIG. 15A), and third transceiver (e.g., radio 950-2, FIG. 15B). The second transceiver is coupled to the first antenna (e.g., radio 940 coupled to antenna 1402-1), and the first and third transceivers are coupled to the second antenna (e.g., radios 950-1 and 950-2 coupled to antenna 1402-2, FIG. 15B). In some implementations, the first transceiver is configured to transmit and receive, over a first one of a plurality of distinct communication protocols, signals for configuring the camera device (e.g., Bluetooth Low Energy), the second transceiver is configured to transmit and receive, over a second one of the plurality of distinct communication protocols, signals comprising one or more of alerts, control signals and status information to and from the one or more smart home devices (e.g., 802.15.4), and the third transceiver is configured to transmit and receive, over a third one of the plurality of distinct communication protocols, data corresponding to video captured by the camera device (e.g., Wi-Fi). In some implementations, the second transceiver and the first and/or third transceivers are coupled by a plurality of control lines for selectively granting or denying transmission access to the first, second, and third transceivers (e.g., control lines 1500, FIG. 15A). In some implementations, the first transceiver and the third transceiver comprise a single combined transceiver (e.g., radio 950, which includes radio 950-1 and radio 950-2, FIG. 15B), and the second transceiver is coupled to the single combined transceiver by the plurality of control lines (e.g., radio 940 and radio 950 coupled by control lines 1500, FIG. 15A).

In some implementations, the plurality of control lines include a first control line for a priority control signal (e.g., RADIO_PRI on control line 1500-1, FIG. 15A), a second control line for a radio request control signal (e.g., RADIO_REQ on control line 1500-2), and a third control line for granting or denying transmission access to the second transceiver or the third transceiver (e.g., WIFI_GRANT on control line 1500-3). Transmission access is granted or denied to the second transceiver or the third transceiver using the third control line in accordance with detection of an activated or deactivated priority control signal, an activated or deactivated radio request control signal, and/or a transmission request by the third transceiver. In some implementations, transmission access is granted to the second transceiver and denied to the third transceiver if an activated priority control signal is detected on the first control line and an activated radio request control signal is detected on the second control line; or a deactivated priority control signal is detected on the first control line and the activated radio request control signal is detected on the second control line, but the transmission request by the third transceiver is not detected. In some implementations, transmission access is denied to the second transceiver and granted to the third transceiver if an activated priority control signal is detected on the first control line, a transmission request by the third transceiver is detected, and a deactivated radio request control signal is detected on the second control line; or a deactivated priority control signal is detected on the first control line and the transmission request by the third transceiver is detected. Granting and denying of transmission access to the first transceiver, the second transceiver, and/or the third transceiver is described in greater detail with respect to FIGS. 23A-23F.

FIGS. 15D-15G illustrate various signal timing diagrams and timing charts for various modes of operation in a coexistence scheme, in accordance with some implementations. As stated previously, in the examples shown and described with respect to FIG. 15D-15G, the signal polarity of the control signals is Low-Active (i.e., control signal is considered "active" when low), although control signals may be configured in other implementations to have a High-Active polarity. Furthermore, the timing charts illustrated in FIGS. 15D-15G are merely examples of timing requirements (e.g., minimum/maximum requirements) for an example coexistence scheme, and in other implementations, the communications module 942 of a smart device (e.g., camera 118, smart hazard detector 104, smart thermostat 102, etc.), and components thereof (e.g., radios 940, radios 950), are configured to satisfy other predefined timing requirements.

In particular, FIGS. 15D-1 and 15D-2 illustrate a signal timing diagram and timing chart for a normal mode of operation for a coexistence scheme, in accordance with some implementations.

As shown in FIG. 15D-1, even if the RADIO_PRI control signal is activated, the WIFI_GRANT control signal is not asserted until the RADIO_REQ control signal is activated. As shown in the timing chart of FIG. 15D-2, T_PRI_SETUP is the setup time between asserting RADIO_PRI and asserting RADIO_REQ. Moreover, T_REQ_LATENCY is the latency between asserting RADIO_REQ and asserting WIFI_GRANT. The T_REQ_LATENCY time is defined by requirements of the radios 940 (e.g., 802.15.4 radio requirement) and implementation limitations of the radio 950 (e.g., Wi-Fi). In some implementations, the T_REQ_LATENCY time is mainly general-purpose I/O (GPIO) interrupt latency plus the TX DMA stop latency (e.g., a maximum of 3.5 msec). The WIFI_GRANT control signal could be further delayed, however, for beacon protection (described in greater detail with respect to FIGS. 15F-1 and 15F-2).

Furthermore, as shown in FIG. 15D-1, when both the RADIO_PRI control signal and the RADIO_REQ are deactivated, the WIFI_GRANT is revoked. The T_REVOKE_LATENCY time is the latency between de-asserting RADIO_REQ and de-asserting WIFI_GRANT.

Additional timing metrics include T_REQ_PERIOD, which is the length of time for which the RADIO_REQ control signal is asserted. In some implementations, T_REQ_PERIOD is defined from requirements of the radios 940 (e.g., 802.15.4 radio requirement) and throughput/connection stability of the radio 950 (e.g., Wi-Fi). Furthermore, T_REQ_INTERVAL is defined as the interval of time between asserting the RADIO_REQ control signal.

FIGS. 15E-1 and 15E-2 illustrate a signal timing diagram and timing chart for a mode of operation in a coexistence scheme in which a request grant is revoked based on predefined performance requirements, in accordance with some implementations.

In particular, the signal timing diagram of FIG. 15E-1 illustrates a signal timing diagram in which the WIFI_GRANT control signal is revoked in accordance with Quality of Service (QoS) requirements. In the example provided, when RADIO_PRI is not asserted, WIFI_GRANT will be revoked when there is a high priority transmission request by the radio 950 (e.g., Wi-Fi), even if the RADIO_REQ control line is still asserted. In some implementations, a "High priority" transmission request is considered to be within an Access Category (AC) that is above BE (Best Effort), VI (Video) and/or VO (Voice), respectively. For example, management frames are considered to be the same priority as VO (Voice).

FIG. 15E-2 illustrates a timing chart in which WIFI_GRANT is revoked in accordance with QoS requirements. As the RADIO_PRI control signal is assumed to be de-asserted, this example pertains only to a non-priority coexistence request.

As shown in FIG. 15E-1, if a "high priority" transmission occurs, WIFI_GRANT will be revoked even if the RADIO_REQ control signal is asserted. The time T_REVOKE_LEAD_Q is defined as the lead period between de-asserting the WIFI_GRANT and the "high priority" Wi-Fi transmission. Furthermore, the time T_WIFI_ACT is the duration of time of the high priority Wi-Fi transmission.

When the high-priority transmission ceases, WIFI_GRANT is re-asserted, the amount of time between such occurrences being defined by T_REGRANT_LATENCY_Q.

Other timing metrics include T_GRANT_MIN_Q, which is the minimum amount of time for which WIFI_GRANT can be guaranteed to be asserted. In some implementations, because transmission activity of the radio 950 (e.g., Wi-Fi) is asynchronous to a request signal from the radios 940 (e.g., 802.15.4), a minimum WIFI_GRANT period (e.g., time T_GRANT_MIN_Q) is not guaranteed.

Furthermore, T_WIFI_IDLE is defined as the interval of time between high-priority transmission requests.

Figures 3, 15F:
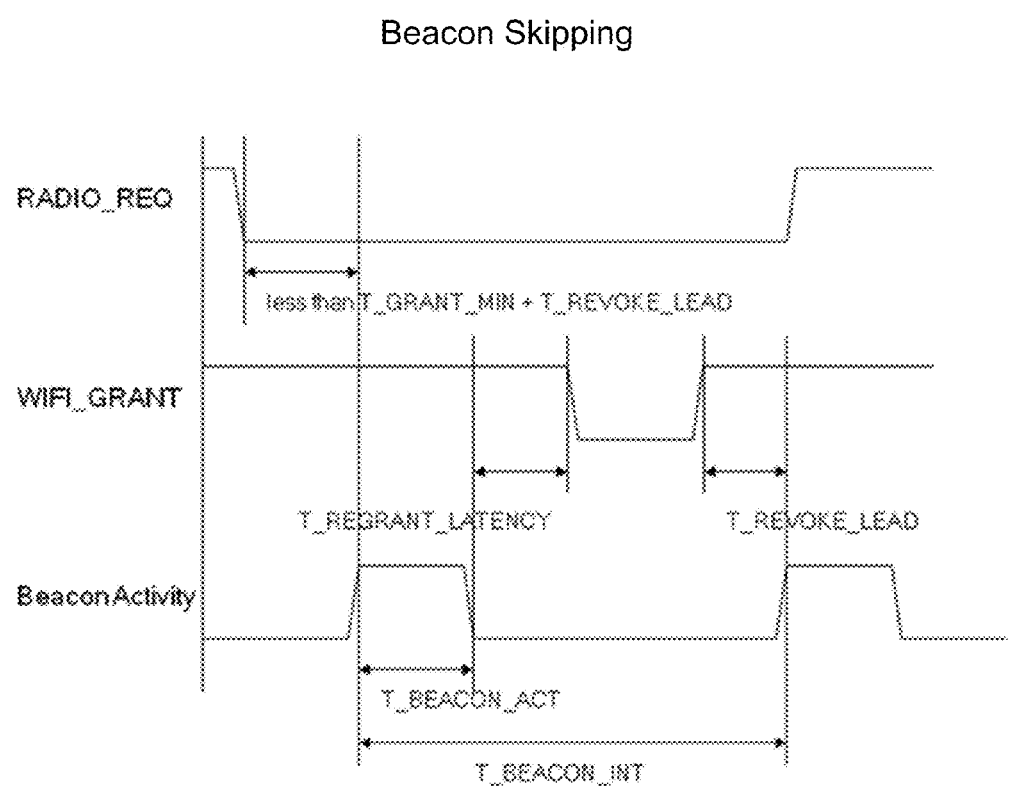

FIGS. 15F-1 and 15F-2 illustrate a signal timing diagram and timing chart for a mode of operation for a coexistence scheme utilizing beacon protection, in accordance with some implementations.

FIG. 15F-1 illustrates a timing chart with beacon protection. When RADIO_PRI is not asserted, WIFI_GRANT will be revoked in order to avoid interference with incoming beacons received by the radio 950 (e.g., Wi-Fi beacons). As the RADIO_PRI control signal is assumed to be de-asserted, this example pertains only to a non-priority coexistence request.

As shown, if a beacon transmission occurs, WIFI_GRANT will be revoked even if the RADIO_REQ control signal is asserted.

T_GRANT_MIN is defined as a minimum period of time for which WIFI_GRANT can be guaranteed to be asserted before being revoked by a beacon transmission. T_REVOKE_LEAD is defined as a lead period between WIFI_GRANT being de-asserted and the time at which a beacon is scheduled to be received at the radio 950. T_GRANT_MIN and T_REVOKE_LEAD are defined from requirements of the radios 940 (e.g., 802.15.4 radio requirement). Furthermore, in some implementations, the radio 950 (e.g., Wi-Fi transceiver) can be programmed to have timer control up to a precision of 1 ms.

T_BEACON_ACT is the period of time a beacon is received by the radio 950 (e.g., a Wi-Fi beacon) and is defined as how long a beacon signal can be. WIFI_GRANT would not be re-asserted by timeout while the radio 950 is still receiving a beacon. As an example, for a 2.4 GHz beacon sent at a 1 Mbps DSSS rate, given a typical beacon frame of approximately 300 Bytes, T_BEACON_ACT is defined to be approximately 300*8*1 us, or 2.4 ms.

T_BEACON_INT is defined as an interval of time for the beacon. In some implementations, T_BEACON_INT is defined as T_GRANT_MIN+T_REVOKE_LEAD. In some implementations, the beacon interval T_BEACON_INT is defined by the Access Point to which the radio 950 is connected. As an example, the default beacon interval of an Access Point is 100 TUs (or 102.4 ms).

FIG. 15F-3 illustrates an example of a signal timing diagram with beacon skipping. When RADIO_REQ is asserted without RADIO_PRI at a time that is too close to receiving the next scheduled beacon, WIFI_GRANT is asserted only after the scheduled beacon has been received and completed. In this case, T_REQ_LATENCY (i.e., time between asserting RADIO_REQ and WIFI_GRANT being asserted consequently) may be defined as (T_GRANT_MIN+T_REVOKE_LEAD+T_BEACON_ACT).

Figures 1, 2, 15G:
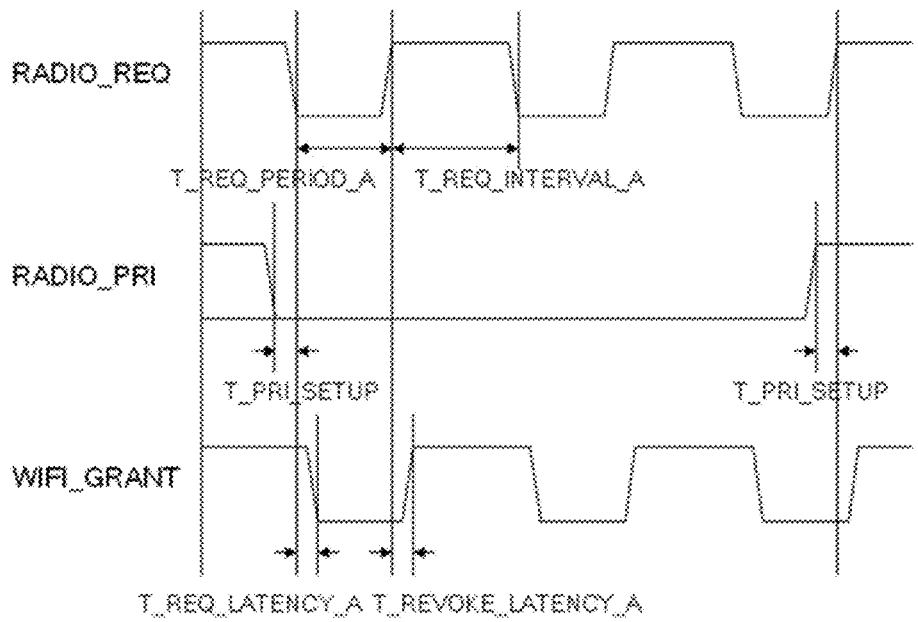

FIGS. 15G-1 and 15G-2 illustrate a signal timing diagram and timing chart for an "alarming" mode of operation for a coexistence scheme, in accordance with some implementations.

As shown in FIG. 15G-1, RADIO_PRI is kept activated while in alarming mode, and is de-activated at the termination of the last transmission request (e.g., RADIO_REQ). The alarming mode may include situations in which critical data is being transmitted and received by the radio 940 (e.g., pings from hazard detection devices being received and transmitted to other devices). In these situations, the coexistence must be configured to support the receipt and transmission of this data, while synchronously transmitting data through the radio 950 (e.g., transmitting data packets of a recorded video stream through Wi-Fi) during intervals of time when the radio 940 is not requesting transmission access (e.g., between transmissions of the radio 940).

As shown, during an alarming mode, RADIO_PRI is first asserted, and RADIO_REQ is asserted at a time T_PRI_SETUP afterwards. Once RADIO_REQ has been asserted, the radio 950 grants transmission access by asserting WIFI_GRANT at a time T_REQ_LATENCY_A afterwards. When the RADIO_REQ transmission request from the radio 940 finishes, WIFI_GRANT is revoked at time T_REVOKE_LATENCY_A afterwards. The interval T_REQ_INTERVAL_A is an interval of time between transmission requests from the radio 940 (e.g., RADIO_REQ). During this time, WIFI_GRANT is revoked, and therefore transmission access is set aside for the radio 950 (e.g., data packets for a video stream over Wi-Fi).

In some implementations, during an alarming mode, after asserting RADIO_REQ, the radio 940 begins transmission at a time T_REQ_LATENCY_A afterwards regardless of whether the WIFI_GRANT is asserted.

Figure 16:
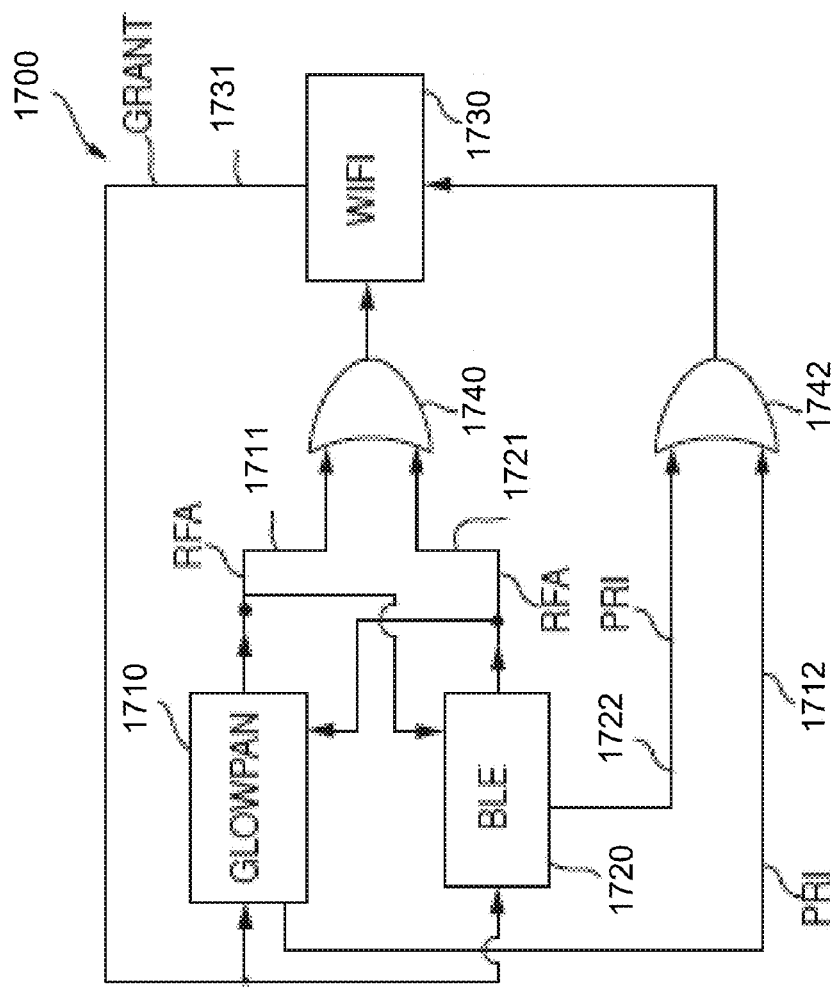
FIG. 16 shows an illustrative co-existence circuit for managing operations of three communications circuits, in accordance with some implementations.

FIG. 16 shows an illustrative co-existence circuit 1700 for managing operations of three communications circuits, in accordance with some implementations. In the example shown, circuitry 1700 includes 6LOWPAN circuitry 1710 (e.g., a first radio 940, FIG. 9), BLE circuitry 1720 (e.g., a second radio 940), Wi-Fi circuitry 1730 (e.g., a first radio 950), and OR gates 1740 and 1742. Request for Access (RFA) line 1711 may be connected to BLE circuitry 1720 and an input of OR gate 1740. An RFA line may be asserted by a communication circuit when it requires access to an RF medium. An RF medium can include an antenna and/or a communications frequency. RFA line 1721 may be connected to 6LOWPAN circuitry 1710 and an input of OR gate 1740. The output of OR gate 1740 may be connected to Wi-Fi circuitry 1730. Priority Line 1712 may be connected to an input of OR gate 1742, and priority line 1722 may be connected to an input of OR gate 1742. A priority line may be asserted by a communication circuit that is requesting high priority access to the RF medium. The output of OR gate 1742 may be connected to Wi-Fi circuitry 1730. Grant line 1731 may be connected to 6LOWPAN circuitry 1710 and BLE circuitry 1720. Grant signals may be provided on grant line 1731 to indicate which communications circuit is granted access to the RF medium. Grant signals may be provided by a master circuit, which is illustrated as Wi-Fi circuitry 1730. Each of circuitries 1710, 1720, and 1730 may require access to the same RF medium when communicating data.

Although the examples provided in FIGS. 16-21 are described with respect to a multi-transceiver device that includes circuitry for 6LOWPAN, BLE, and Wi-Fi transmission protocols specifically, in other implementations, the circuitry 1700 may include any combination of three or more radios 940 and/or radios 950. In such implementations, the methods described in FIGS. 16-21 with respect to priority lines and how respective circuitry operates will apply analogously. In other words, the coexistence schemes and methods described in FIGS. 16-21 are generally applicable to any multi-radio device (e.g., smart devices having three or more radios).

The RFA lines 1711 and 1721 may be shared among both 6LOWPAN circuitry 1710 and BLE circuitry 1720 so that the circuits are aware of when each makes a request for access. Such information sharing can assist in avoiding collision events. The RFA may be provided to Wi-Fi circuitry 1730, which decides whether to grant access. The priority lines may specify that a particular circuit is given priority over the other circuit and that its request to access the RF medium is of high priority and the other communication circuits should yield where possible. For example, 6LoWPAN circuitry 1710 may have priority over BLE circuitry 1720 during an alarm event. In the event of potential collisions for RF medium access, master or host circuitry can control which circuitry is granted access. The master or host circuitry can be a processor other than one of the communications circuits (e.g., system processor 402) or it can be implemented by an onboard processor of one of the communication circuits (e.g., Wi-Fi circuitry 1730).

Priority may be conveyed using one of two different approaches. One approach uses direct notification. In this approach, the host (e.g., Wi-Fi 1730) can issue grant command to the communications circuits to inform them which has priority. The grant command may not necessarily be a single Boolean value, but can include an enumeration or bit field indicating which circuit has priority or is allowed to assert its priority line. In another approach, implicit notification may be used. In implicit notification, a circuit may impliedly have priority if its priority input pin is not asserted. If its priority input pin is asserted, then it may not have priority.

The 6LoWPAN communication circuitry priority cases are shown and described in Table 1.

TABLE 1

| | |
|---|---|
| No Priority, Yield to BLE Circuitry | 6LO_Priority not asserted, yield to BLE when Grant asserted but BLE_RFA also asserted |
| Priority | 6LO_Priority asserted, do not yield BLE_RFA asserted |
| No Priority, Retain access against BLE Circuitry | 6LO_Priority not asserted, do not yield to BLE when Grant asserted but BLE_RFA also asserted |

The BLE communications circuitry priority cases are shown and described in Table 2.

TABLE 2

| | |
|---|---|
| No Priority | BLE_Priority not asserted, yield to 6LoWPAN when Grant asserted but 6LO_RFA also asserted |
| Priority | BLE_Priority asserted, do not yield to 6LO_RFA asserted |

Figure 17A:
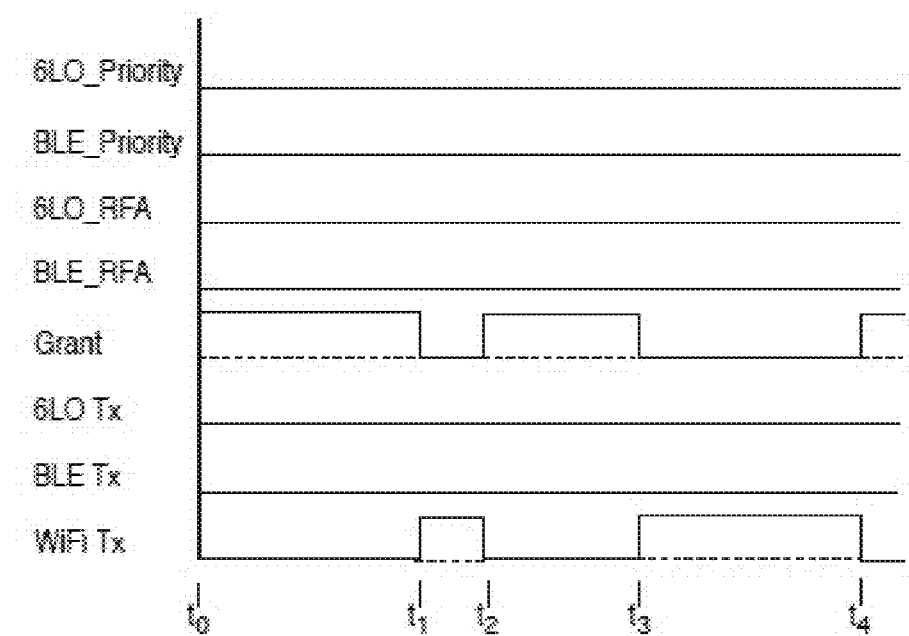
FIGS. 17A-17B show priority cases for Wi-Fi circuitry, in accordance with some implementations.

The priority cases for Wi-Fi circuitry 1730 are described in connection with FIGS. 17A-17B. FIG. 17A shows an illustrative base case in which both priority lines for 6LOWPAN circuitry 1710 and BLE circuitry 1720 are LOW, indicating that the these circuits are not requesting priority. In addition, there are no pulses in 6LO_RFA nor BLE_RFA, indicating that 6LoWPAN 1710 and BLE circuitry 1720 are not requesting access. From time t0 to t1, the Grant line is HIGH, implying that Wi-Fi circuitry 1730 is granting access to the RF medium. From time, t1 to time, t2, Grant is LOW and WiFi Tx is HIGH. Thus, Wi-Fi circuitry 1730 denies grant when it wishes to transmit. This is also shown between time, t3 and t4. Moreover, during the base case, 6LoWPAN circuitry 1710 and BLE circuitry 1720 may be permitted to access the RF medium when Grant is HIGH.

Figure 17B:
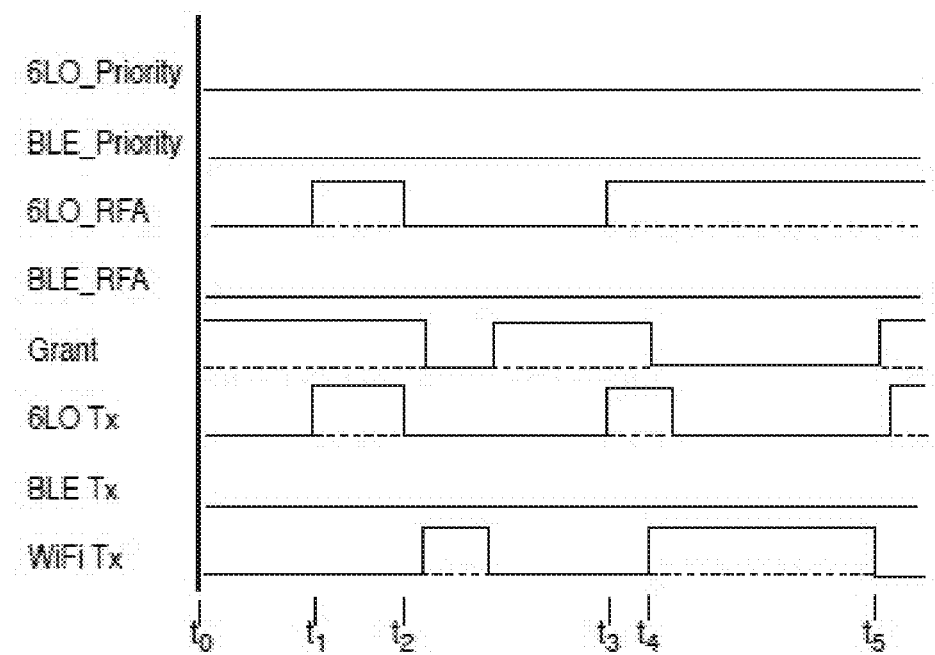

FIG. 17B shows an illustrative case showing grant and denial of 6LoWPAN circuitry 1710 access to the RF medium based status of Grant, in accordance with some implementations. As shown, between times t1 and t2, 6LO_RFA is HIGH while Grant is HIGH, thereby enabling 6Lo Tx to go HIGH. Starting at time, t3, 6Lo Tx is initially HIGH, but this transmission is denied at time, t4, when Grant is set LOW and WiFi Tx goes HIGH. Then, at time t5, Grant returns to HIGH, thereby enabling 6LoWPAN circuitry to continue transmitting.

Figure 18A:
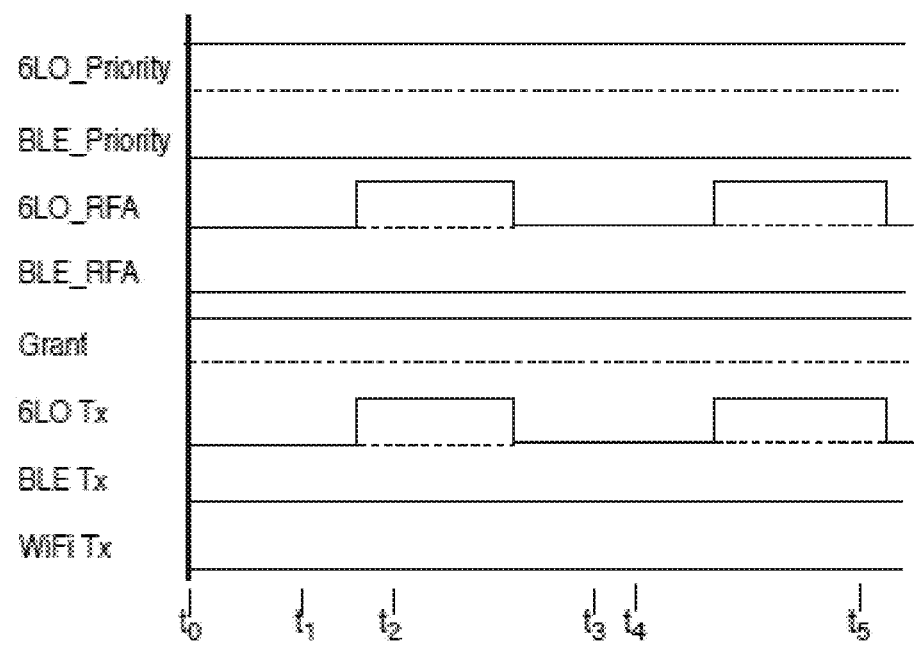
FIGS. 18A-D shows different illustrative 6LoWPAN priority use cases, in accordance with some implementations.
Figure 18B:
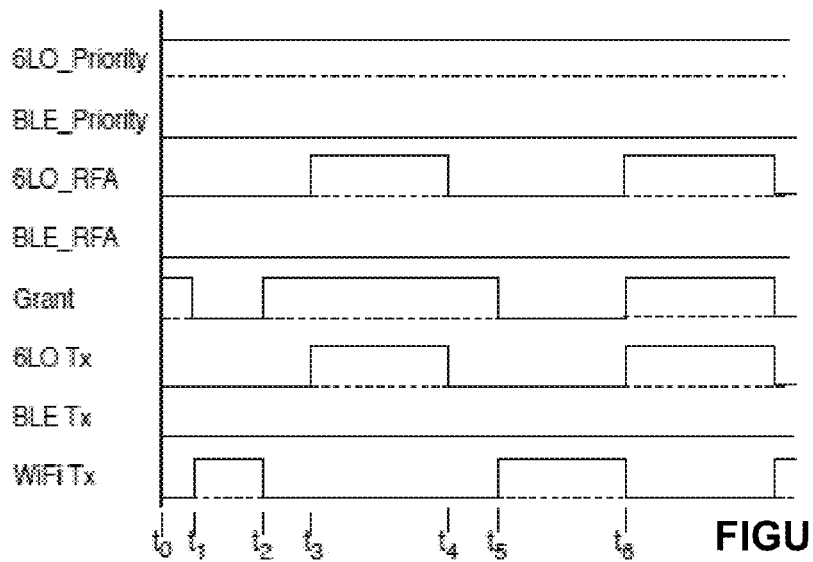
Figure 18C:
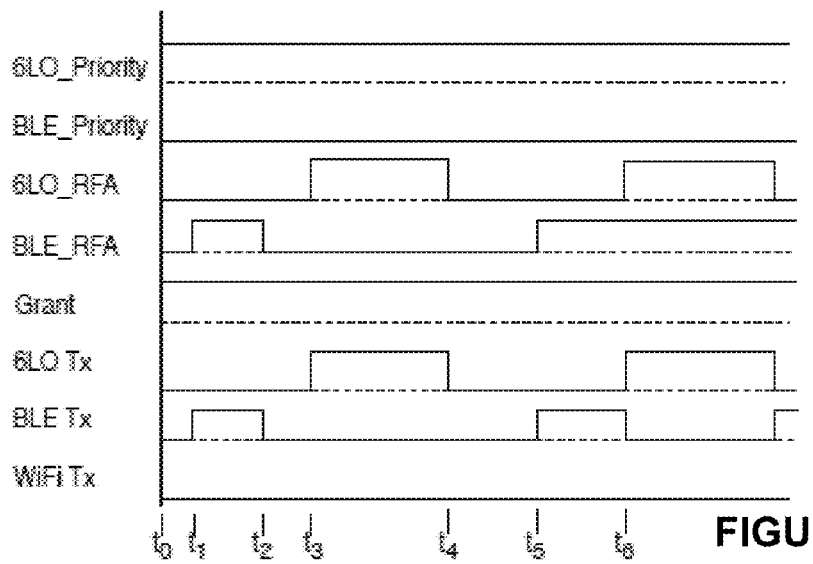
Figure 18D:
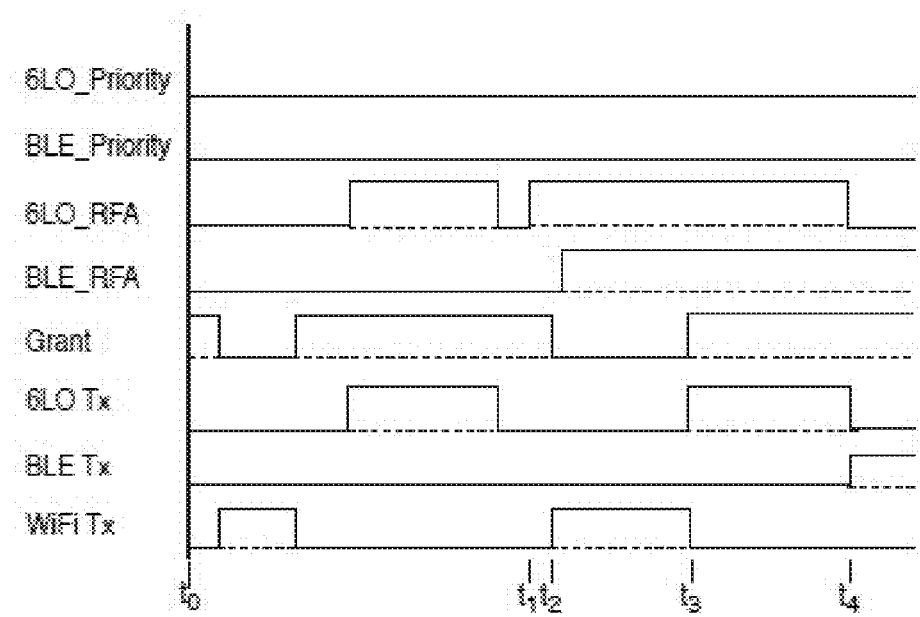

FIGS. 18A-D shows different illustrative 6LoWPAN priority use case, in accordance with some implementations. In particular, FIG. 18A shows an illustrative base case and FIGS. 18B-18D show priority, no priority, and Retain access against BLE priority use cases, respectively, of Table 1. As shown in the base case of FIG. 18A, 6LoWPAN circuitry 1710 requests access twice and is granted access both times. In addition, there are no collisions and 6LO_Priority and Grant are HIGH throughout.

FIG. 18B shows an illustrative priority use case for 6LoWPAN in which 6LO_Priority is HIGH throughout. From times t1-t2, there are not request for access by either 6LO or BLE, thereby enabling Wi-Fi to revoke its Grant and transmit. At time t3, 6LO_RFA goes HIGH and 6LO Tx transmits from time t3 to t4. At time t5, Wi-Fi Tx goes HIGH. However, at time t6, 6LO_RFA goes HIGH, and because 6LO has priority, Wi-FI Tx goes LOW and 6LO is permitted to transmit.

Referring now to FIG. 18C, 6LO_Priority and Grant are HIGH throughout. At times t1-t2, BLE_RFA is HIGH, and because 6LO_RFA is LOW, there is no conflict, and BLE Tx is permitted to go HIGH. At times t3-t4, 6LO_RFA is HIGH, and is granted access, resulting in 6LO Tx going HIGH. Starting at time t5, BLE_RFA is HIGH, and BLE Tx begins to transmit until time, t6, at which point 6LO_RFA goes HIGH. Now, at time t6, there is a conflict between 6LO_RFA and BLE_RFA, but because 6LO_Priority is HIGH, 6LO Tx goes HIGH, indicating that 6LoWPAN circuitry 1710 decides to transmit despite the assertion by BLE circuitry 1720.

Referring now to FIG. 18D, both 6LO_Priority and BLE_Priority are LOW but circuitry 1700 is configured to permit grant 6LoWPAN circuitry 1710 access in case of a collision. Starting at time t1, 6LO_RFA goes HIGH and at time t2, BLE_RFA goes HIGH, but Grant goes LOW to allow Wi-Fi circuitry to transmit until time t3. At time t3, Grant goes HIGH, at which time, 6LO Tx begins transmitting (as shown). BLE_Tx does not transmit because BLE circuitry 1720 does not have priority and knows that 6LO_RFA has already been asserted. BLE_Tx may go HIGH as it detects the falling edge of 6LO_Tx at time t4.

The priority use cases for BLE circuitry 1720 are similar to the priority use cases of 6LoWPAN circuitry 1710. For example, if FIGS. 18A-18C were used to illustrate the priority use cases of BLE circuitry 1720, the 6LO priority, RFA, and Tx labels can be transposed with the BLE priority, RFA, and Tx labels.

Figure 19A:
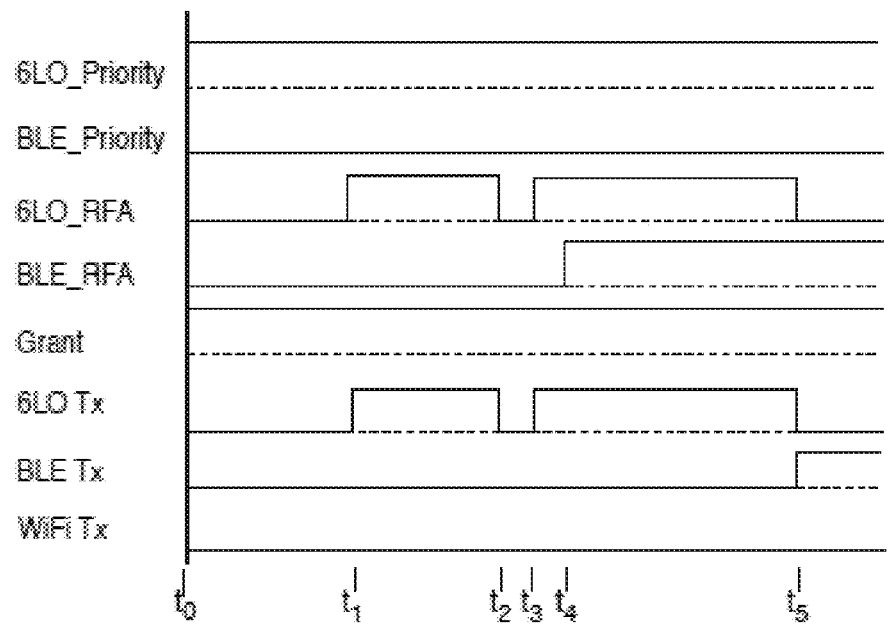
FIGS. 19A-19B show illustrative timing diagrams where Wi-Fi circuitry is OFF, in accordance with some implementations.
Figure 19B:
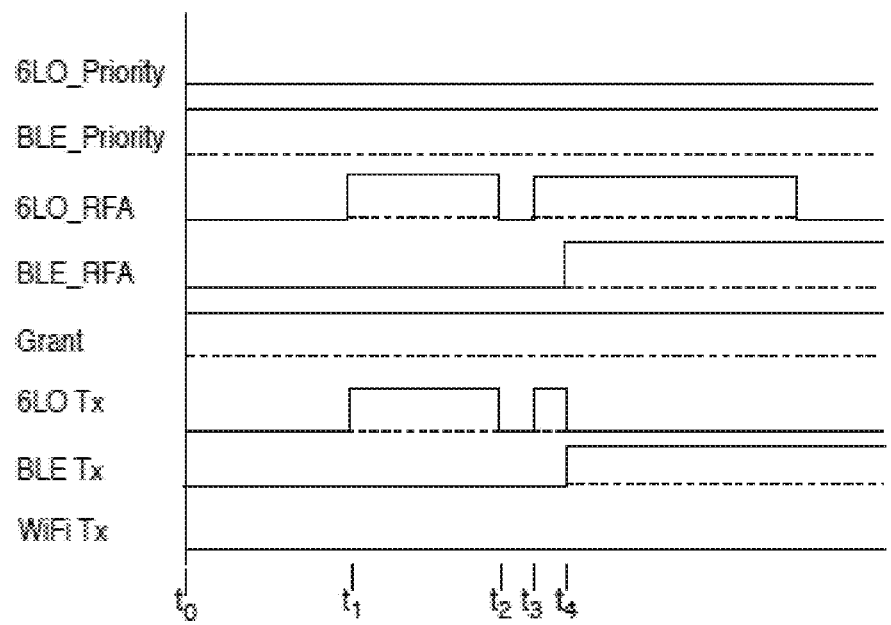

FIGS. 19A and 19B show illustrative timing diagrams where Wi-Fi circuitry 1730 is OFF, in accordance with some implementations. When Wi-Fi circuitry 1730 is OFF, 6LoWPAN circuitry 1710 and BLE circuitry 1720 are operative to arbitrate among themselves to determine who has access to the RF medium. 6LoWPAN circuitry 1710 and BLE circuitry 1720 may arbitrate among themselves based on their priority line assertions and the state of the other circuit's RFA signal. FIG. 19A illustrates timing diagrams where Wi-Fi is OFF and 6LoWPAN circuitry has priority, in accordance with some implementations. As shown, 6LO_Priority and Grant are HIGH. At time t1, 6LO_RFA goes HIGH and then goes LOW at time t2. 6LO Tx is HIGH from times t1 to t2. At time t3, 6LO_RFA goes HIGH, during which time, 6LO Tx is also HIGH. BLE_RFA goes HIGH at time t4 and remains HIGH. BLE_Tx continues to yield to 6LO Tx until time t5, at which point 6LO_RFA goes LOW. 6LO Tx may not yield between times t4 and t5, despite the pulse on BLE_RFA, because 6LoWPAN circuitry 1710 has priority.

FIG. 19B illustrates timing diagrams where Wi-Fi is OFF and BLE circuitry has priority, in accordance with some implementations. As shown, Grant and BLE_Priority are HIGH. At times t1 to t2, 6LO Tx is permitted access to transmit since there is no collision. At time t3, 6LO_RFA goes HIGH, and 6LO Tx begins transmitting. At time t4, however, BLE_RFA goes HIGH. Since BLE circuitry has priority, BLE_Tx takes priority over 6LO_Tx. As a result, BLE_Tx goes HIGH and 6LO Tx goes LOW.

Figure 20:
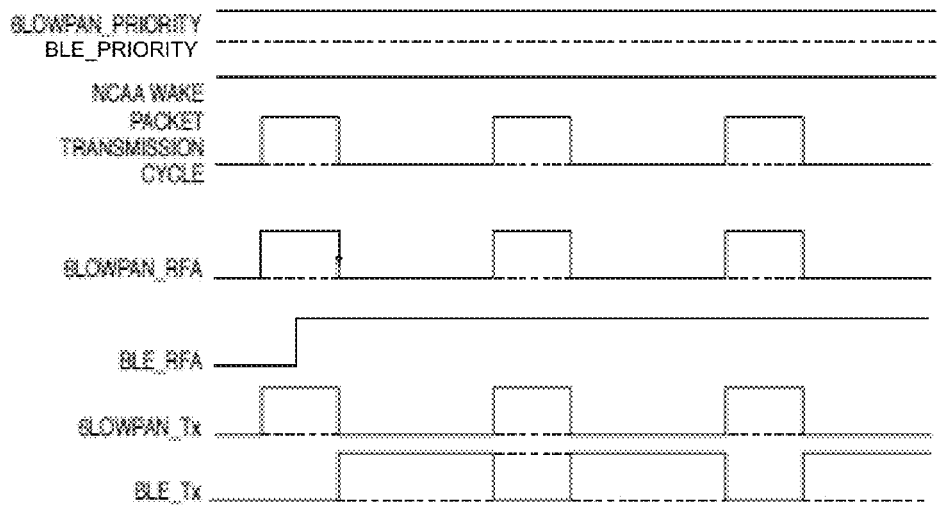
FIG. 20 shows an illustrative timing diagram showing how the BLE circuitry attempts to communicate with a personal device during the idle portion of a wake packet being transmitted by 6LoWPAN circuitry during a NCCA period, in accordance with some implementations.

Referring now to FIG. 20, an illustrative timing diagram showing how the BLE circuitry attempts to communicate with a personal device during the idle portion of a wake packet being transmitted by 6LoWPAN circuitry during a NCCA period, in accordance with some implementations. During the NCAA period, Wi-Fi circuitry 1730 is not yet turned ON, therefore 6LoWPAN circuitry 1710 and BLE circuitry 1720 may arbitrate amongst themselves to determine who has access to the RF medium. For purposes of this timing diagram, assume that the 6LoWPAN has priority (e.g., because hazard detection system has raised its alarm). FIG. 20 shows that the NCCA wake packet transmission cycle has a period including an active portion (as evidenced by the HIGH pulse) and an idle portion (as evidenced by the LOW signal). The 6LoWPAN RFA may track the active portion of each wake packet. Since 6LoWPAN circuitry 1710 has priority, it controls access to the RF medium regardless of any RFA by BLE circuitry 620. This is shown in the FIG., as evidenced by 6LoWPAN Tx going HIGH in concert with the 6LoWPAN pulses. BLE_RFA is shown to remain HIGH throughout the timing diagram, thus indicating BLE circuitry 1720's desire to attempt communications with a personal device (not shown). BLE circuitry 1720 is permitted to communicate during the idle portion of each wake packet transmission. This is shown where BLE Tx goes HIGH when 6LoWPAN Tx goes LOW, and vice versa.

During the BLE Tx HIGH signal period, BLE circuitry 1720 attempts to communicate with one or more personal devices. BLE circuitry 1720 may do this by 1) advertising its presence to the personal device (e.g., on channel 37 of a BLE protocol), 2) authenticating the personal device (e.g., on channel 38 of the BLE protocol), and 3) commencing data transfer with the personal device (e.g., on channel 39 of the BLE protocol). BLE circuitry 1720 may perform all three steps during a single BLE Tx session or over a series of BLE Tx sessions. The data transfer can specify instructions for altering the state of the system. For example, if the system is alarming, the instruction can contain a hush instruction that commands the system to change from an alarming state to a hush state.

Figure 21:
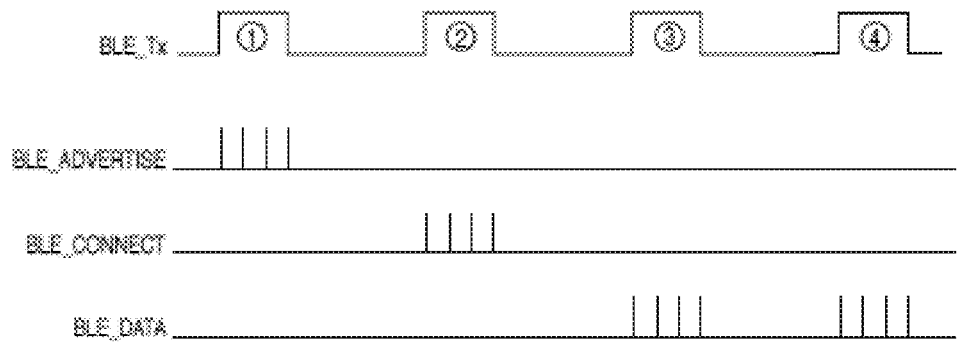
FIG. 21 shows illustrative timing diagrams of exemplary BLE advertise, connect, and data transfer activity during BLE transmissions, in accordance with some implementations.

FIG. 21 shows illustrative timing diagrams of exemplary BLE advertise, connect, and data transfer activity during BLE transmissions, in accordance with some implementations. The BLE operations of advertise, connect, and data transfer may occur during BLE_Tx activity, which occur when BLE_Tx is HIGH. As shown in FIG. 21, the BLE operations are performed in one of the four BLE_Tx activity windows. BLE Advertise may occur during BLE_Tx activity window 1, and BLE connect may occur during BLE_Tx activity window 2. After a connection is made, BLE data may be transmitted between a personal device and the system during windows 3 and 4.

FIG. 22 is a flow diagram illustrating a method of coexistence using bypass circuitry, in accordance with some implementations. In some implementations, the method 2200 is performed at an electronic device (e.g., devices of a smart home environment 100, FIGS. 1 and 12; smart devices 204 and/or hub device 180 of smart home network 202, FIG. 2) having a plurality of transceivers and antennas (e.g., smart device 204, FIG. 14, having one or more radios 940 and/or radios 950, and antennas 1402). More specifically, in some implementations, the method 2200 is performed by one or more components of the electronic device (e.g., communications module 942 of smart device 204, or a front end module 1400 of the communications module). For ease of reference, the methods herein will be described as being performed by an electronic device (e.g., smart device 204). FIG. 22 corresponds to instructions stored in a computer memory or other computer-readable storage medium (e.g., memory 606 of the hub device 180), or instructions stored in the memory of one or more components of the electronic device (e.g., memory of the communications module 942, not illustrated).

The electronic device (e.g., smart device 204, which is a camera) includes a plurality of transceivers (e.g., radio(s) 940 and radio(s) 950, FIG. 14), one or more processors, and memory storing instructions for execution by the one or more processors. The electronic device detects (2204) whether a second transceiver (e.g., radio 950) of the plurality of transceivers is not transmitting signals via a second antenna (e.g., antenna 1402-2) coupled to the second transceiver. In some implementations, a bypass signal is produced (2202) when the second transceiver is active, where detecting (2204) whether the second transceiver is transmitting signals includes (2206) detect the bypass signal. For example, a bypass signal is produced and detected on connection 1410 (FIG. 14) when radio 950 is transmitting.

In accordance with detecting that the second transceiver is not transmitting signals via the second antenna, a first transceiver (e.g., radio 940) of the plurality of transceivers is coupled (2208) to a first antenna via an amplifier such that a signal received by the first antenna is amplified by the amplifier prior to being passed to the first transceiver. In some implementations, the amplifier is a low-noise amplifier (e.g., low noise amplifier 1406-2, FIG. 14).

In accordance with detecting that the second transceiver is transmitting signals via the second antenna, the first transceiver is coupled (2210) to the first antenna via a bypass line (e.g., bypass line 1408) such that a signal received by the first antenna is not amplified by the amplifier prior to being passed to the first transceiver.

In some implementations, the first and second antennas receive and transmit signals at the same frequency (e.g., 2.4 GHz).

FIGS. 23A-23F are flow diagrams illustrating methods of using control signals in a coexistence scheme, in accordance with some implementations. In some implementations, the methods 2300 and 2330 are performed at an electronic device having a plurality of transceivers and antennas (e.g., smart device 204 of FIGS. 9 and 15A-15B, having one or more radios 940 and/or radios 950). More specifically, in some implementations, the methods 2300 and 2330 are performed by one or more components of the camera device (e.g., communications module 942 of smart device 204). For ease of reference, the methods herein will be described as being performed at a camera device (e.g., smart device 204 of FIG. 15A, a camera). FIGS. 23A-23F correspond to instructions stored in a computer memory or other computer-readable storage medium (e.g., memory 606 of the hub device 180), or instructions stored in the memory of one or more components of the electronic device (e.g., memory of the communications module 942, not illustrated).

The camera device includes a plurality of distinct transceivers configured for communication over respective communication protocols (e.g., radio 940 and radios 950, which includes radios 950-1 and 950-2, FIGS. 15A-15B), one or more processors, and memory storing instructions for execution by the one or more processors.

In performing the method 2300, the camera device communicates (2302) using a first transceiver of the plurality of distinct transceivers, the first transceiver configured to transmit and receive, over a first one of the communication protocols, signals for configuring the camera device (e.g., radio 950-1 of radios 950, FIGS. 15A-15B). In some implementations, the first communication protocol is (2304) based on the Bluetooth Low Energy standard. In some implementations, communicating (2302) using the first transceiver includes transmitting (2306) data comprising a video format configured for low-bandwidth transmissions (e.g., a low resolution encoded video stream).

The camera device communicates (2308) with one or more smart home devices using a second transceiver of the plurality of transceivers. The second transceiver (e.g., radio 940, FIG. 15A) is configured to transmit and receive, over a second one of the communication protocols, signals comprising one or more of alerts, control signals and status information to and from the one or more smart home devices (e.g., emergency alerts from hazard detectors 104, FIG. 1). In some implementations, the second communication protocol is based (2310) on the IEEE 802.15.4 standard. In some implementations, communicating (2308) using the second transceiver includes (2312) transmitting data comprising the video format configured for low-bandwidth transmissions (e.g., a low resolution encoded video stream). In some implementations, communicating (2308) using the second transceiver includes (2314) receiving intermittent signals from the one or more smart home devices and/or retransmitting received signals from the one or more smart home devices, concurrently with the transmission of data using a third transceiver (e.g., receiving emergency pings from connected smart hazard detectors 104 using radio 940 (FIG. 15A) while transmitting video data over Wi-Fi radio 950-2 (FIGS. 15A-15B)). In some implementations, the transmission of data using the third transceiver is temporarily suspended (2316) while receiving signals from the one or more smart home devices and/or retransmitting received signals from the one or more smart home devices. For example, radio 940 and radios 950 coordinate transmission access such that the radio 940 and radios 950 are not both simultaneously transmitting signals at a given time (e.g., communications module 942 moderates transmission access by the radio 940 and radios 950, and selectively grants/denies transmission access to the radio 940 and radios 950).

Figure 23A:
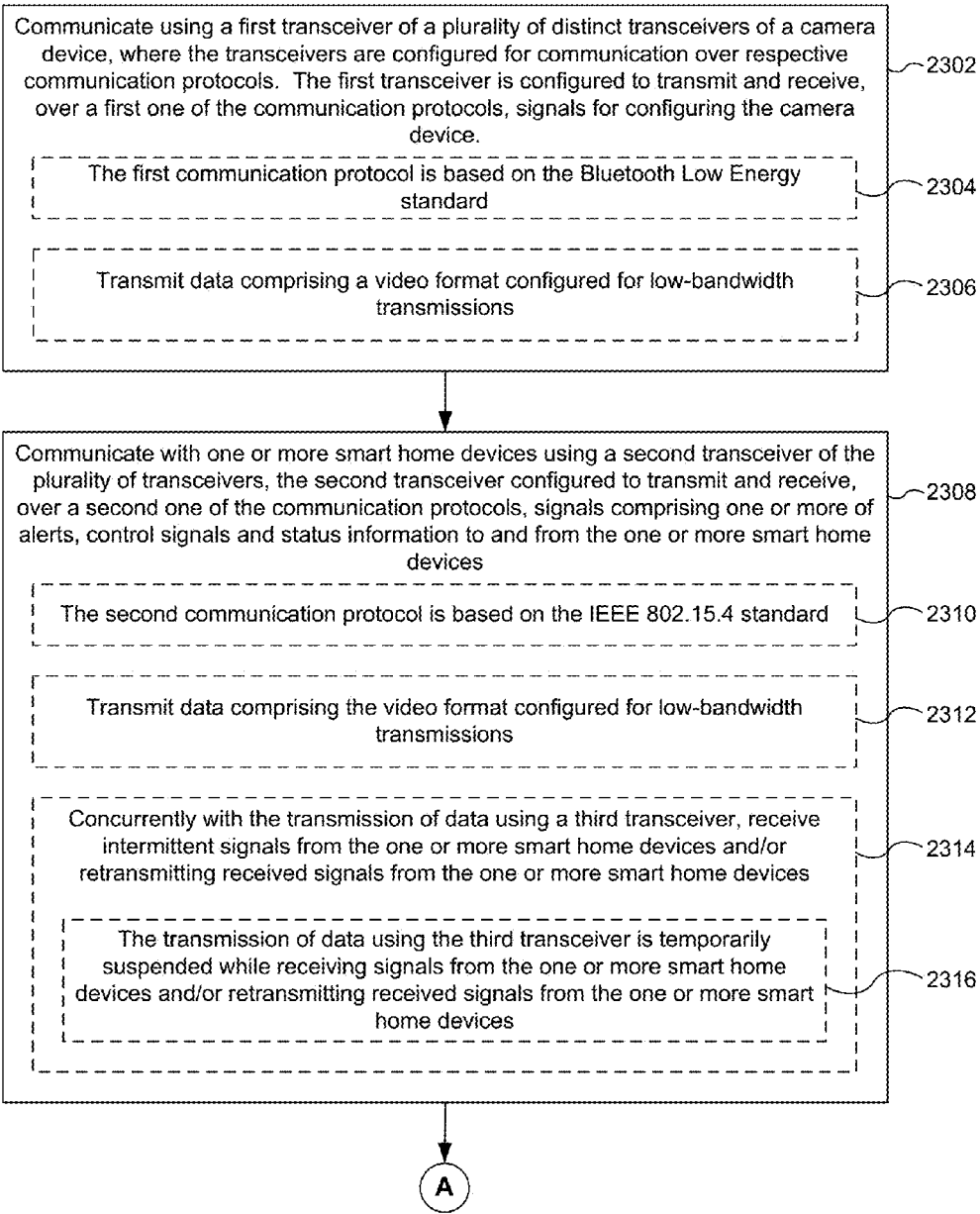
FIGS. 23A-23F are flow diagrams illustrating methods of using control signals in a coexistence scheme, in accordance with some implementations.
Figure 23B:
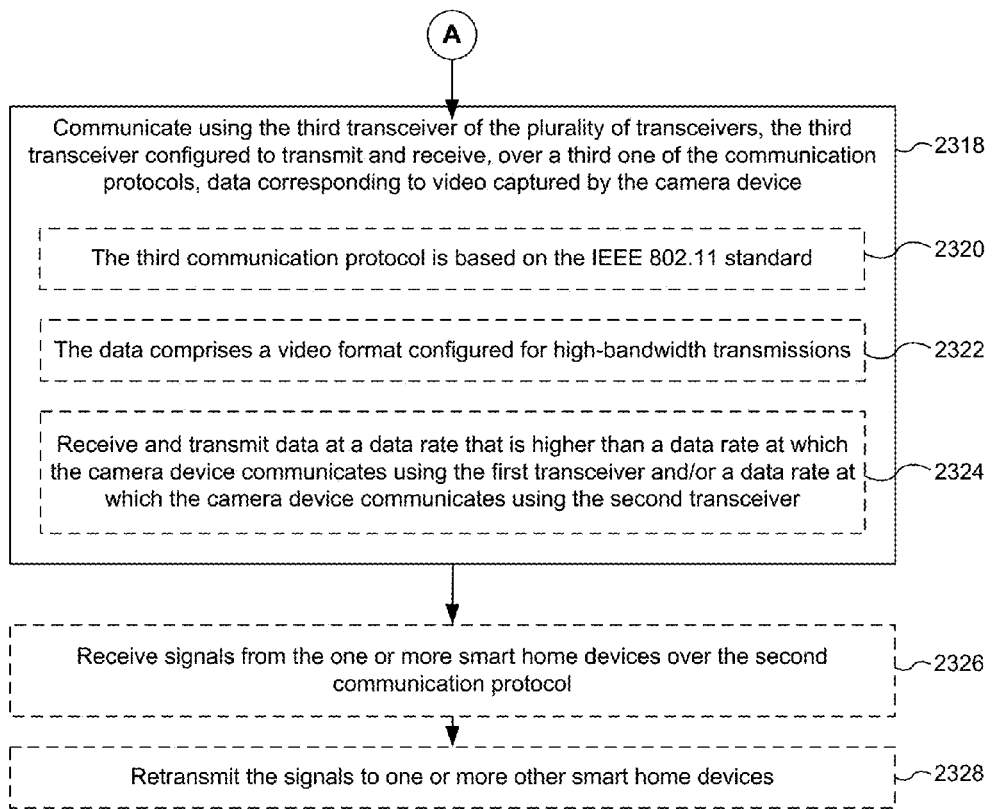

Referring now to FIG. 23B, the camera device communicates (2318) using the third transceiver of the plurality of transceivers. The third transceiver (e.g., radio 950-2 of radios 950, FIGS. 15A-15B) is configured to transmit and receive, over a third one of the communication protocols, data corresponding to video captured by the camera device. In some implementations, the third communication protocol is based (2320) on the IEEE 802.11 standard. In some implementations, the data comprises (2322) a video format configured for high-bandwidth transmissions (e.g., high resolution video streaming of video surveillance footage using Wi-Fi). In some implementations, communicating (2318) using the third transceiver includes (2324) receiving and transmitting data at a data rate that is higher than a data rate at which the camera device communicates using the first transceiver and/or a data rate at which the camera device communicates using the second transceiver (e.g., streaming high-resolution video using Wi-Fi radio 950-2, while streaming low-resolution video using 802.15.4 radio 940, FIGS. 15A-15B).

In some implementations, the camera device receives (2326) signals from the one or more smart home devices over the second communication protocol, and retransmits (2328) the signals to one or more other smart home devices (e.g., receiving and retransmitting emergency pings from connected smart hazard detectors 104 using radio 940, FIG. 15A).

Figure 23C:
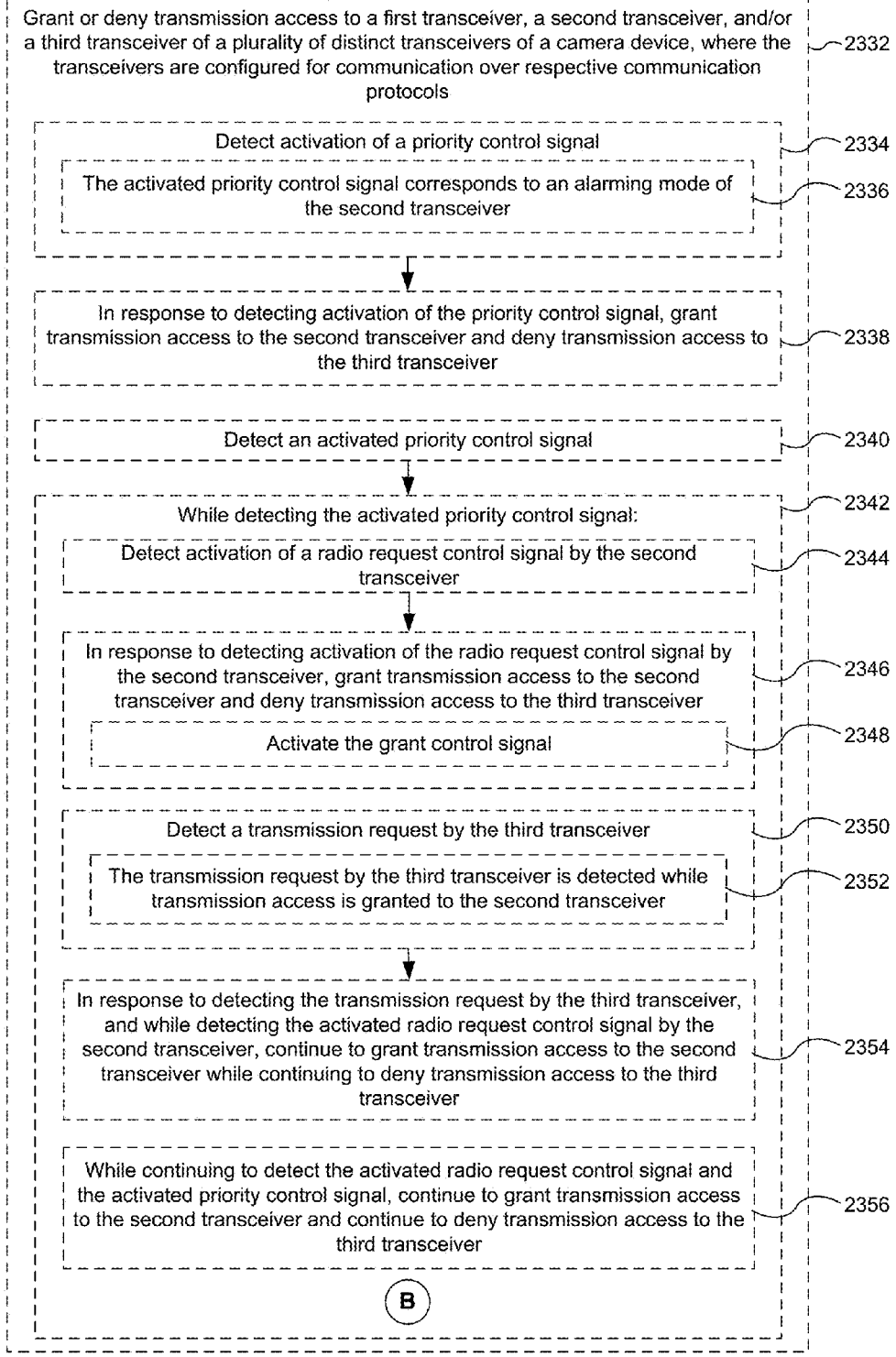

Referring now to FIG. 23C, the camera device may perform the method 2330 additionally to and/or in conjunction with the method 2300. In performing the method 2330, in some implementations, the camera device grant or deny transmission access to the first transceiver (e.g., radio 950-1 of radios 950, FIGS. 15A-15B, such as Bluetooth LE), the second transceiver (e.g., radio 940, FIG. 15A, such as 802.15.4), and/or the third transceiver (e.g., radio 950-2 of radios 950, FIGS. 15A-15B, such as Wi-Fi) of the plurality of distinct transceivers of the camera device, where the transceivers are configured for communication over respective communication protocols.

In some implementations, granting or denying transmission access (2332) includes (2334) detecting activation of a priority control signal (e.g., assertion of RADIO_PRI signal on control line 1500-1, FIG. 15A). In some implementations, the activated priority control signal corresponds (2336) to an alarming mode of the second transceiver (e.g., incoming emergency alerts from a hazard detector 104). In response to detecting activation of the priority control signal, transmission access is granted (e.g., by the "master" transceiver, such as radio(s) 950, FIG. 15A) to the second transceiver (e.g., e.g., 802.15.4 radio 940) and transmission access is denied to the third transceiver (e.g., Wi-Fi radio 950-2).

In some implementations, an activated priority control signal is detected (2304) (e.g., an already asserted RADIO_PRI signal on control line 1500-1 is detected). While detecting the activated priority control signal (2342), activation of a radio request control signal by the second transceiver is detected (2344) (e.g., assertion of RADIO_REQ signal on control line 1500-2). In response to detecting activation of the radio request control signal by the second transceiver, transmission access is granted (2346) to the second transceiver and transmission access is denied to the third transceiver. In some implementations, granting transmission access to the second transceiver and denying transmission access to the third transceiver includes (2348) activating the grant control signal (e.g., asserting WIFI_GRANT signal on control line 1500-3, FIG. 15A). A corresponding example of steps 2340 through 2348 is illustrated in FIGS. 15G-1.

In some implementations, while detecting the activated priority control signal, a transmission request is detected (2350) by the third transceiver. In some implementations, the transmission request by the third transceiver is detected (2352) while transmission access is granted to the second transceiver. In response to detecting the transmission request by the third transceiver, and while detecting the activated radio request control signal by the second transceiver, transmission access continues (2354) to be granted to the second transceiver while transmission access continues to be denied to the third transceiver. Thus, in some implementations, while the priority control signal is activated, the third transceiver is not permitted to transmit data.

In some implementations, while continuing to detect the activated radio request control signal and the activated priority control signal, transmission access continues (2356) to be granted to the second transceiver and transmission access continues to be denied to the third transceiver.

Figure 23D:
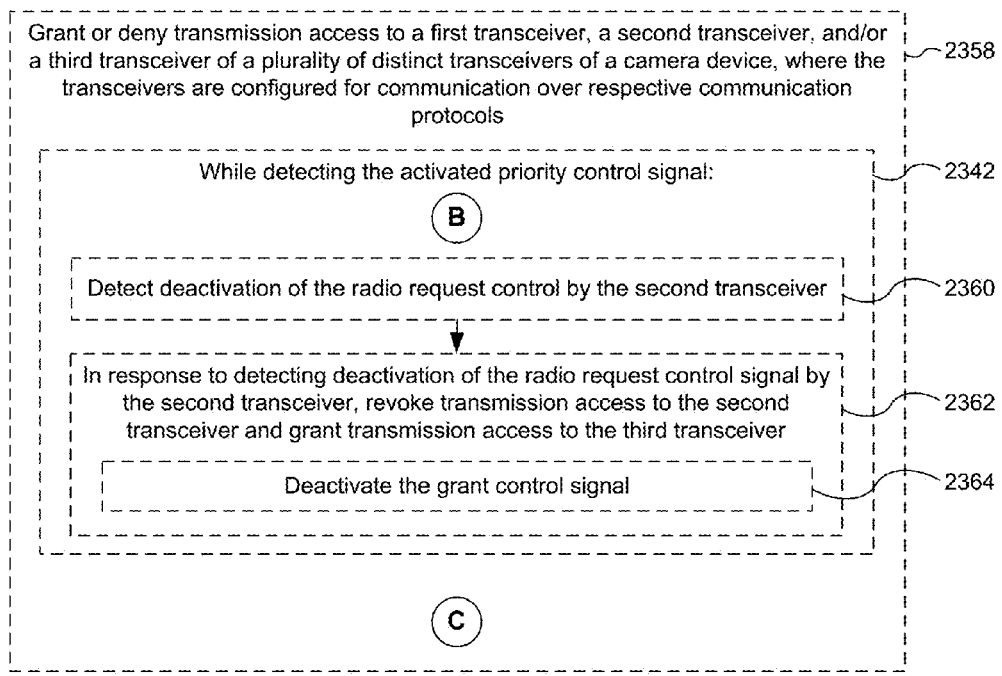
Figure 23E:
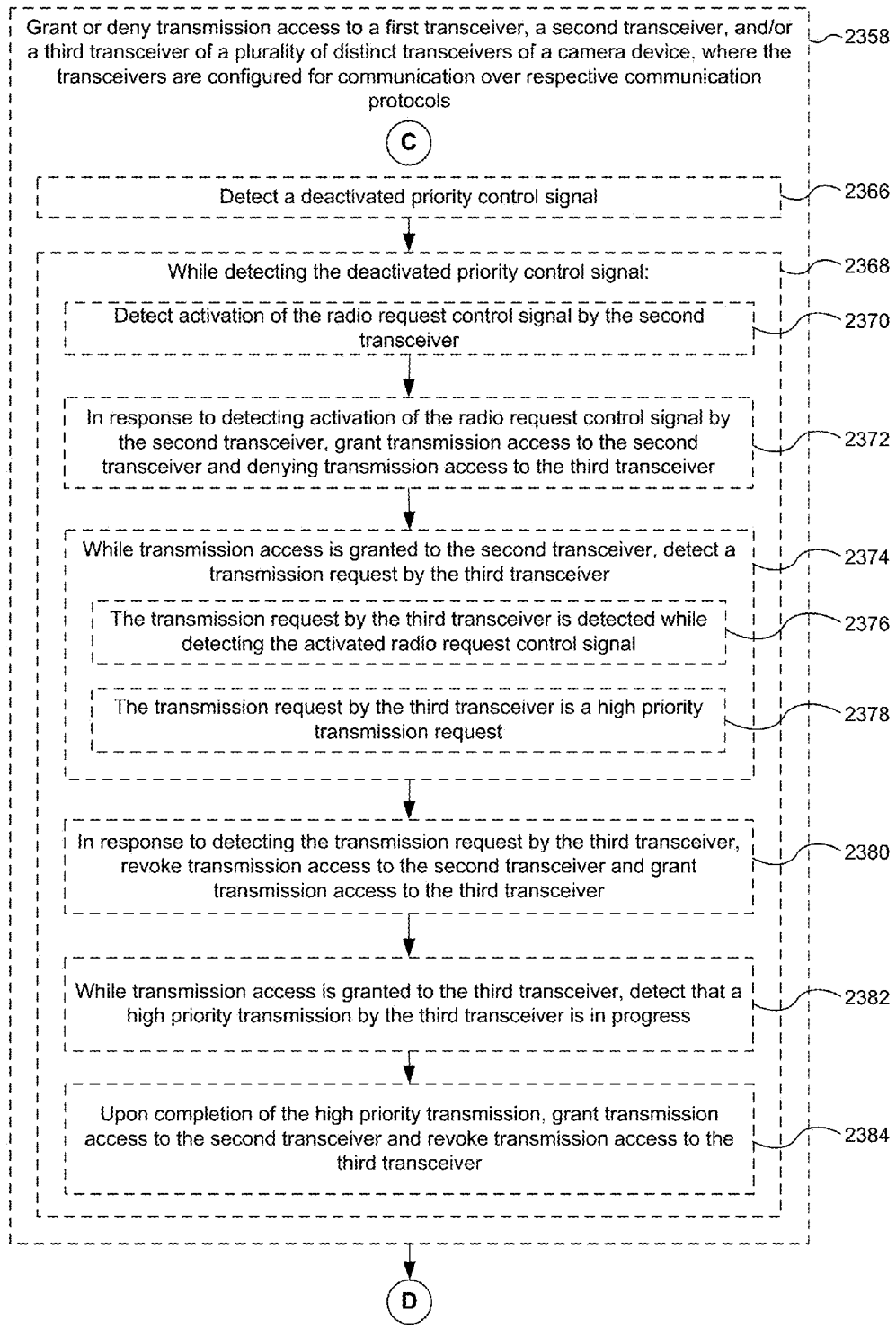
Figure 23F:
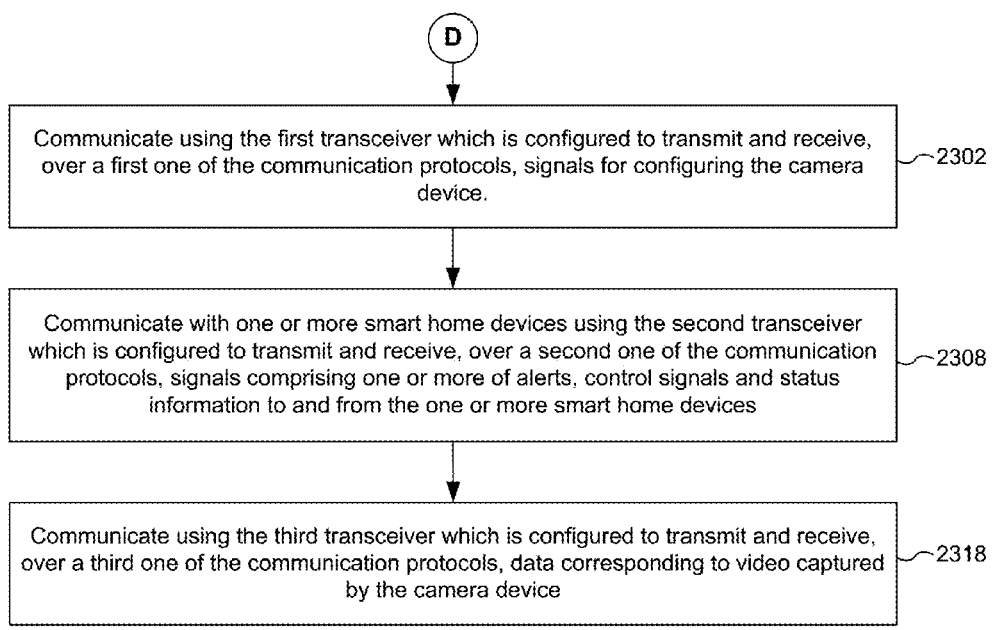

Referring now to FIG. 23D, in some implementations, while detecting the activated priority control signal, deactivation of the radio request control by the second transceiver is detected (2360) (e.g., de-assertion of RADIO_REQ signal on control line 1500-2). In response to detecting deactivation of the radio request control signal by the second transceiver, transmission access to the second transceiver is revoked (2362) and transmission access to the third transceiver is granted. In some implementations, revoking transmission access to the second transceiver and granting transmission access to the third transceiver includes (2364) deactivating the grant control signal (e.g., de-asserting WIFI_GRANT signal on control line 1500-3). A corresponding example of steps 2360 through 2364 is illustrated in FIGS. 15G-1.

In some implementations, a deactivated priority control signal is detected (2366) (e.g., an already de-asserted RADIO_PRI signal on control line 1500-1 is detected). While detecting the deactivated priority control signal (2368), activation of the radio request control signal by the second transceiver is detected (2370). In response to detecting activation of the radio request control signal by the second transceiver, transmission access is granted (2372) to the second transceiver and transmission access is denied to the third transceiver. In some implementations, while transmission access is granted to the second transceiver, a transmission request by the third transceiver is detected (2374). In some implementations, the transmission request by the third transceiver is detected (2376) while detecting the activated radio request control signal. In some implementations, the transmission request by the third transceiver is (2378) a high priority transmission request (e.g., a transmission request within an access category above BE (Best Effort), VI (Video), and/or VO (Voice)). In response to detecting the transmission request by the third transceiver, transmission access is revoked (2380) to the second transceiver and transmission access is granted to the third transceiver. In some implementations, while transmission access is granted to the third transceiver, a high priority transmission by the third transceiver is detected (2382) to be in progress. Upon completion of the high priority transmission, transmission access is granted (2384) to the second transceiver and transmission access is revoked to the third transceiver. A corresponding example of steps 2366 through 2384 is illustrated in FIGS. 15E-1.

In some implementations, the camera device communicates (2302) using the first transceiver, communicates (2308) with one or more smart home devices using the second transceiver, and communicates (2318) using the third transceiver (where the steps 2302, 2308, and 2318 may be performed in accordance with any of the implementations described with respect to FIGS. 23A-23B).

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A camera assembly, comprising:
    an enclosed housing having a rear surface, a front surface, and a periphery, wherein the periphery defines a border of the enclosed housing, and the periphery includes an inner surface and an outer surface;
    a lens module located within the enclosed housing and configured to receive light via the front surface;
    communication circuitry located within the enclosed housing and configured to wirelessly communicate over a plurality of different communication protocols, the communication circuitry including one or more transceivers configured for communication over a first communication protocol and a second communication protocol;
    a first antenna arranged at a first location on the inner surface of the periphery, the first antenna configured for communication over the first communication protocol, and the first antenna being electrically coupled to the communication circuitry; and
    a second antenna arranged at a second location on the inner surface of the periphery, the second location being different than the first location, the second antenna configured for communication over the second communication protocol, and the second antenna being electrically coupled to the communication circuitry.

2. The camera assembly of claim 1, further comprising a loop arm that is configured to hold the enclosed housing when the enclosed housing is inserted within a cutout opening in the loop arm.

3. The camera assembly of claim 2, wherein the loop arm is made from metal material, and the first location of the first antenna and the second location of the second antenna are such that the impact from the presence of the metal loop arm is suppressed.

4. The camera assembly of claim 1, wherein the first antenna is arranged at the first location on the inner surface of the periphery and/or the second antenna is arranged at the second location on the inner surface of the periphery by an adhesive material.

5. The camera assembly of claim 1, wherein the first antenna and the second antenna are configured to operate at a same wireless transmission frequency.

6. The camera assembly of claim 1, wherein the first antenna and the second antenna are configured to operate at distinct wireless transmission frequencies.

7. The camera assembly of claim 1, wherein the one or more transceivers of the communication circuitry include a first transceiver configured for communication over the first communication protocol and a second transceiver configured for communication over the second communication protocol, wherein the first transceiver and the second transceiver are distinct.

8. The camera assembly of claim 1, wherein the communication circuitry is an integrated circuit configured for communication over both the first and second communication protocols.

9. The camera assembly of claim 1, wherein the communication circuitry is configured to wireless communicate over at least three different communication protocols.

10. The camera assembly of claim 9, wherein the second antenna is further configured for communication over a third one of the communication protocols.

11. The camera assembly of claim 10, wherein:
the first antenna is configured to transmit and receive, over the first communication protocol, signals comprising one or more of alerts, control signals and status information to and from other smart home devices; and
the second antenna is configured to transmit and receive, over the second communication protocol signals for configuring the smart home device, and over the third communication protocol data corresponding to video captured by the smart home device.

12. The camera assembly of claim 1, wherein the communication circuitry is further configured to provide transmission access for communicating over the first communication protocol while denying transmission access for communicating over the second communication protocol, while detecting an activated priority control signal.

13. The camera assembly of claim 1, wherein the first antenna has a first orientation and the second antenna has a second orientation such that the impact from the presence and interference of each other antenna are suppressed.

14. The camera assembly of claim 1, wherein the first antenna or the second antenna is configured to transmit and receive wireless signals in a wireless local area network according to the IEEE 802.11 standard.

15. The camera assembly of claim 1, wherein the first antenna or the second antenna is configured to transmit and receive wireless signals in a wireless personal area network according to the IEEE 802.15.4 standard.

16. The camera assembly of claim 1, wherein the first antenna or the second antenna is configured to transmit and receive wireless signals according to the Bluetooth Low Energy standard.

17. The camera assembly of claim 1, wherein the first antenna and the second antenna are electrically coupled to a duplex that controls their connections to a single wireless receiver circuit.

18. The camera assembly of claim 1, wherein video data captured by the lens module is exchanged between the camera assembly and a server using a wireless local area network.

19. The camera assembly of claim 1, wherein the first antenna and the second antenna are marked with a respective alignment mark that is configured to guide the assembly of the respective antenna onto the interior wall of the camera lid.

\* \* \* \* \*